(12) United States Patent
Henzel et al.

(10) Patent No.: US 12,206,875 B2
(45) Date of Patent: Jan. 21, 2025

(54) SYSTEMS AND METHODS FOR IMPROVING OBJECT TRACKING IN COMPRESSED FEATURE DATA IN CODING OF MULTI-DIMENSIONAL DATA

(71) Applicant: SHARP KABUSHIKI KAISHA, Sakai (JP)

(72) Inventors: Robert Henzel, Vancouver, WA (US); Kiran Mukesh Misra, Vancouver, WA (US); Tianying Ji, Vancouver, WA (US)

(73) Assignee: SHARP KABUSHIKI KAISHA, Sakai (JP)

(*) Notice: Subject to any disclaimer, the term of this patent is extended or adjusted under 35 U.S.C. 154(b) by 79 days.

(21) Appl. No.: 18/112,615

(22) Filed: Feb. 22, 2023

(65) Prior Publication Data

US 2023/0269385 A1    Aug. 24, 2023

Related U.S. Application Data

(60) Provisional application No. 63/313,536, filed on Feb. 24, 2022.

(51) Int. Cl.
| | | |
|---|---|---|
| *H04N 11/02* | (2006.01) | |
| *H04N 19/124* | (2014.01) | |
| *H04N 19/159* | (2014.01) | |
| *H04N 19/184* | (2014.01) | |
| *H04N 19/33* | (2014.01) | |
| *H04N 19/503* | (2014.01) | |

(52) U.S. Cl.
CPC ........... *H04N 19/33* (2014.11); *H04N 19/124* (2014.11); *H04N 19/159* (2014.11); *H04N 19/184* (2014.11); *H04N 19/503* (2014.11)

(58) Field of Classification Search
CPC .... H04N 19/33; H04N 19/124; H04N 19/159; H04N 19/184; H04N 19/503
USPC ......................... 375/240.03, E7.193; 382/118
See application file for complete search history.

(56) References Cited

U.S. PATENT DOCUMENTS

| | | | |
|---|---|---|---|
| 6,628,714 B1* | 9/2003 | Fimoff | H04N 19/137 375/E7.193 |
| 2015/0363634 A1* | 12/2015 | Yin | G06V 40/171 382/118 |
| 2019/0045168 A1* | 2/2019 | Chaudhuri | G06T 3/4053 |
| 2020/0280717 A1* | 9/2020 | Li | G06N 3/08 |
| 2023/0096567 A1* | 3/2023 | Nalci | H04N 19/124 375/240.03 |

OTHER PUBLICATIONS

International Telecommunication Union, ITU-T, Telecommunication Standardization Sector of ITU, H.264, (Aug. 2021).
International Telecommunication Union, ITU-T, Telecommunication Standardization Sector of ITU, H.265, (Dec. 2016).

(Continued)

*Primary Examiner* — Jayanti K Patel
*Assistant Examiner* — Richard B Carter
(74) *Attorney, Agent, or Firm* — ScienBiziP, P.C.

(57) ABSTRACT

A method of compressing feature data includes: receiving feature data; performing spatial down sampling on the received feature data by applying a pixel unshuffle operation; and performing channel reduction on the spatially down sampled feature data by applying a non-linear two dimensional convolution with an activation.

3 Claims, 39 Drawing Sheets

(56) References Cited

OTHER PUBLICATIONS

Benjamin Bross et al., "Versatile Video Coding Editorial Refinements on Draft 10", Document: JVET-T2001-v2, Joint Video Experts Team (JVET) of ITU-T SG 16 WP 3 and ISO/IEC JTC 1/SC 29, 20th Meeting, by teleconference, Oct. 7-16, 2020.

* cited by examiner

SYSTEMS AND METHODS FOR IMPROVING OBJECT TRACKING IN COMPRESSED FEATURE DATA IN CODING OF MULTI-DIMENSIONAL DATA

CROSS-REFERENCE TO RELATED APPLICATION

The present application claims priority from Provisional Application No. 63/313,536, the contents of which are hereby incorporated by reference into this application.

TECHNICAL FIELD

This disclosure relates to coding multi-dimensional data and more particularly to techniques for improving object tracking in compressed feature data.

BACKGROUND

Digital video and audio capabilities can be incorporated into a wide range of devices, including digital televisions, computers, digital recording devices, digital media players, video gaming devices, smartphones, medical imaging devices, surveillance systems, tracking and monitoring systems, and the like. Digital video and audio can be represented as a set of arrays. Data represented as a set of arrays may be referred to as multi-dimensional data. For example, a picture in digital video can be represented as a set of two-dimensional arrays of sample values. That is, for example, a video resolution provides a width and height dimension of an array of sample values and each component of a color space provides a number of two-dimensional arrays in the set. Further, the number of pictures in a sequence of digital video provides another dimension of data. For example, one second of 60 Hz video at 1080p resolution having three color components could correspond to four dimensions of data values, i.e., the number of samples may be represented as follows: 1920×1080×3×60. Thus, digital video and images are examples of multi-dimensional data. It should be noted that digital video may be represented using additional and/or alternative dimensions (e.g., number of layers, number of views/channels, etc.).

Digital video may be coded according to a video coding standard. Video coding standards define the format of a compliant bitstream encapsulating coded video data. A compliant bitstream is a data structure that may be received and decoded by a video decoding device to generate reconstructed video data. Typically, the reconstructed video data is intended for human-consumption (i.e., viewing on a display). Examples of video coding standards include ISO/IEC MPEG-4 Visual and ITU-T H.264 (also known as ISO/IEC MPEG-4 AVC) and High-Efficiency Video Coding (HEVC). HEVC is described in High Efficiency Video Coding (HEVC), Rec. ITU-T H.265, December 2016, which is incorporated by reference, and referred to herein as ITU-T H.265. The ITU-T Video Coding Experts Group (VCEG) and ISO/IEC (Moving Picture Experts Group (MPEG) (collectively referred to as the Joint Video Exploration Team (JVET)) have worked to standardize video coding technology with a compression capability that exceeds that of HEVC. This standardization effort is referred to as the Versatile Video Coding (VVC) project. "Versatile Video Coding (Draft 10)," 20th Meeting of ISO/IEC JTC1/SC29/WG11 7-16 Oct. 2020, Teleconference, document JVET-T2001-v2, which is incorporated by reference herein, and referred to as VVC, represents the current iteration of the draft text of a video coding specification corresponding to the VVC project.

Video coding standards may utilize video compression techniques. Video compression techniques reduce data requirements for storing and/or transmitting video data by exploiting the inherent redundancies in a video sequence. Video compression techniques typically sub-divide a video sequence into successively smaller portions (i.e., groups of pictures within a video sequence, a picture within a group of pictures, regions within a picture, sub-regions within a region, etc.) and utilize intra prediction coding techniques (e.g., spatial prediction techniques within a picture) and inter prediction techniques (i.e., inter-picture techniques (temporal)) to generate difference values between a unit of video data to be coded and a reference unit of video data. The difference values may be referred to as residual data. Syntax elements may relate residual data and a reference coding unit (e.g., intra-prediction mode indices and motion information). Residual data and syntax elements may be entropy coded. Entropy encoded residual data and syntax elements may be included in data structures forming a compliant bitstream.

SUMMARY

In general, this disclosure describes various techniques for coding multi-dimensional data, which may be referred to as a multi-dimensional data set (MDDS) and may include, for example, video data, audio data, and the like. It should be noted that in addition to reducing the data requirements for providing multi-dimensional data for human consumption, the techniques for coding of multi-dimensional data described herein may be useful for other applications. For example, the techniques described herein may be useful for so-called machine consumption. That is, for example, in the case of surveillance, it may be useful for a monitoring application running on a central server to be able quickly identify and track an object from any of a number video feeds. In this case, it is not necessary that the coded video data is capable of being reconstructed to a human consumable form, but only capable of enabling an object to be identified. As described in further detail below, object detection, segmentation and/or tracking (i.e., object recognition tasks) typically involve receiving an image (e.g., a single image or an image included in a video sequence), generating feature data corresponding to the image, analyzing the feature data, and generating inference data, where inference data may indicate types of objects and spatial locations of objects within the image. Spatial locations of objects within an image may be specified by a bounding box having a spatial coordinate (e.g., x,y) and a size (e.g., a height and a width). This disclosure describes techniques for compressing feature data. In particular, this disclosure describes techniques for reducing noise in reconstructed feature data. The techniques described in this disclosure may be particularly useful for allowing object recognition tasks to be distributed across a communication network. For example, in some applications, an acquisition device (e.g., a video camera and accompanying hardware) may have power and/or computational constraints. In this case, generation of feature data could be optimized for the capabilities at the acquisition device, but, the analysis and inference may be better suited to be performed at one or more devices with additional capabilities distributed across a network. In this case, compression of the feature set may facilitate efficient distribution (e.g., reduced bandwidth and/or latency) of object recognition tasks. It should be noted, as described in further detail below, inference data (e.g., spatial locations of objects within an image) may be used to optimize encoding of video data, (e.g., adjust coding parameters to improve relative image quality in regions where objects of interest are present and the like). Further, a video encoding device that utilizes inference data may be located at a distinct location from acquisition device. For example, a distribution network may include multiple distribution servers (at various physical locations) that perform compression and distribution of acquired video.

It should be noted that as used herein the term typical video coding standard or typical video coding may refer to a video coding standard utilizing one or more of the following video compression techniques: video partitioning techniques, intra prediction techniques, inter prediction techniques, residual transformation techniques, reconstructed video filtering techniques, and/or entropy coding techniques for residual data and syntax elements. For example, the term typical video coding standard may refer to any of ITU-T H.264, ITU-T H.265, VVC, and the like, individually or collectively. Further, it should be noted that incorporation by reference of documents herein is for descriptive purposes and should not be construed to limit or create ambiguity with respect to terms used herein. For example, in the case where an incorporated reference provides a different definition of a term than another incorporated reference and/or as the term is used herein, the term should be interpreted in a manner that broadly includes each respective definition and/or in a manner that includes each of the particular definitions in the alternative.

In one example, a method of compressing feature data comprises receiving feature data; performing spatial down sampling on the received feature data by applying a pixel unshuffle operation; and performing channel reduction on the spatially down sampled feature data by applying a non-linear two dimensional convolution with an activation.

The details of one or more examples are set forth in the accompanying drawings and the description below. Other features, objects, and advantages will be apparent from the description and drawings, and from the claims.

DETAILED DESCRIPTION

Video content includes video sequences comprised of a series of frames (or pictures). A series of frames may also be referred to as a group of pictures (GOP). For coding purposes, each video frame or picture may divided into one or more regions, which may be referred to as video blocks. As used herein, the term video block may generally refer to an area of a picture that may be coded (e.g., according to a prediction technique), sub-divisions thereof, and/or corresponding structures. Further, the term current video block may refer to an area of a picture presently being encoded or decoded. A video block may be defined as an array of sample values. It should be noted that in some cases pixel values may be described as including sample values for respective components of video data, which may also be referred to as color components, (e.g., luma (Y) and chroma (Cb and Cr) components or red, green, and blue components (RGB)). It should be noted that in some cases, the terms pixel value and sample value are used interchangeably. Further, in some cases, a pixel or sample may be referred to as a pel. A video sampling format, which may also be referred to as a chroma format, may define the number of chroma samples included in a video block with respect to the number of luma samples included in a video block. For example, for the 4:2:0 sampling format, the sampling rate for the luma component is twice that of the chroma components for both the horizontal and vertical directions.

Figure 1:
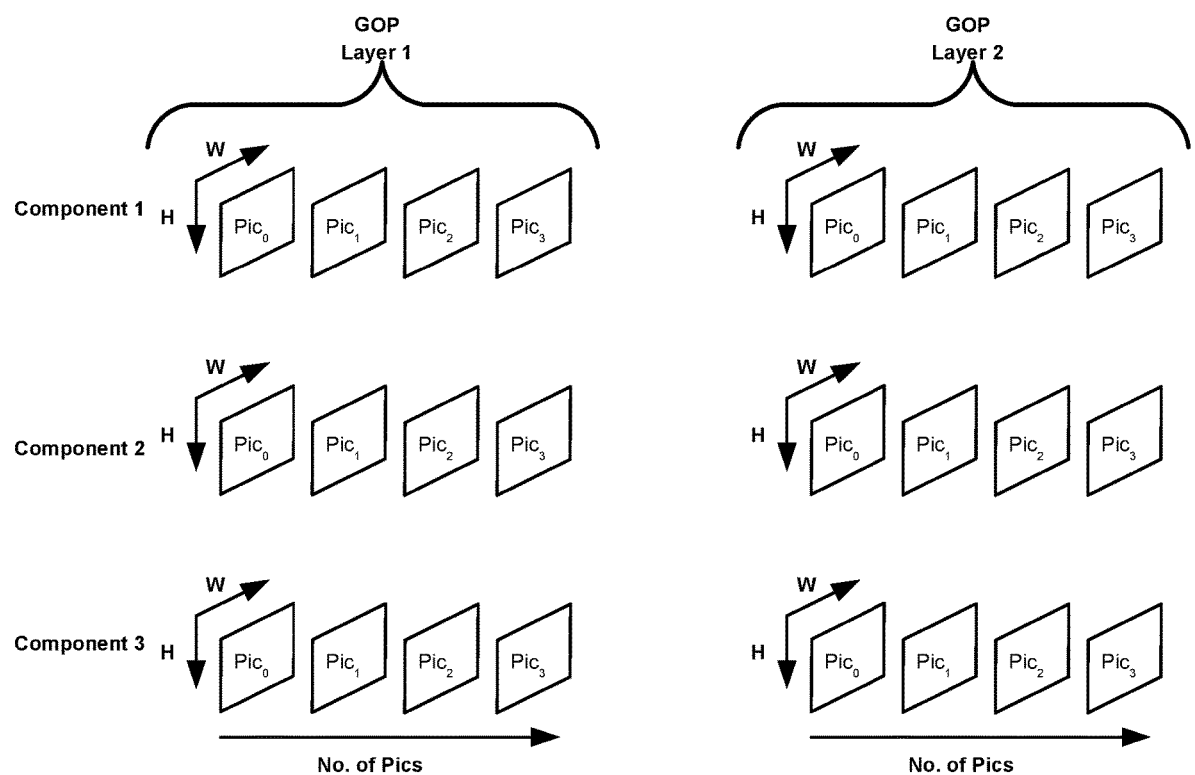
FIG. 1 is a conceptual diagram illustrating video data as a multi-dimensional data set (MDDS) in accordance with one more techniques of this disclosure.

Digital video data including one or more video sequences is an example of multi-dimensional data. FIG. 1 is a conceptual diagram illustrating video data represented as multi-dimensional data. Referring to FIG. 1, the video data includes a respective group of pictures for two layers. For example, each layer may be a view (e.g., a left and a right view) or a temporal layer of video. As illustrated in FIG. 1, each layer includes three components of video data (e.g., RGB, BGR, YCbCr, etc.) and each component includes four pictures having width (W)×height (H) sample values (e.g., 1920×1080, 1280×720, etc.). Thus, in the example illustrated in FIG. 1, there are 24 W×H arrays of sample values and each array of sample values may be described as a two-dimensional data set. Further, the arrays may be grouped into sets according to one or more other dimensions (e.g., channels, components, and/or a temporal sequence of frames). For example, component 1 of the GOP of layer 1 may be described as a three-dimensional data set (i.e., W×H×Number of pictures), all of the components of the GOP of layer 1 may be described as a four-dimensional data set (i.e., W×H×Number of pictures×Number of components), and all of the components of the GOP of layer 1 and the GOP of layer 2 may described as a five-dimensional data set (i.e., W×H×Number of pictures×Number of components×Number of layers).

Multi-layer video coding enables a video presentation to be decoded/displayed as a presentation corresponding to a base layer of video data and decoded/displayed as one or more additional presentations corresponding to enhancement layers of video data. For example, a base layer may enable a video presentation having a basic level of quality (e.g., a High Definition rendering and/or a 30 Hz frame rate) to be presented and an enhancement layer may enable a video presentation having an enhanced level of quality (e.g., an Ultra High Definition rendering and/or a 60 Hz frame rate) to be presented. An enhancement layer may be coded by referencing a base layer. That is, for example, a picture in an enhancement layer may be coded (e.g., using inter-layer prediction techniques) by referencing one or more pictures (including scaled versions thereof) in a base layer. It should be noted that layers may also be coded independent of each other. In this case, there may not be inter-layer prediction between two layers. A sub-bitstream extraction process may be used to only decode and display a particular layer of video. Sub-bitstream extraction may refer to a process where a device receiving a compliant or conforming bitstream forms a new compliant or conforming bitstream by discarding and/or modifying data in the received bitstream.

A video encoder operating according to a typical video coding standard may perform predictive encoding on video blocks and sub-divisions thereof. For example, pictures may be segmented into video blocks which are the largest array of video data that may be predictively encoded and the largest arrays of video data may be further partitioned into nodes. For example, in ITU-T H.265, coding tree units (CTUs) are partitioned into coding units (CUs) according to a quadtree (QT) partitioning structure. A node may be associated with a prediction unit data structure and a residual unit data structure having their roots at the node. A prediction unit data structure may include intra prediction data (e.g., intra prediction mode syntax elements) or inter prediction data (e.g., motion data syntax elements) that may be used to produce reference and/or predicted sample values for the node. For intra prediction coding, a defined intra prediction mode may specify the location of reference samples within a picture. For inter prediction coding, a reference picture may be determined and a motion vector (MV) may identify samples in the reference picture that are used to generate a prediction for a current video block. For example, a current video block may be predicted using reference sample values located in one or more previously coded picture(s) and a motion vector may be used to indicate the location of the reference block relative to the current video block. A motion vector may describe, for example, a horizontal displacement component of the motion vector (i.e., $MV_x$), a vertical displacement component of the motion vector (i.e., $MV_y$), and a resolution for the motion vector (i.e., e.g., pixel precision). Previously decoded pictures may be organized into one or more to reference pictures lists and identified using a reference picture index value. Further, in inter prediction coding, uni-prediction refers to generating a prediction using sample values from a single reference picture and bi-prediction refers to generating a prediction using respective sample values from two reference pictures. That is, in uni-prediction, a single reference picture is used to generate a prediction for a current video block and in bi-prediction, a first reference picture and a second reference picture may be used to generate a prediction for a current video block. In bi-prediction, respective sample values may be combined (e.g., added, rounded, and clipped, or averaged according to weights) to generate a prediction. Further, a typical video coding standard may support various modes of motion vector prediction. Motion vector prediction enables the value of a motion vector for a current video block to be derived based on another motion vector. For example, a set of candidate blocks having associated motion information may be derived from spatial neighboring blocks to the current video block and a motion vector for the current video block may be derived from a motion vector associated with one of the candidate blocks.

As described above, intra prediction data or inter prediction data may be used to produce reference sample values for a current block of sample values. The difference between sample values included in a current block and associated reference samples may be referred to as residual data. Residual data may include respective arrays of difference values corresponding to each component of video data. Residual data may initially be calculated in the pixel domain. That is, from subtracting sample amplitude values for a component of video data. A transform, such as, a discrete cosine transform (DCT), a discrete sine transform (DST), an integer transform, a wavelet transform, or a conceptually similar transform, may be applied to an array of sample difference values to generate transform coefficients. It should be noted that in some cases, a core transform and a subsequent secondary transforms may be applied to generate transform coefficients. A quantization process may be performed on transform coefficients or residual sample values directly (e.g., in the case, of palette coding quantization). Quantization approximates transform coefficients (or residual sample values) by amplitudes restricted to a set of specified values. Quantization essentially scales transform coefficients in order to vary the amount of data required to represent a group of transform coefficients. Quantization may include division of transform coefficients (or values resulting from the addition of an offset value to transform coefficients) by a quantization scaling factor and any associated rounding functions (e.g., rounding to the nearest integer). Quantized transform coefficients may be referred to as coefficient level values. Inverse quantization (or "dequantization") may include multiplication of coefficient level values by the quantization scaling factor, and any reciprocal rounding and/or offset addition operations. It should be noted that as used herein the term quantization process in some instances may refer to generating level values (or the like) in some instances and recovering transform coefficients (or the like) in some instances. That is, a quantization process may refer to quantization in some cases and inverse quantization (which also may be referred to as dequantization) in some cases. Further, it should be noted that although in some of the examples quantization processes are described with respect to arithmetic operations associated with decimal notation, such descriptions are for illustrative purposes and should not be construed as limiting. For example, the techniques described herein may be implemented in a device using binary operations and the like. For example, multiplication and division operations described herein may be implemented using bit shifting operations and the like.

Quantized transform coefficients and syntax elements (e.g., syntax elements indicating a prediction for a video block) may be entropy coded according to an entropy coding technique. An entropy coding process includes coding values of syntax elements using lossless data compression algorithms. Examples of entropy coding techniques include content adaptive variable length coding (CAVLC), context adaptive binary arithmetic coding (CABAC), probability interval partitioning entropy coding (PIPE), and the like. Entropy encoded quantized transform coefficients and corresponding entropy encoded syntax elements may form a compliant bitstream that can be used to reproduce video data at a video decoder. An entropy coding process, for example, CABAC, as implemented in ITU-T H.265 may include performing a binarization on syntax elements. Binarization refers to the process of converting a value of a syntax element into a series of one or more bits. These bits may be referred to as "bins." Binarization may include one or a combination of the following coding techniques: fixed length coding, unary coding, truncated unary coding, truncated Rice coding, Golomb coding, k-th order exponential Golomb coding, and Golomb-Rice coding. For example, binarization may include representing the integer value of 5 for a syntax element as 00000101 using an 8-bit fixed length binarization technique or representing the integer value of 5 as 11110 using a unary coding binarization technique. As used herein, each of the terms fixed length coding, unary coding, truncated unary coding, truncated Rice coding, Golomb coding, k-th order exponential Golomb coding, and Golomb-Rice coding may refer to general implementations of these techniques and/or more specific implementations of these coding techniques. For example, a Golomb-Rice coding implementation may be specifically defined according to a video coding standard. In the example of CABAC, for a particular bin, a context may provide a most probable state (MPS) value for the bin (i.e., an MPS for a bin is one of 0 or 1) and a probability value of the bin being the MPS or the least probably state (LPS). For example, a context may indicate, that the MPS of a bin is 0 and the probability of the bin being 1 is 0.3. It should be noted that a context may be determined based on values of previously coded bins including bins in a current syntax element and previously coded syntax elements.

Figure 2A:
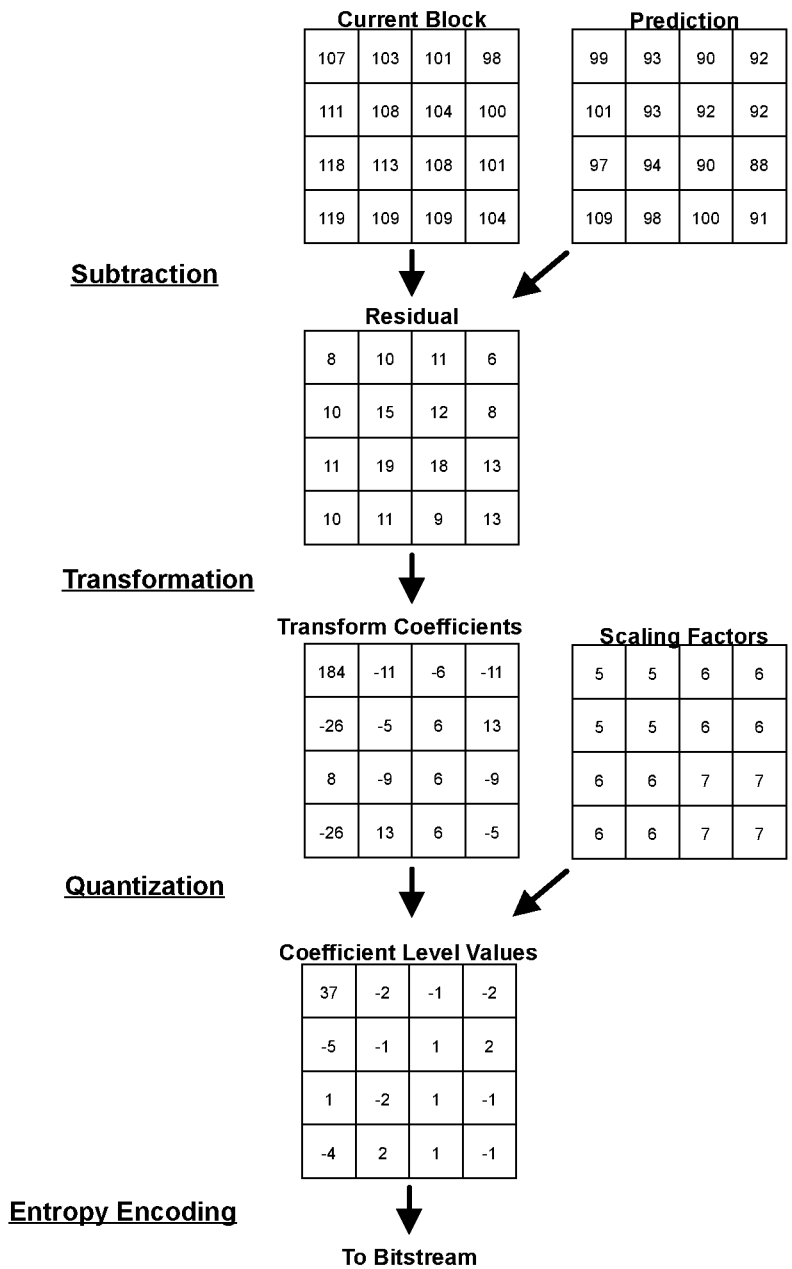
FIGS. 2A-2B are conceptual diagrams illustrating examples of coding a block of video data with typical video coding techniques which may be utilized in accordance with one or more techniques of this disclosure.
Figure 2B:
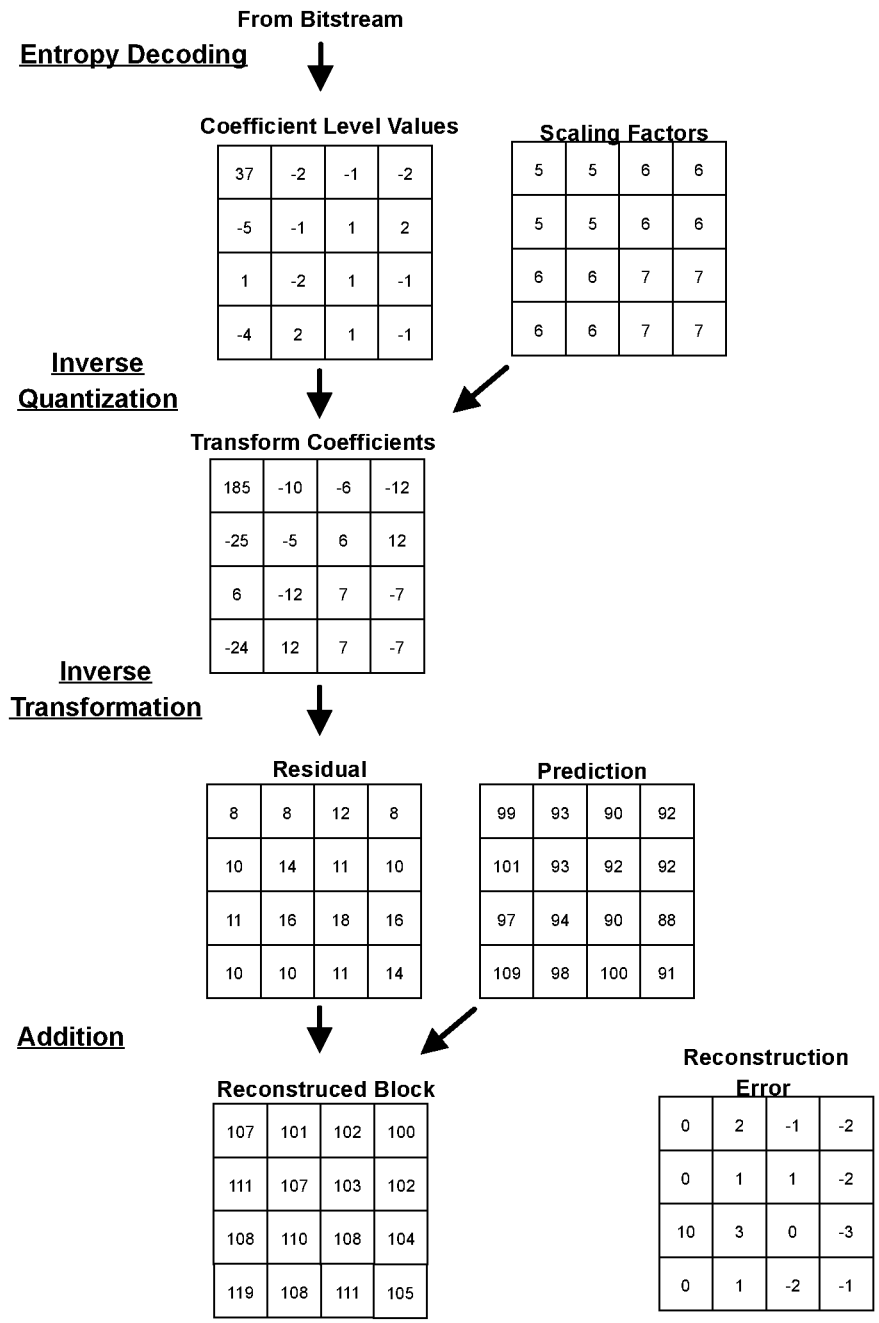

FIGS. 2A-2B are conceptual diagrams illustrating examples of coding a block of video data. As illustrated in FIG. 2A, a current block of video data (e.g., an area of a picture corresponding to a video component) is encoded by generating a residual by subtracting a set of prediction values from the current block of video data, performing a transformation on the residual, and quantizing the transform coefficients to generate level values. As illustrated in FIG. 2B, the current block of video data is decoded by performing inverse quantization on level values, performing an inverse transform, and adding a set of prediction values to the resulting residual. It should be noted that in the examples in FIGS. 2A-2B, the sample values of the reconstructed block differs from the sample values of the current video block that is encoded. In particular, FIG. 2B illustrates a reconstruction error which is the difference between the current block and the reconstructed block. In this manner, coding may be said to be lossy. However, the difference in sample values may be considered minimally perceptible to a viewer of the reconstructed video. That is, the reconstructed video may be said to be fit for human-consumption. However, it should be noted that in some cases, coding video data on a block-by-block basis may result in artifacts (e.g., so-called blocking artifacts, banding artifacts, etc.) For example, blocking artifacts may cause coding block boundaries of reconstructed video data to be visually perceptible to a user. In this manner, reconstructed sample values may be modified to minimize a reconstruction error and/or minimize perceivable artifacts introduced by a video coding process. Such modifications may generally be referred to as filtering. It should be noted that filtering may occur as part of an in-loop filtering process or a post-loop filtering process. For an in-loop filtering process, the resulting sample values of a filtering process may be used for further reference and for a post-loop filtering process the resulting sample values of a filtering process are merely output as part of the decoding process (e.g., not used for subsequent coding).

Typical video coding standards may utilize so-called deblocking (or de-blocking), which refers to a process of smoothing the boundaries of neighboring reconstructed video blocks (i.e., making boundaries less perceptible to a viewer) as part of an in-loop filtering process. In addition to applying a deblocking filter as part of an in-loop filtering process, a typical video coding standard may utilized Sample Adaptive Offset (SAO), where SAO is a process that modifies the deblocked sample values in a region by conditionally adding an offset value. Further, a typical video coding standard may utilized one or more additional filtering techniques. For example, in VVC, a so-called adaptive loop filter (ALF) may be applied.

As described above, for coding purposes, each video frame or picture may divided into one or more regions, which may be referred to as video blocks. It should be noted that in some cases, other overlapping and/or independent regions may be defined. For example, according to typical video coding standards, each video picture may be partitioned to include one or more slices and further partitioned to include one or more tiles. With respect to VVC, slices are required to consist of an integer number of complete tiles or an integer number of consecutive complete CTU rows within a tile, instead of only being required to consist of an integer number of CTUs. Thus, in VVC, a picture may include a single tile, where the single tile is contained within a single slice or a picture may include multiple tiles where the multiple tiles (or CTU rows thereof) may be contained within one or more slices. Further, it should be noted that VVC provides where a picture may be partitioned into subpictures, where a subpicture is a rectangular region of a CTUs within a picture. The top-left CTU of a subpicture may be located at any CTU position within a picture with subpictures being constrained to include one or more slices Thus, unlike a tile, a subpicture is not necessarily limited to a particular row and column position. It should be noted that subpictures may be useful for encapsulating regions of interest within a picture and a sub-bitstream extraction process may be used to only decode and display a particular region of interest. That is, a bitstream of coded video data may include a sequence of network abstraction layer (NAL) units, where a NAL unit encapsulates coded video data, (i.e., video data corresponding to a slice of picture) or a NAL unit encapsulates metadata used for decoding video data (e.g., a parameter set) and a sub-bitstream extraction process forms a new bitstream by removing one or more NAL units from a bitstream.

Figure 3:
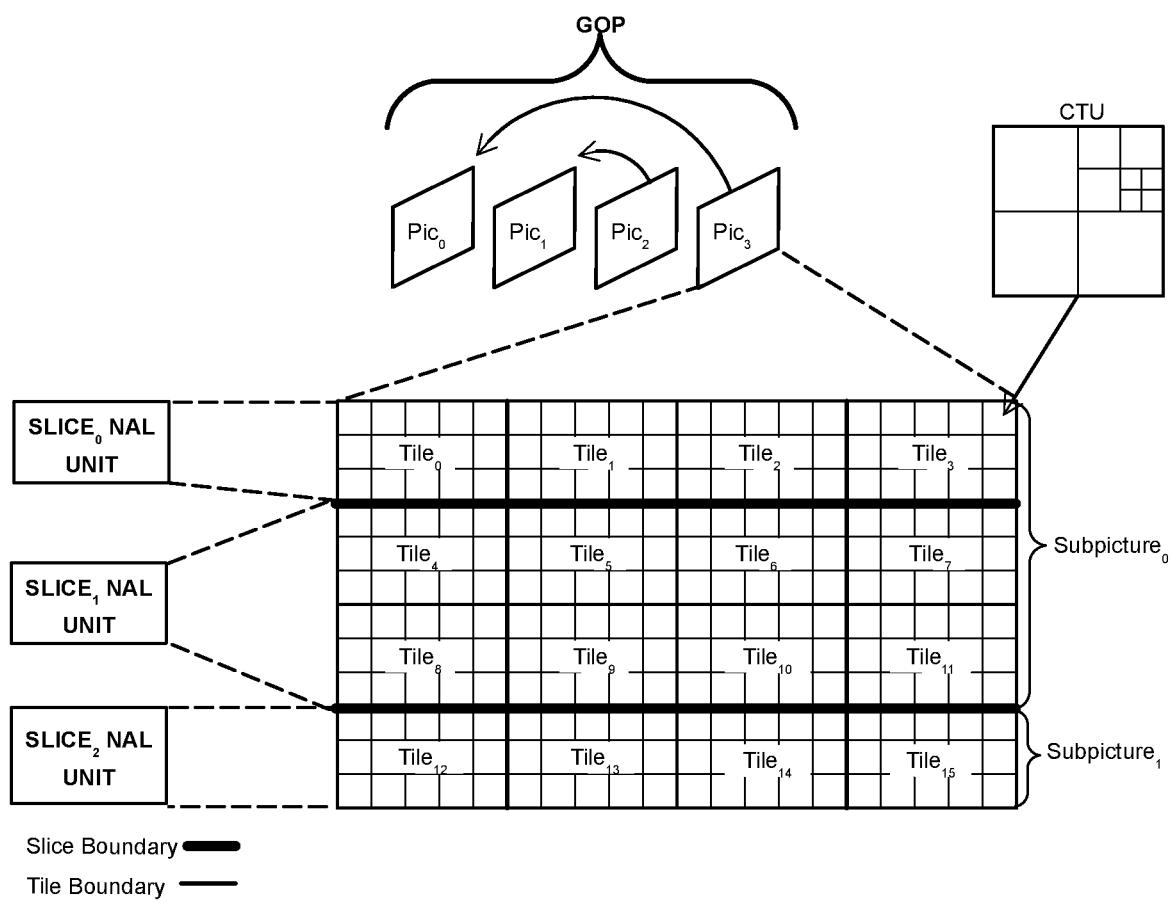
FIG. 3 is a conceptual diagram illustrating coded video data and corresponding data structures associated with typical video coding techniques which may be utilized in accordance with one or more techniques of this disclosure.

FIG. 3 is a conceptual diagram illustrating an example of a picture within a group of pictures partitioned according to tiles, slices, and subpictures and the corresponding coded video data encapsulated into NAL units. It should be noted that the techniques described herein may be applicable to tiles, slices, subpictures, sub-divisions thereof and/or equivalent structures thereto. That is, the techniques described herein may be generally applicable regardless of how a picture is partitioned into regions. In the example illustrated in FIG. 3, $Pic_3$ is illustrated as including 16 tiles (i.e., $Tile_0$ to $Tile_{15}$) and three slices (i.e., $Slice_0$ to $Slice_2$). In the example illustrated in FIG. 3, $Slice_0$ includes four tiles (i.e., $Tile_0$ to $Tile_3$), $Slice_1$ includes eight tiles (i.e., $Tile_4$ to $Tile_{11}$), and $Slice_2$ includes four tiles (i.e., $Tile_{12}$ to $Tile_{15}$). Further, as illustrated in the example of FIG. 3, $Pic_3$ includes two subpictures (i.e., $Subpicture_0$ and $Subpicture_1$), where $Subpicture_0$ includes $Slice_0$ and $Slice_1$ and where $Subpicture_1$ includes $Slice_2$. As described above, subpictures may be useful for encapsulating regions of interest within a picture and a sub-bitstream extraction process may be used in order to selectively decode (and display) a region interest. For example, referring to FIG. 2, $Subpicture_0$ may corresponding to an action portion of a sporting event presentation (e.g., a view of the field) and $Subpicture_1$ may corresponding to a scrolling banner displayed during the sporting event presentation. By organizing a picture into subpictures in this manner, a viewer may be able to disable the display of the scrolling banner. That is, through a sub-bitstream extraction process $Slice_2$ NAL unit may be removed from a bitstream (and thus not decoded and/or displayed) and $Slice_0$ NAL unit and $Slice_1$ NAL unit may be decoded and displayed.

As described above, for inter prediction coding, reference samples in a previously coded picture are used for coding video blocks in a current picture. Previously coded pictures which are available for use as reference when coding a current picture are referred as reference pictures. It should be noted that the decoding order does not necessary correspond with the picture output order, i.e., the temporal order of pictures in a video sequence. According to a typical video coding standard, when a picture is decoded it may be stored to a decoded picture buffer (DPB) (which may be referred to as frame buffer, a reference buffer, a reference picture buffer, or the like). For example, referring to FIG. 3, $Pic_2$ is illustrated as referencing $Pic_1$. Similarly, $Pic_3$ is illustrated as referencing $Pic_0$. With respect to FIG. 3, assuming the picture number corresponds to the decoding order, the DPB would be populated as follows: after decoding $Pic_0$, the DPB would include $\{Pic_0\}$; at the onset of decoding $Pic_1$, the DPB would include $\{Pic_0\}$; after decoding $Pic_1$, the DPB would include $\{Pic_0, Pic_1\}$; at the onset of decoding $Pic_2$, the DPB would include $\{Pic_0, Pic_1\}$. $Pic_2$ would then be decoded with reference to $Pic_1$ and after decoding $Pic_2$, the DPB would include $\{Pic_0, Pic_1, Pic_2\}$. At the onset of decoding $Pic_3$, pictures $Pic_0$ and $Pic_1$ would be marked for removal from the DPB, as they are not needed for decoding $Pic_3$ (or any subsequent pictures, not shown) and assuming $Pic_1$ and $Pic_2$ have been output, the DPB would be updated to include $\{Pic_0\}$. $Pic_3$ would then be decoded by referencing $Pic_0$. The process of marking pictures for removal from a DPB may be referred to as reference picture set (RPS) management.

Figure 4:
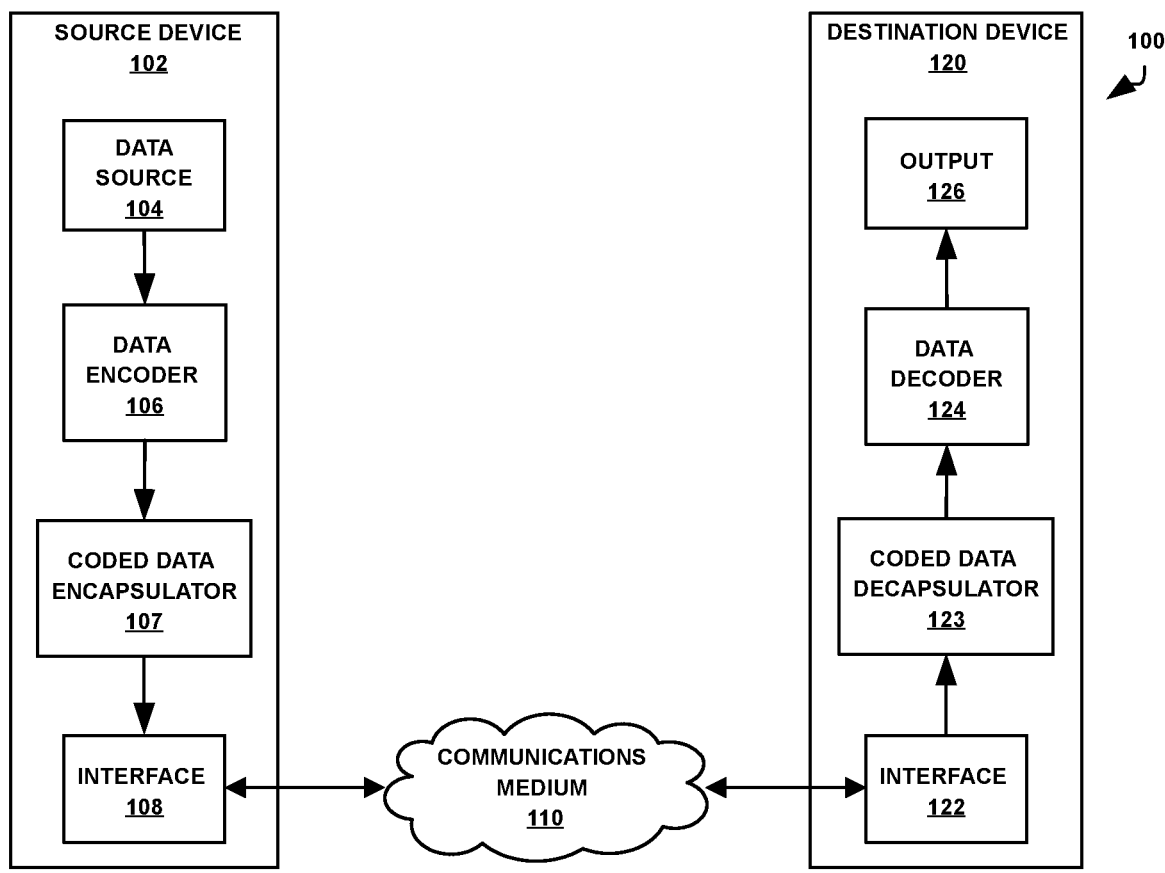
FIG. 4 is a block diagram illustrating an example of a system that may be configured to encode and decode multi-dimensional data according to one or more techniques of this disclosure.

FIG. 4 is a block diagram illustrating an example of a system that may be configured to code (i.e., encode and/or decode) a multi-dimensional data set (MDDS) according to one or more techniques of this disclosure. It should be noted that in some cases an MDDS may be referred to as a tensor. System 100 represents an example of a system that may encapsulate coded data according to one or more techniques of this disclosure. As illustrated in FIG. 4, system 100 includes source device 102, communications medium 110, and destination device 120. In the example illustrated in FIG. 4, source device 102 may include any device configured to encode multi-dimensional data and transmit encoded data to communications medium 110. Destination device 120 may include any device configured to receive encoded data via communications medium 110 and to decode encoded data. Source device 102 and/or destination device 120 may include computing devices equipped for wired and/or wireless communications and may include, for example, set top boxes, digital video recorders, televisions, computers, gaming consoles, medical imaging devices, and mobile devices, including, for example, smartphones.

Communications medium 110 may include any combination of wireless and wired communication media, and/or storage devices. Communications medium 110 may include coaxial cables, fiber optic cables, twisted pair cables, wireless transmitters and receivers, routers, switches, repeaters, base stations, or any other equipment that may be useful to facilitate communications between various devices and sites. Communications medium 110 may include one or more networks. For example, communications medium 110 may include a network configured to enable access to the World Wide Web, for example, the Internet. A network may operate according to a combination of one or more telecommunication protocols. Telecommunications protocols may include proprietary aspects and/or may include standardized telecommunication protocols. Examples of standardized telecommunications protocols include Digital Video Broadcasting (DVB) standards, Advanced Television Systems Committee (ATSC) standards, Integrated Services Digital Broadcasting (ISDB) standards, Data Over Cable Service Interface Specification (DOC SIS) standards, Global System Mobile Communications (GSM) standards, code division multiple access (CDMA) standards, 3rd Generation Partnership Project (3GPP) standards, European Telecommunications Standards Institute (ETSI) standards, Internet Protocol (IP) standards, Wireless Application Protocol (WAP) standards, and Institute of Electrical and Electronics Engineers (IEEE) standards.

Storage devices may include any type of device or storage medium capable of storing data. A storage medium may include a tangible or non-transitory computer-readable media. A computer readable medium may include optical discs, flash memory, magnetic memory, or any other suitable digital storage media. In some examples, a memory device or portions thereof may be described as non-volatile memory and in other examples portions of memory devices may be described as volatile memory. Examples of volatile memories may include random access memories (RAM), dynamic random access memories (DRAM), and static random access memories (SRAM). Examples of non-volatile memories may include magnetic hard discs, optical discs, floppy discs, flash memories, or forms of electrically programmable memories (EPROM) or electrically erasable and programmable (EEPROM) memories. Storage device(s) may include memory cards (e.g., a Secure Digital (SD) memory card), internal/external hard disk drives, and/or internal/external solid state drives. Data may be stored on a storage device according to a defined file format.

Referring again to FIG. 4, source device 102 includes data source 104, data encoder 106, coded data encapsulator 107, and interface 108. Data source 104 may include any device configured to capture and/or store multi-dimensional data. For example, data source 104 may include a video camera and a storage device operably coupled thereto. Data encoder 106 may include any device configured to receive multi-dimensional data and generate a bitstream representing the data. A bitstream may refer to a general bitstream (i.e., binary values representing coded data) or a compliant bitstream where aspects of a compliant bitstream may be defined according to a standard, e.g., a video coding standard. Coded data encapsulator 107 may receive a bitstream and encapsulate the bitstream for purposes of storage and/or transmission. For example, coded data encapsulator 107 may encapsulate bitstream according to a file format. It should be noted that coded data encapsulator 107 need not necessarily be located in the same physical device as data encoder 106. For example, functions described as being performed by data source 104, data encoder 106 and/or coded data encapsulator 107 may be distributed among devices in a computing system (e.g., at distinct server locations, etc.). Interface 108 may include any device configured to receive data generated by coded data encapsulator 107 and transmit and/or store the data to a communications medium. Interface 108 may include a network interface card, such as an Ethernet card, and may include an optical transceiver, a radio frequency transceiver, or any other type of device that can send and/or receive information. Further, interface 108 may include a computer system interface that may enable a file to be stored on a storage device. For example, interface 108 may include a chipset supporting Peripheral Component Interconnect (PCI) and Peripheral Component Interconnect Express (PCIe) bus protocols, proprietary bus protocols, Universal Serial Bus (USB) protocols, I2C, or any other logical and physical structure that may be used to interconnect peer devices.

Referring again to FIG. 4, destination device 120 includes interface 122, coded data decapsulator 123, data decoder 124, and output 126. Interface 122 may include any device configured to receive data from a communications medium. Interface 122 may include a network interface card, such as an Ethernet card, and may include an optical transceiver, a radio frequency transceiver, or any other type of device that can receive and/or send information. Further, interface 122 may include a computer system interface enabling a compliant video bitstream to be retrieved from a storage device. For example, interface 122 may include a chipset supporting PCI and PCIe bus protocols, proprietary bus protocols, USB protocols, I2C, or any other logical and physical structure that may be used to interconnect peer devices. Coded data decapsulator 123 may be configured to receive and extract a bitstream from an encapsulated format. For example, in the case of video coded according to a typical video coding standard stored on physical medium according to a defined file format, coded data decapsulator 123 may be configured to extract a compliant bitstream from the file. Data decoder 124 may include any device configured to receive a bitstream and/or acceptable variations thereof and reproduce multi-dimensional data therefrom. Reproduced multi-dimensional data may then be received by output 126. For example, in the case of video, output 126 may include a display device configured to display video data. Further, it should be noted that data decoder 124 may be configured to output multi-dimensional data to various types of devices and/or sub-components thereof. For example, data decoder 124 may be configured to output data to any communication medium. Further, as described above, the techniques described in this disclosure may be particularly useful for allowing object recognition tasks to be distributed across a communications network. Thus, in some examples, source device 102 may represent an acquisition device where data source 104 acquires video data and generates corresponding feature data, data encoder 106 compresses feature data e.g., according to one or more techniques described herein, and destination device 120 is a device that performs analysis and inference on the reconstructed feature data. It should be noted, for example, with respect to the example described above, data encoder 106 and data decoder 124 may be configured to code multiple types of data. For example, in the case of video data, data encoder 106 may receive source video and corresponding feature data and generate a compliant bitstream according to a video coding standard and generate a bitstream including compressed feature data, e.g., according to the techniques described herein. In this case, in one example, destination device 120 may be a headend type of device that reconstructs video (e.g., a high quality representation) and the feature data from a received bitstreams and encodes the reconstructed video based on the feature data, e.g., at output 126, for further distribution (e.g., to nodes in a media distribution system).

Figure 5:
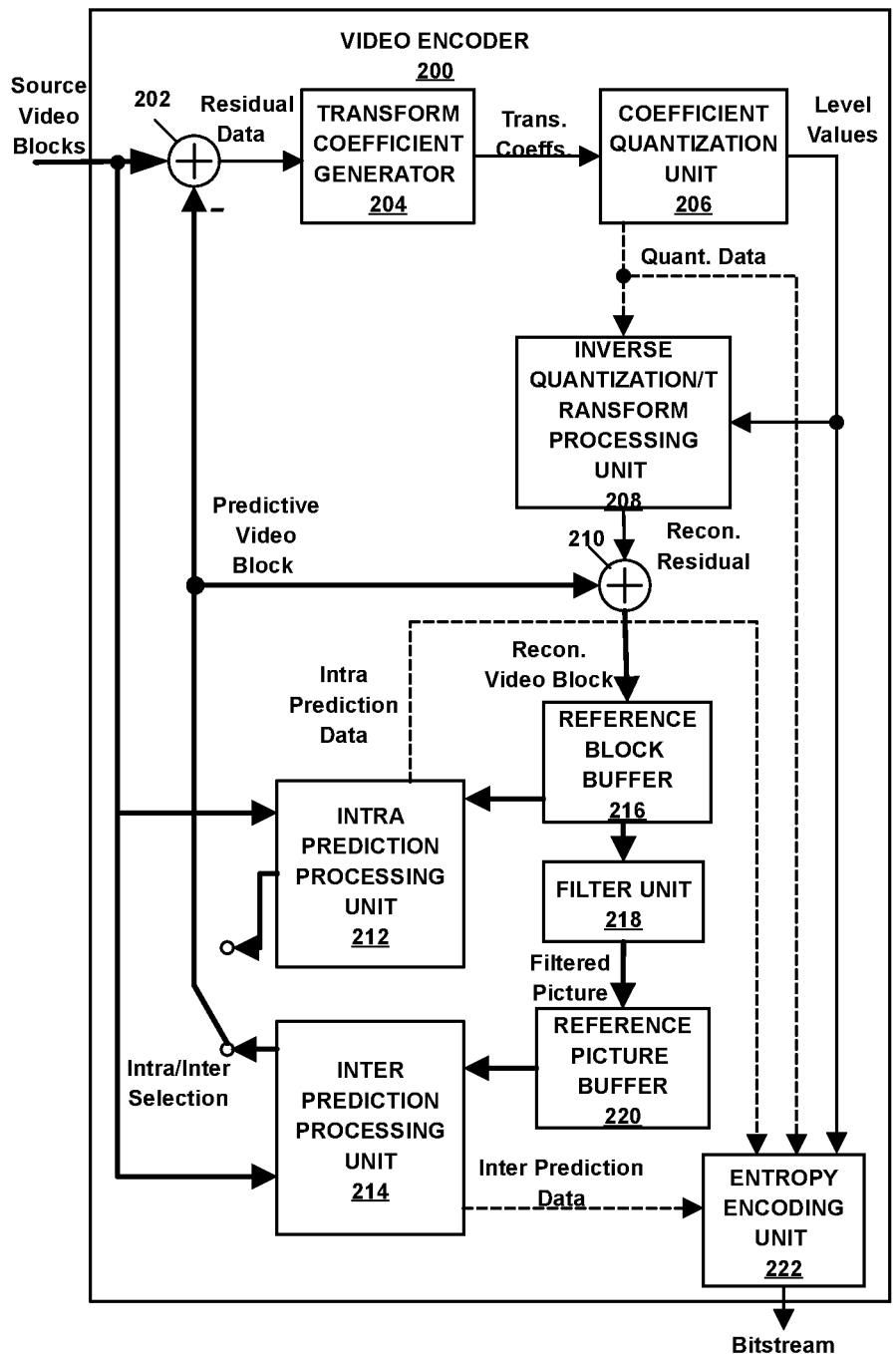
FIG. 5 is a block diagram illustrating an example of a video encoder that may be configured to encode video data in accordance with typical video encoding techniques which may be utilized with one or more techniques of this disclosure.

As described above, data encoder 106 may include any device configured to receive multi-dimensional data and an example of multi-dimensional data includes video data which may be coded according to a typical video coding standard. As described in further detail below, in some example, techniques for coding multi-dimensional data described herein may be utilized in conjunction with techniques utilized in typical video standards. FIG. 5 is a block diagram illustrating an example of a video encoder that may be configured to encode video data in accordance with typical video encoding techniques. It should be noted that although example video encoder 200 is illustrated as having distinct functional blocks, such an illustration is for descriptive purposes and does not limit video encoder 200 and/or sub-components thereof to a particular hardware or software architecture. Functions of video encoder 200 may be realized using any combination of hardware, firmware, and/or software implementations. Video encoder 200 may perform intra prediction coding and inter prediction coding of picture areas, and, as such, may be referred to as a hybrid video encoder. In the example illustrated in FIG. 5, video encoder 200 receives source video blocks. In some examples, source video blocks may include areas of picture that has been divided according to a coding structure. For example, source video data may include CTUs, sub-divisions thereof, and/or another equivalent coding unit. In some examples, video encoder 200 may be configured to perform additional sub-divisions of source video blocks. It should be noted that the techniques described herein are generally applicable to video coding, regardless of how source video data is partitioned prior to and/or during encoding. In the example illustrated in FIG. 5, video encoder 200 includes summer 202, transform coefficient generator 204, coefficient quantization unit 206, inverse quantization and transform coefficient processing unit 208, summer 210, intra prediction processing unit 212, inter prediction processing unit 214, reference block buffer 216, filter unit 218, reference picture buffer 220, and entropy encoding unit 222. As illustrated in FIG. 5, video encoder 200 receives source video blocks and outputs a bitstream.

In the example illustrated in FIG. 5, video encoder 200 may generate residual data by subtracting a predictive video block from a source video block. Summer 202 represents a component configured to perform this subtraction operation. In one example, the subtraction of video blocks occurs in the pixel domain. Transform coefficient generator 204 applies a transform, such as a DCT or a conceptually similar transform, to the residual block or sub-divisions thereof (e.g., four 8×8 transforms may be applied to a 16×16 array of residual values) to produce a set of transform coefficients. Transform coefficient generator 204 may be configured to perform any and all combinations of the transforms included in the family of discrete trigonometric transforms, including approximations thereof. Transform coefficient generator 204 may output transform coefficients to coefficient quantization unit 206. Coefficient quantization unit 206 may be configured to perform quantization on the transform coefficients. The quantization process may reduce the bit depth associated with some or all of the coefficients. The degree of quantization may alter the rate-distortion (i.e., bit-rate vs. quality of video) of encoded video data. In a typical video coding standard, the degree of quantization may be modified by adjusting a quantization parameter (QP) and a quantization parameter may be determined based on signaled and/or predicted values. Quantization data may include any data used to determine a QP for quantizing a particular set of transform coefficients. As illustrated in FIG. 5, quantized transform coefficients (which may be referred to as level values) are output to inverse quantization and transform coefficient processing unit 208. Inverse quantization and transform coefficient processing unit 208 may be configured to apply an inverse quantization and an inverse transformation to generate reconstructed residual data. As illustrated in FIG. 5, at summer 210, reconstructed residual data may be added to a predictive video block. Reconstructed video blocks may be stored to reference block buffer 216 and used as reference for predicting subsequent blocks (e.g., using intra prediction).

Referring again to FIG. 5, intra prediction processing unit 212 may be configured to select an intra prediction mode for a video block to be coded. Intra prediction processing unit 212 may be configured to evaluate reconstructed blocks stored to reference block buffer 216 and determine an intra prediction mode to use to encode a current block. In a typical video coding standard, possible intra prediction modes may include planar prediction modes, DC prediction modes, and angular prediction modes. As illustrated in FIG. 5, intra prediction processing unit 212 outputs intra prediction data (e.g., syntax elements) to entropy encoding unit 222.

Referring again to FIG. 5, inter prediction processing unit 214 may be configured to perform inter prediction coding for a current video block. Inter prediction processing unit 214 may be configured to receive source video blocks, select a reference picture from pictures stored to the reference buffer 220, and calculate a motion vector for a video block. A motion vector may indicate the displacement of a prediction unit of a video block within a current video picture relative to a predictive block within a reference picture. Inter prediction coding may use one or more reference pictures. Inter prediction processing unit 214 may be configured to select predictive block(s) by calculating a pixel difference determined by, for example, sum of absolute difference (SAD), sum of square difference (SSD), or other difference metrics. As described above, a motion vector may be determined and specified according to motion vector prediction. Inter prediction processing unit 214 may be configured to perform motion vector prediction, as described above. Inter prediction processing unit 214 may be configured to generate a predictive block using the motion prediction data. For example, inter prediction processing unit 214 may locate a predictive video block within reference picture buffer 220. It should be noted that inter prediction processing unit 214 may further be configured to apply one or more interpolation filters to a reconstructed residual block to calculate sub-integer pixel values for use in motion estimation. Inter prediction processing unit 214 may output motion prediction data for a calculated motion vector to entropy encoding unit 222.

Referring again to FIG. 5, filter unit 218 receives reconstructed video blocks from reference block buffer 216 and outputs a filtered picture to reference picture buffer 220. That is, in the example of FIG. 5, filter unit 218 is part of an in-loop filtering process. Filter unit 218 may be configured to perform one or more of deblocking, SAO filtering, and/or ALF filtering, for example, according to a typical video coding standard. Entropy encoding unit 222 receives data representing level values (i.e., quantized transform coefficients) and predictive syntax data (i.e., intra prediction data and motion prediction data). It should be noted that data representing level values may include for example, flags, absolute values, sign values, delta values, and the like. For example, significant coefficient flags and the like as provided in a typical video coding standard. Entropy encoding unit 518 may be configured to perform entropy encoding according to one or more of the techniques described herein and output a bitstream, for example, a compliant bitstream according to a typical video coding standard.

Figure 6:
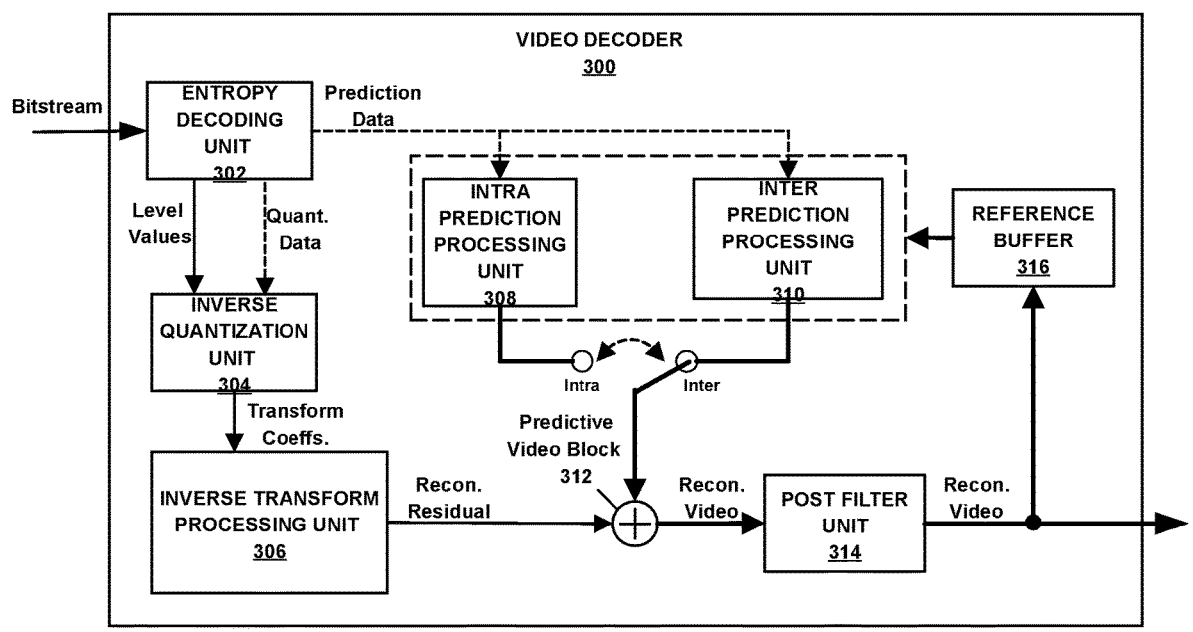
FIG. 6 is a block diagram illustrating an example of a video decoder that may be configured to decode video data in accordance with typical video decoding techniques which may be utilized with one or more techniques of this disclosure.

Referring again to FIG. 4, as described above, data decoder 124 may include any device configured to receive coded multi-dimensional data and an example of coded multi-dimensional data includes video data which may be coded according to a typical video coding standard. FIG. 6 is a block diagram illustrating an example of a video decoder that may be configured to decode video data in accordance with typical video decoding techniques which may be utilized with one or more techniques of this disclosure. In the example illustrated in FIG. 6, video decoder 300 includes an entropy decoding unit 302, inverse quantization unit 304, inverse transform coefficient processing unit 306, intra prediction processing unit 308, inter prediction processing unit 310, summer 312, post filter unit 314, and reference buffer 316. It should be noted that although example video decoder 300 is illustrated as having distinct functional blocks, such an illustration is for descriptive purposes and does not limit video decoder 300 and/or sub-components thereof to a particular hardware or software architecture. Functions of video decoder 300 may be realized using any combination of hardware, firmware, and/or software implementations.

As illustrated in FIG. 6, entropy decoding unit 302 receives an entropy encoded bitstream. Entropy decoding unit 302 may be configured to decode syntax elements and level values from the bitstream according to a process reciprocal to an entropy encoding process. Entropy decoding unit 302 may be configured to perform entropy decoding according any of the entropy coding techniques described above and/or determine values for syntax elements in an encoded bitstream in a manner consistent with a video coding standard. As illustrated in FIG. 6, entropy decoding unit 302 may determine level values, quantization data, and prediction data from a bitstream. In the example, illustrated in FIG. 6, inverse quantization unit 304 receives quantization data and level values and outputs transform coefficients to inverse transform coefficient processing unit 306. Inverse transform coefficient processing unit 306 outputs reconstructed residual data. Thus, inverse quantization unit 304 and inverse transform coefficient processing unit 306 operate in a similar manner to inverse quantization and transform coefficient processing unit 208 described above.

Referring again to FIG. 6, reconstructed residual data is provided to summer 312. Summer 312 may add reconstructed residual data to a predictive video block and generate reconstructed video data. A predictive video block may be determined according to a predictive video technique (i.e., intra prediction and inter frame prediction). Intra prediction processing unit 308 may be configured to receive intra prediction syntax elements and retrieve a predictive video block from reference buffer 316. Reference buffer 316 may include a memory device configured to store one or more pictures (and corresponding regions) of video data. Intra prediction syntax elements may identify an intra prediction mode, such as the intra prediction modes described above. Inter prediction processing unit 310 may receive inter prediction syntax elements and generate motion vectors to identify a prediction block in one or more reference frames stored in reference buffer 316. Inter prediction processing unit 310 may produce motion compensated blocks, possibly performing interpolation based on interpolation filters. Identifiers for interpolation filters to be used for motion estimation with sub-pixel precision may be included in the syntax elements. Inter prediction processing unit 310 may use interpolation filters to calculate interpolated values for sub-integer pixels of a reference block. Post filter unit 314 may be configured to perform filtering on reconstructed video data. For example, post filter unit 314 may be configured to perform deblocking based on parameters specified in a bitstream. Further, it should be noted that in some examples, post filter unit 314 may be configured to perform proprietary discretionary filtering (e.g., visual enhancements, such as, mosquito noise reduction). As illustrated in FIG. 6, a reconstructed video may be output by video decoder 300, for example, to a display.

As described above with respect to FIGS. 2A-2B, a block of video data, i.e., an array of data included within a MDDS, may be encoded by generating a residual, performing a transformation on the residual, and quantizing the transform coefficients to generate level values and decoded by performing inverse quantization on level values, performing an inverse transform, and adding the resulting residual to a prediction. An array of data included within a MDDS may also be coded using so-called autoencoding techniques. Generally, autoencoding may refer to a learning technique that imposes a bottleneck into a network to force a compressed representation of an input. That is, an autoencoder may be referred to as a non-linear Primary Component Analysis (PCA) that tries to represent input data in a lower dimensional space. An example of an autoencoder includes a convolution autoencoder that compresses an input using a single convolution operation. Convolution autoencoders may be utilized in so-called deep convolutional neural networks (CNNs).

Figure 7A:
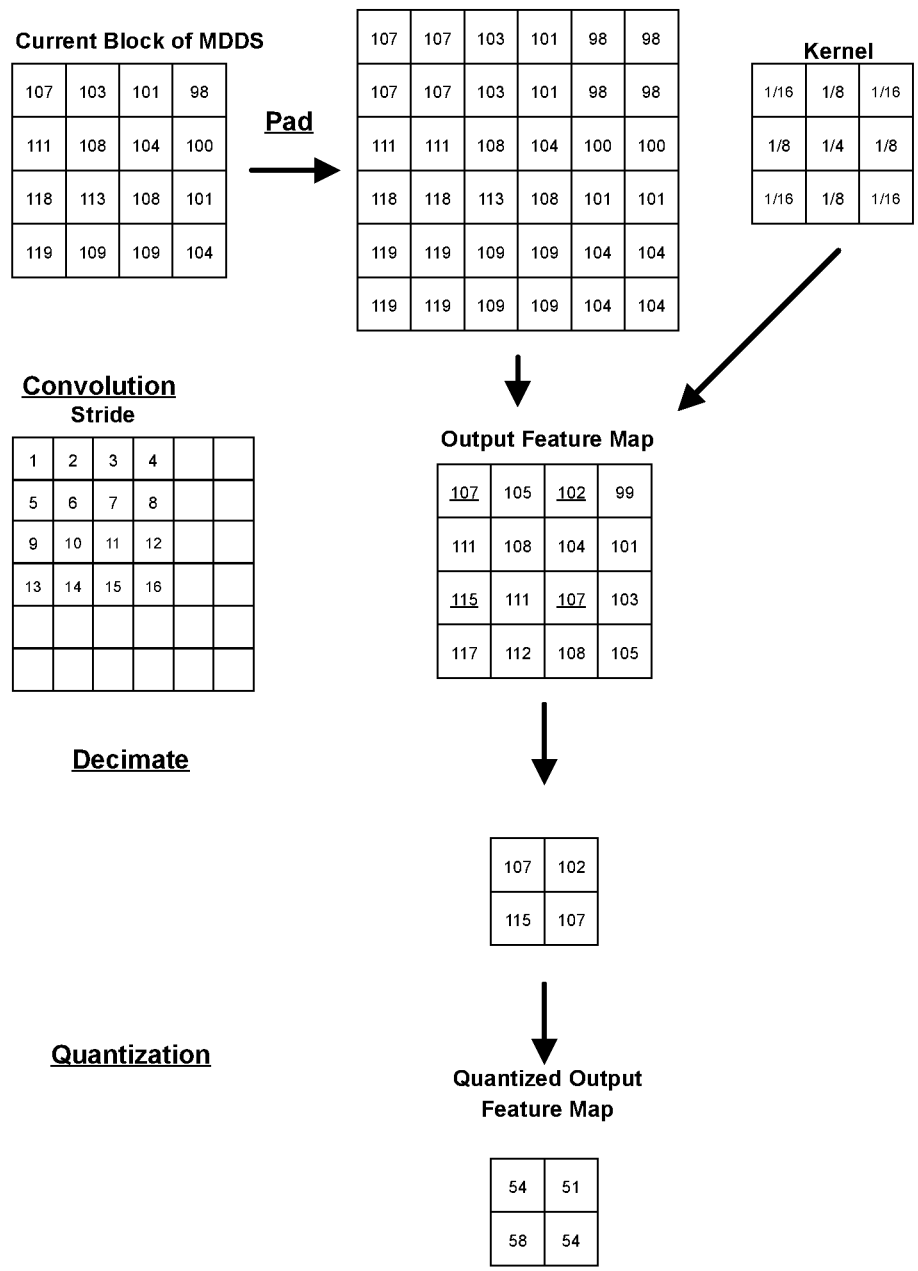
FIGS. 7A-7B are conceptual diagrams illustrating examples of coding a block of video data in accordance with autoencoding techniques which may be utilized with one or more techniques of this disclosure.

FIG. 7A illustrates an example of autoencoding using a two-dimensional discrete convolution. In the example illustrated in FIG. 7A, a discrete convolution is performed on a current block of video data (i.e., the block of video data illustrated in FIG. 2A) to generate an output feature map (OFM), where the discrete convolution is defined according to a padding operation, a kernel, and a stride function. It should be noted that although FIG. 7A illustrates a discrete convolution on a two-dimensional input using a two-dimensional kernel, discrete convolution may be performed on higher dimensional data sets. For example, discrete convolution may be performed a three-dimensional input using a three-dimensional kernel (e.g., a cubic kernel). In the case of video data, such a convolution may down-sample video in both the spatial and temporal dimensions. Further, it should be noted that although the example illustrated in FIG. 7A illustrates where a square kernel is convolved over a square input, in other examples, the kernel and/or the input may be non-square rectangles. In the example illustrated in FIG. 7A, the 4×4 array of video data is upscaled to a 6×6 array by duplicating the nearest value at the boundary. This is an example of a padding operation. In general, a padding operation increases the size of an input data set by inserting values. In a typical case, zero values may be inserted into an array in order to achieve a particular sized array prior to convolution. It should be noted that padding functions may include one or more of inserting zero's (or another default value) at particular locations, symmetric extension, replicate extension, circular extension at various positions of a data set. For example, for symmetric extension, input array values outside the bounds of the array may be computed by mirror-reflecting the array across the array border along the dimension being padded. For replicate extension, input array values outside the bounds of the array may be assumed to equal the nearest array border value along the dimension being padded. For circular extension, input array values outside the bounds of the array may be computed by implicitly assuming the input array is periodic along the dimension being padded.

Referring again to FIG. 7A, an output feature map is generated by convolving a 3×3 kernel over the 6×6 array according to a stride function. That is, the stride illustrated in FIG. 7A illustrates the top-left position of the kernel at a corresponding position in the 6×6 array. That is, for example, at stride position 1, the top-left of the kernel is aligned with the top-left of the 6×6 array. At each discrete position of the stride, the kernel is used to generate a weighted sum. Generated weighted sum values are then used to populate a corresponding position in an output feature map. For example, at position 1 of the stride function, the output of 107 ($107=\frac{1}{16}*107+\frac{1}{8}*107+\frac{1}{16}*103+\frac{1}{8}*107+\frac{1}{4}*107+\frac{1}{8}*103+\frac{1}{16}*111+\frac{1}{8}*111+\frac{1}{16}*108$) corresponds to the top-left position of the output feature map. It should be noted that in the example illustrated in FIG. 7A, the stride function corresponds to a so-called unit stride, i.e., the kernel slides across every position of the input. In other examples, non-unit or arbitrary strides may be used. For example, a stride function may include only the positions 1, 4, 13, and 16 in the stride illustrated in FIG. 7A to generate a 2×2 output feature map. In this manner, in the case of two-dimensional discrete convolution, for an input data having a width, $w_i$, and height, $h_i$, an arbitrary padding function, an arbitrary stride function, and a kernel having a width, $w_k$, and height, $h_k$, may be used to create an output feature map having a desired width, $w_o$, and height, $h_o$. It should be noted, that similar to a kernel, a stride function may be defined for multiple dimensions (e.g., a three-dimensional stride function may be defined). It should be noted that in some cases, for particular kernel size and stride function, the kernel may lie outside of the support region. In some cases, the output at such a position is not valid. In some cases, a corresponding value is derived for the out-of-bound support position, e.g., according to a padding operation.

It should be noted that in the example illustrated in FIG. 7A, the 4×4 array of video data is illustrated as being down-sampled to a 2×2 output feature map by selecting the underlined values of the 4×4 output feature map. The 4×4 output feature map is shown for illustration purposes. That is, to illustrate a typical unit stride function. In a typical case, computations would not be made for discarded values. In a typical case, as described above, the 2×2 output feature map could/would be derived by performing the weighted sum operation with the kernel at positions 1, 4, 13, and 16. However, it should be noted that in other examples, so-called pooling operations, such as finding a maximum pooling, may be performed on an input (prior to performing the convolution) or an output feature map to down-sample a data set. For example, in the example illustrated in FIG. 7A, the 2×2 output feature map may be generated by taking a local maximum of each 2×2 region in the 4×4 output feature map (i.e., 108, 104, 117, and 108). That is, there may be numerous ways to perform autoencoding that includes performing convolutions on input data in order to represent the data as a down-sampled output feature map.

Finally, as indicated in FIG. 7A, an output feature map may be quantized in a manner similar to that described above with respect to transform coefficients (e.g., amplitudes restricted to a set of specified values). In the example illustrated in FIG. 7A, the amplitudes of the 2×2 output feature map are quantized by division by 2. In this case, quantization may be described as a uniform quantization defined by:

QOFM($x,y$)=round(OFM($x,y$)/Stepsize)

Where,
QOFM(x,y) is a quantized value corresponding position (x, y);
OFM(x,y) is a value corresponding position (x, y);
Stepsize is a scalar; and
round(x) rounds x to the nearest integer.

Thus, for the example illustrated in FIG. 7A, Stepsize=2 and x=0 . . . 1, y=0 . . . 1. In this example, at an autodecoder, the inverse quantization for deriving the recovered output feature map, ROFM(x,y) may be defined as follows:

ROFM($x,y$)=QOFM($x,y$)*Stepsize

It should be noted that in one example, a respective Stepsize may be provided for each position, i.e., Stepsize$_{(x,y)}$. It should be noted that this may be referred to a uniform quantization, as across the range of possible amplitudes at a position in OFM(x,y) the quantization (i.e., scaling is same).

In one example, quantization may be non-uniform. That is, the quantization may differ across the range of possible amplitudes. For example, respective Stepsizes may vary across a range of values. That is, for example, in one example, a non-uniform quantization function may be defined as follows:

QOFM(x,y) = round(OFM(x,y)/Stepsize$_i$)
Where
Stepsize$_i$ = scalar$_0$: if OFM(x,y) < value$_0$
scalar$_1$: if value$_0$ ≤ OFM(x,y) ≤ value$_1$
...
scalar$_{N-1}$: if value$_{N-2}$ ≤ OFM(x,y) ≤ value$_{N-1}$
scalar$_N$: if OFM(x,y) > value$_{N-1}$ Further, it should be noted that as described above, quantization may include mapping an amplitude in a range to a particular value. That is, for example, in one example, non-uniform quantization function may be defined as:

$$QOFM(x, y) = \begin{cases} s_o & OFM(x, y) < value_0 \\ s_1 & value_0 \leq OFM(x, y) < value_1 \\ \vdots & \vdots \\ s_N & value_N \leq OFM(x, y) \end{cases}$$

Where, $value_{i+1} > value_i$ and $value_{i+1} - value_i$ does not have to equal $value_{j+1} - value_j$ for $i \neq j$ The inverse of the non-uniform quantization process, may be defined as:

$$ROFM(x, y) = \begin{cases} r_o & QOFM(x, y) = s_0 \\ r_1 & QOFM(x, y) = s_1 \\ \vdots & \vdots \\ r_N & QOFM(x, y) = s_N \end{cases}$$

The inverse process corresponds to a lookup table and may be signaled in the bitstream.

Finally, it should be noted that combinations of the quantization techniques described above may be utilized and in some cases, specific quantization functions may be specified and signaled. For example, quantization tables may be signaled in a manner similar to signaling of quantization tables in VVC.

Referring again to FIG. 7A, although not shown, but as described in further detail below, entropy encoding may be performed on quantized output feature map data. Thus, as illustrated in FIG. 7A, the quantized output feature map is a compressed representation of the current video block.

Figure 7B:
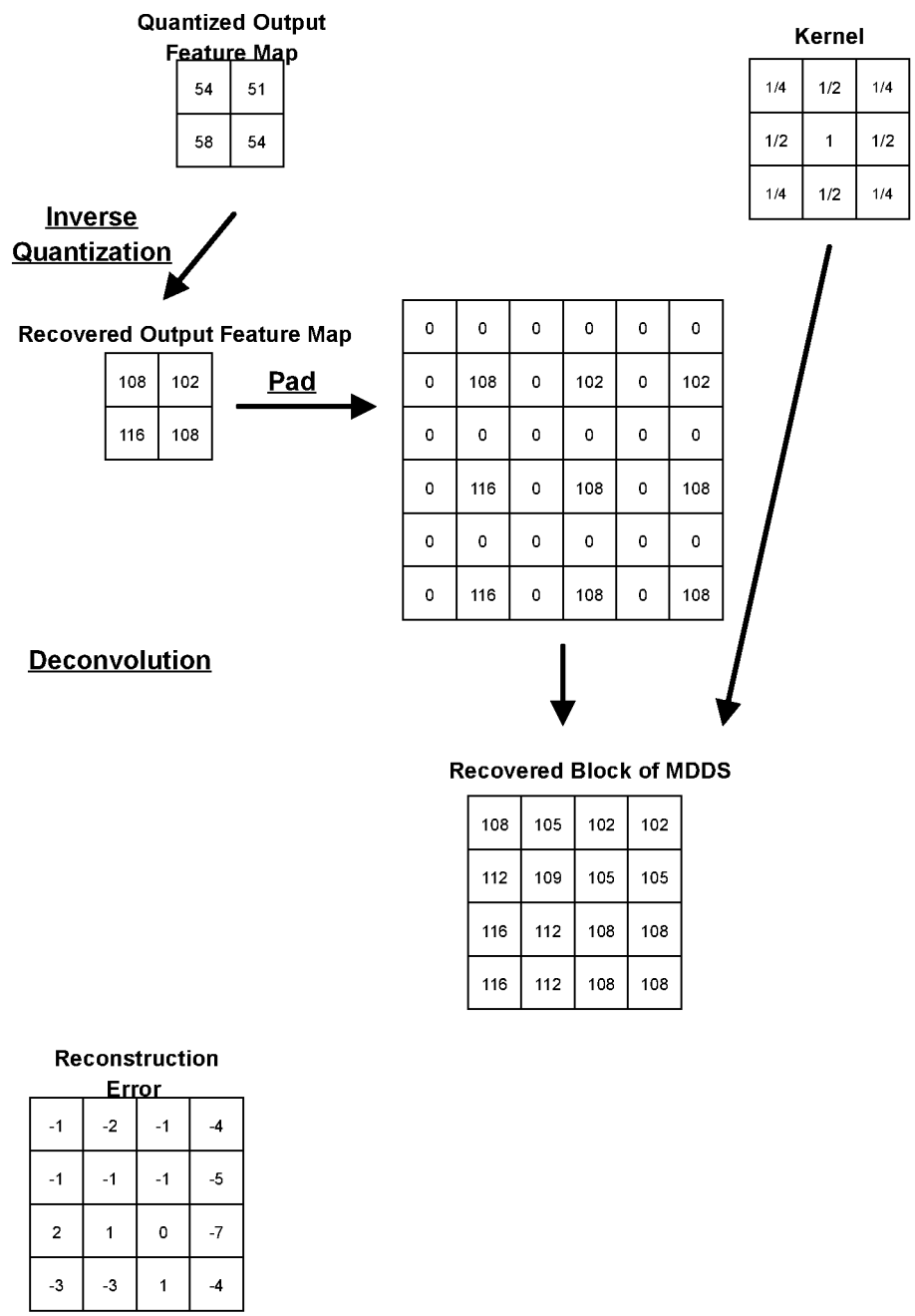

As illustrated in FIG. 7B, the current block of video data is decoded by performing inverse quantization on the quantized output feature map, performing a padding operation on the recovered output feature map, and convolving the padded output feature map with a kernel. Similar to FIG. 2B, FIG. 7B illustrates a reconstruction error which is the difference between current block and recovered block. It should be noted that the padding operation performed in FIG. 7B is different than the padding operation performed in FIG. 7A and the kernel utilized in FIG. 7B is different than the kernel utilized in FIG. 7A. That is, in the example illustrated in FIG. 7B, zero values are interleaved with the recovered output feature map, and the 3×3 kernel in convolved over the 6×6 input using a unit stride resulting in the recovered block of MDDS. It should be noted that such a convolution operation performed during autodecoding may be referred to a convolution-transpose (convT). It should be noted that a convolution-transpose, in some cases may define a specific relationship between kernels at each of an autoencoder and autodecoder and in other cases, the term convolution-transpose may be more general. It should be noted that there may be several ways in which autodecoding may be implemented. That is, FIG. 7B provides an illustrative case of a convolution-transpose and there numerous ways in which a convolution-transpose (and autodecoding) may be performed and/or implemented. The techniques described herein are generally applicable to autodecoding. For example, with respect to the example illustrated in FIG. 7B, in a simple case, each of the four values illustrated in the recovered output feature map may be duplicated to create a 4×4 array (i.e., an array having its top-left four values as 108, its top-right four values as 102, its bottom-left four values as 116, and its bottom-right four values as 108). Further, other padding operations, kernels, and/or stride functions may be utilized. Essentially, at an autodecoder, an autodecoding process may be selected in a manner that achieves a desired objective, for example, reducing a reconstruction error. It should be noted the other desired objectives may include reducing visual artifacts, increasing the probability an object is detected, etc.

As described above, techniques for coding multi-dimensional data described herein may be utilized in conjunction with techniques utilized in typical video standards. As described above, with respect to FIG. 5, the degree of quantization applied during video encoding may alter the rate-distortion of encoded video data. Further, a typical video encoder selects an intra prediction mode for intra prediction and reference frame(s) and motion information for inter prediction. These selections also alter the rate-distortion. That is, in general, video encoding includes selecting video encoding parameters in a manner that optimizes and/or provides a desired rate-distortion. According to the techniques herein, in one example, autoencoding may be used during video encoding in order to select video encoding parameters in order to achieve a desired rate-distortion. That is, for example as described above, inference data (e.g., where objects are located within an image) derived from feature data may be used to optimize the encoding of video data, (e.g., adjust coding parameters to improve relative image quality in regions where objects of interest are present).

Figure 8:
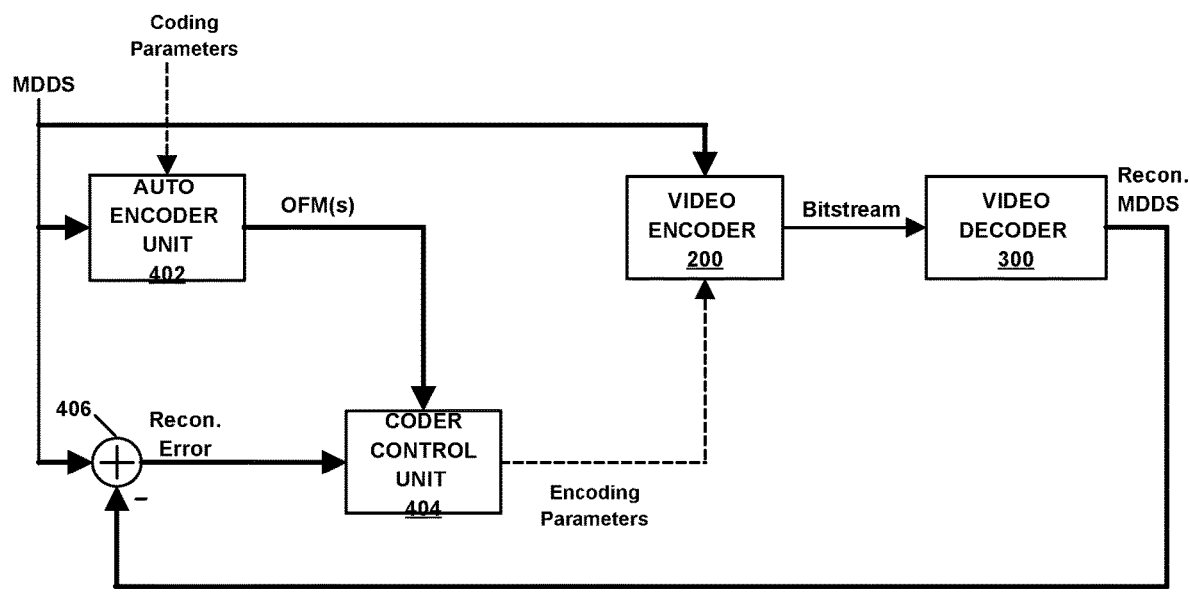
FIG. 8 is a block diagram illustrating an example of a coding system that may encode a multi-dimensional data set in accordance with one or more techniques of this disclosure.

FIG. 8 is an example of a coding system that may encode a multi-dimensional data set in accordance with one or more techniques of this disclosure. In the example illustrated in FIG. 8, autoencoder unit 402 receives a multi-dimensional data set, that is, video data, and generates one or more output feature maps corresponding to the video data. That is, for example, autoencoder may perform two-dimensional discrete convolution, as described above, on regions within a video sequence. It should be noted that in FIG. 8, the coding parameters illustrated as being received by autoencoder unit 402 correspond to selection of parameters for performing autoencoding. That is, for example, in the case of two-dimensional discrete convolution, selection of $w_i$ and $h_i$, selection of a padding function, selection of stride function, and selection of a kernel. As illustrated in FIG. 8, coder control unit 404 receives the output feature maps and provides coding parameters (e.g., a QP, intra prediction modes, motion information, etc.) to video encoder 200. Video encoder 200 receives video data and provides a bitstream based on the encoding parameters according to a typical video coding standard as described above. Video decoder 300 receives the bitstream and reconstructs the video data according to a typical video coding standard as described above. As illustrated in FIG. 8, summer 406, subtracts the reconstructed video data from the source video data and generates a reconstruction error, i.e., e.g., in a manner similar to that described above with respect to FIG. 2B. As illustrated in FIG. 8, coder control unit 404 receives the reconstruction error. It should be noted that although not explicitly shown in FIG. 8, coder control unit 404 may determine a bit-rate corresponding to a bitstream. Thus, coder control unit 404 may correlate output feature map(s) (i.e., e.g., statistics thereof) corresponding to video data, encoding parameters used for encoding video, a reconstruction error, and a bit-rate. That is, coder control unit 404 may determine a rate-distortion for video data encoded using a particular set of encoding parameters and having particular OFMs. In this manner, through multiple iterations of encoding the same video data (or a training set of video data) with different encoding parameters coder control unit 404 may be said to be able learn (or train) which encoding parameters optimize rate-distortion for various types of video data. That is, for example, output feature maps with relatively low of variance may correlate to images having large low-texture regions and may be relatively less sensitive to changes in degrees of quantization. That is, in this case, for this types of images rate-distortion may optimized by increasing quantization.

As described above, with respect to FIGS. 7A-7B, autoencoding may be performed on video data to generate a quantized output feature map data. A quantized output feature map is a compressed representation of the current video block. In some cases, that is, based on how autoencoding is performed an output feature map may effectively be a down-sampled version of video data. For example, referring to FIG. 7A, the 4×4 array of video data may be compressed to a 2×2 array (before or after quantization). In a case where the 4×4 array of video data is one of several 4×4 arrays of video data included in a 1920×1080 resolution picture, autoencoding each 4×4 array as illustrated in FIG. 7A may effectively down-sample the 1920×1080 resolution picture to a 960×540 resolution picture. It should be noted that in some cases, quantization may include adjusting a number of bits used to represent a sample value. That is, for example, mapping 10-bit values to 8-bit values. In this case, the quantized values may have the same amplitude range as the non-quantized values, but the fidelity of the amplitude data is reduced. In one example, according to the techniques herein, such a down-sampled representation of video data may be coded according to a typical video coding standard. Further, according to the techniques herein, autoencoding may be used during the video encoding in order to select video encoding parameters in order to achieve a desired rate-distortion, for example, as described above with respect to FIG. 8.

Figure 9:
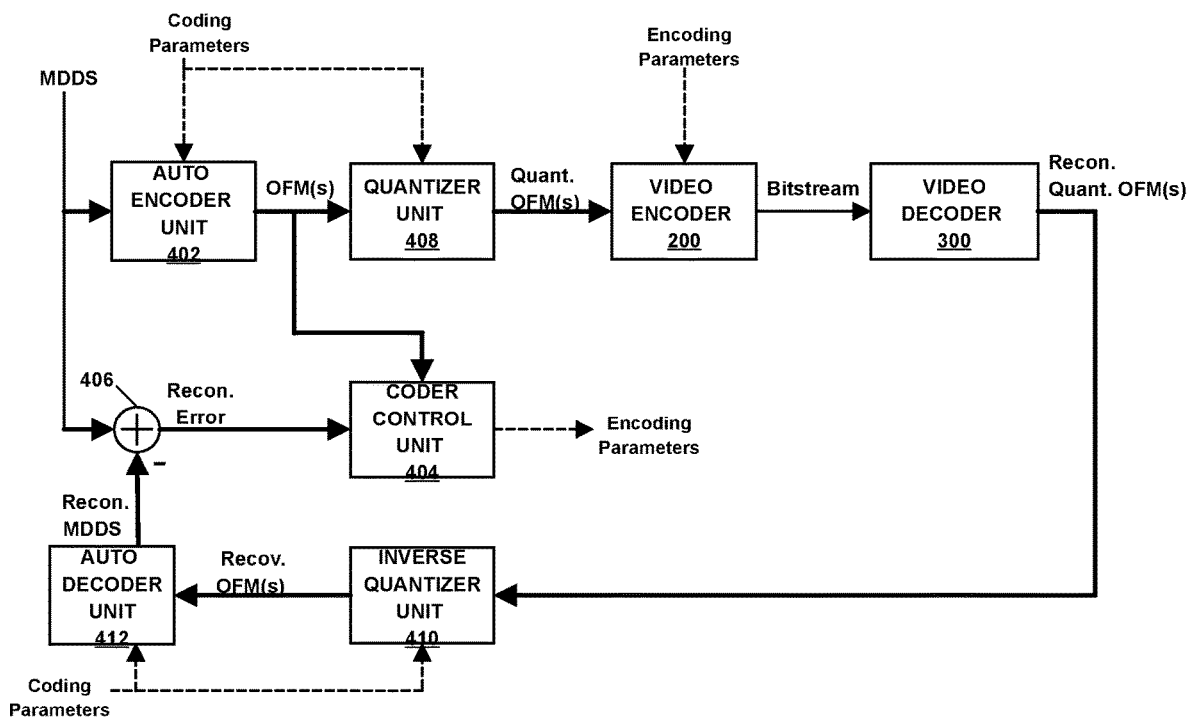
FIG. 9 is a block diagram illustrating an example of a coding system that may encode a multi-dimensional data set in accordance with one or more techniques of this disclosure.

FIG. 9 is an example of a coding system that may encode a multi-dimensional data set in accordance with one or more techniques of this disclosure. The system in FIG. 9 is similar to the system illustrated in FIG. 8, and also includes quantizer unit 408, inverse quantizer unit 410, and autodecoder unit 412. As illustrated in FIG. 9, quantizer unit 408 receives the one or more output feature maps corresponding to the video data and quantizes the output feature maps. As described above, quantizing may include reducing bit-depth such that the amplitude range of the quantized OFM values is the same as input video data. As illustrated in FIG. 9, video encoder 200 receives the quantized output feature maps and encodes the quantized output feature maps based on the encoding parameters according to a typical video coding standard as described above and outputs a bitstream. Video decoder 300 receives the bitstream and reconstructs the quantized output feature maps according to a typical video coding standard as described above. It should be noted that although, not shown in FIG. 9, in some examples, additional processing may be performed on the quantized OFMs for purposes of coding the data according to a video coding standard. That is, in some examples, the data may be re-arranged, scaled, etc. Further, a reciprocal process may be performed on the reconstructed quantized OFMs. Inverse quantizer unit 410 receives the recovered quantized output feature maps and performs an inverse quantization and autodecoder unit 412 performs autodecoding. That is, inverse quantizer unit 410 and autodecoder unit 412 may operate in a manner similar to that described above with respect to FIG. 7B. In this manner, in the system illustrated in FIG. 9, the bitstream output video encoder 200 is an encoded down-sampled representation of input video data and video decoder, inverse quantizer unit 410, and autodecoder unit 412 reconstruct the input video data from the bitstream. Further, as illustrated in FIG. 9, in manner similar to that described above with respect to FIG. 8, coder control unit 404 may determine a rate-distortion for quantized output feature maps encoded using a particular set of encoding parameters and video data having particular OFMs. That is, coder control unit 404 may optimize the encoding of a down-sampled representation of video data. Further, coder control unit 404 may optimize the down-sampling of input video data. That is, for example, according to the techniques herein, coder control unit 404 may determine which types of video data (e.g., highly detailed images vs. low detail images (or regions thereof)) are more or less sensitive to a reconstruct error as a result of down-sampling.

Figure 10:
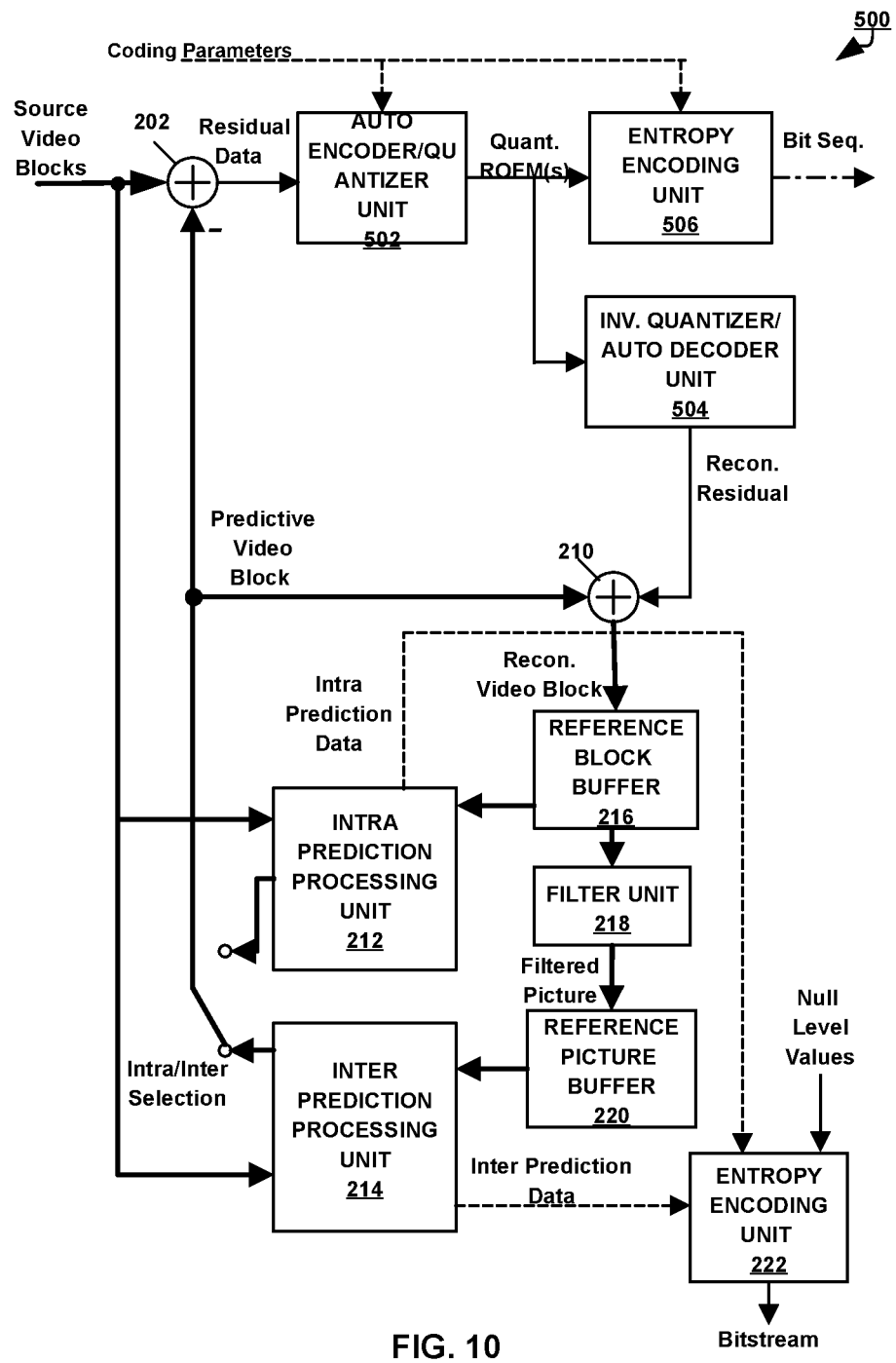
FIG. 10 is a block diagram illustrating an example of video encoder that may be configured to encode video data in according to one or more techniques of this disclosure.

As described above, with respect to FIG. 5, in the case of a typical video encoder, residual data may be encoded in a bitstream as level values. It should be noted that similar to input video data, residual data is an example of a multiple dimensional data set. Thus, in one example, according to the techniques herein, residual data (e.g., pixel domain residual data) may be encoded using autoencoding techniques. FIG. 10 is a block diagram illustrating an example of a video encoder that may be configured to encode video data according to techniques described herein. It should be noted that although example video encoder 500 is illustrated as having distinct functional blocks, such an illustration is for descriptive purposes and does not limit video encoder 500 and/or sub-components thereof to a particular hardware or software architecture. Functions of video encoder 500 may be realized using any combination of hardware, firmware, and/or software implementations. As illustrated in FIG. 10, video encoder 500 receives source video blocks and outputs a bitstream and similar to video encoder 200 includes summer 202, summer 210, intra prediction processing unit 212, inter prediction processing unit 214, reference block buffer 216, filter unit 218, reference picture buffer 220, and entropy encoding unit 222. Thus, video encoder 500 may perform intra prediction coding and inter prediction coding of picture areas in manner similar to that described above with respect to video encoder 200 receives source video blocks.

As illustrated in FIG. 10, video encoder 500 includes, autoencoder/quantizer unit 502, inverse quantizer and autodecoder unit 504, and entropy encoding unit 506. As illustrated in FIG. 10, autoencoder/quantizer unit 502 receives residual data and output quantized residual output feature map(s) (ROFM(s)). That is, autoencoder/quantizer unit 502 may perform autoencoding according to techniques described herein. For example, in a manner similar to that described above with respect to FIG. 7A. As illustrated in FIG. 10, inverse quantizer and autodecoder unit 504 receives quantized residual output feature map(s) (ROFM(s)) and outputs reconstructed residual data. That is, auto inverse quantizer and autodecoder unit 504 may perform autodecoding according to techniques described herein. For example, in a manner similar to that described above with respect to FIG. 7B. In this manner, video encoder 200 illustrated FIG. 5 and video encoder 500 illustrated FIG. 10 have encode/decode loops for reconstructing residual data which is then added to predictive video blocks for subsequent coding. As illustrated in FIG. 10, entropy encoding unit 506 receives quantized residual output feature map(s) and outputs a bit sequence. That is, entropy encoding unit 506 may perform entropy encoding according to entropy encoding techniques described herein. As further, illustrated in FIG. 10, coding parameters entropy encoding unit 222 receives null level values. That is, because video encoder 500 outputs encoded residual data as a bit sequence and a video decoder (e.g., video decoder 500 illustrated in FIG. 11), can derive residual data from the bit sequence, in some cases, residual data may not be derived from a typical video coding standard compliant bitstream. For example, the bitstream generated from video encoder 500 may set coded block flags (e.g., cbf_luma, cbf_cb, and cbf_cr in ITU-T H.265) to zero to indicate that there are no transform coefficient level values not equal to 0. It should be noted that although, in the example illustrated in FIG. 10, transform coefficient generator 204, coefficient quantization unit 206, inverse quantization and transform coefficient processing unit 208 are not included in some examples, video encoder 500 may be configured to additional/alternatively encode residual data using one or more of the techniques described above. That is, the type of encoding used to encode residual data may be selectively applied, e.g., on a sequence-by-sequence, a picture-by-picture, a slice-by-slice level, and/or a component-by-component basis. As further, illustrated in FIG. 10, autoencoder/quantizer unit 502 and entropy encoding unit 506 are controlled by coding parameters. That is, coder control unit (a coder control unit 404 described in FIG. 8 and FIG. 9) may be used in conjunction with video encoder 500. That is, video encoder 500 may be used in a system where rate-distortion is optimized based on techniques described herein.

Figure 11:
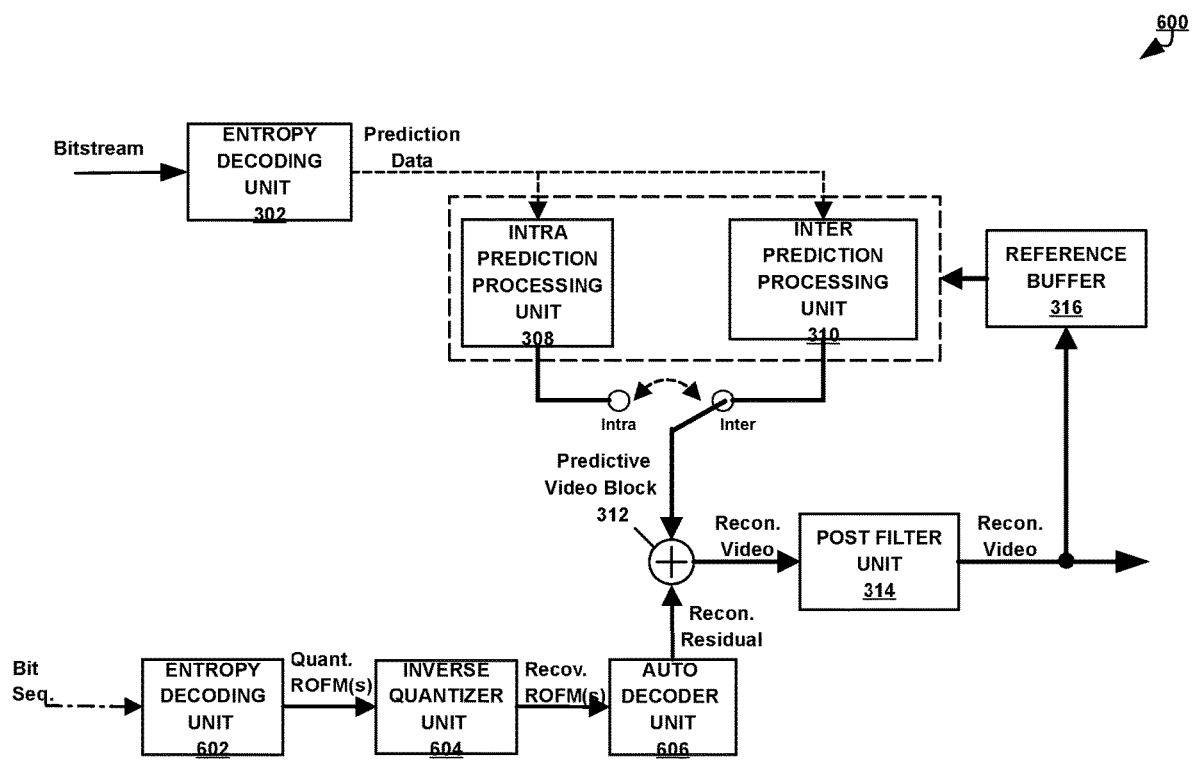
FIG. 11 is a block diagram illustrating an example of video decoder that may be configured to decode video data in according to one or more techniques of this disclosure.

FIG. 11 is a block diagram illustrating an example of a video decoder that may be configured to decode video data according to techniques described herein. As illustrated in FIG. 11, video decoder 600 receives an entropy encoded bitstream and a bit sequence and outputs reconstructed video. Similar to video decoder 300 illustrated in FIG. 6, video decoder 600 includes an entropy decoding unit 302, intra prediction processing unit 308, inter prediction processing unit 310, summer 312, post filter unit 314, and reference buffer 316. Thus, video decoder 600 may be configured to derive a predictive video block from a compliant bitstream and add the predictive video block to a reconstructed residual to generate reconstructed video in a manner similar to that described above with respect to FIG. 6. As further illustrated in the example illustrated in FIG. 6, video decoder 600 includes entropy decoding unit 602. Entropy decoding unit 602 may be configured to decode quantized residual output feature maps from a bit sequence according to a process reciprocal to an entropy encoding process. That is, entropy decoding unit 302 may be configured to perform entropy decoding according to entropy encoding techniques performed by entropy encoding unit 506 described above. As illustrated in FIG. 11, inverse quantizer unit 604 receives quantized residual output feature map(s) and outputs recovered residual output feature map(s) to autodecoder unit 606. Autodecoder unit 606 outputs reconstructed residual data. Thus, inverse quantizer unit 604 and autodecoder unit 606 operate in a similar manner to inverse quantization and autodecoder unit 504 described above. That is, inverse quantizer unit 604 and autodecoder unit 606 may perform autodecoding according to techniques described herein. Thus, in the example illustrated in FIG. 11, video decoder 600 may be configured to decode video data according to techniques described herein. It should be noted that as described in further detail below, predictive coding may be used on data other than video data. Thus, in one example, video decoder 600 may decode non-video MDDS from a compliant bitstream. For example, video decoder 600 may decode data for machine consumption. Similarly, video encoder 600 may decode non-video MDDS having a compatible input structure format. That is, for example, source video may undergoes some pre-processing and be converted to non-video MDDS. To summarize, a typical video encoder and decoder may be agnostic as to whether the data being coded is actually video data (e.g., human consumable video data).

As described above, predictive video coding techniques (i.e., intra prediction and inter prediction) generate a prediction for a current video block from stored reconstructed reference video data. As further described above, in one example, according to the techniques herein, a down-sampled representation of video data, which is an output feature map, may be coded according to predictive video coding techniques. Thus, predictive coding techniques utilized for coding video data may be generally applied to output feature maps. That is, in one example, according to the techniques herein output features maps (e.g., output features maps corresponding to video data) may be predictively coded utilizing predictive video coding techniques. Further, in some examples, according to the techniques herein, the corresponding residual data (i.e., e.g., the difference in a current region of an OFM and a prediction) may be encoded using autoencoding techniques. Thus, in one example, according to the techniques herein a multi-dimensional data set may be autoencoded, the resulting output features maps may be predictively coded, and the residual data corresponding output features maps may be auto encoded.

Figure 12:
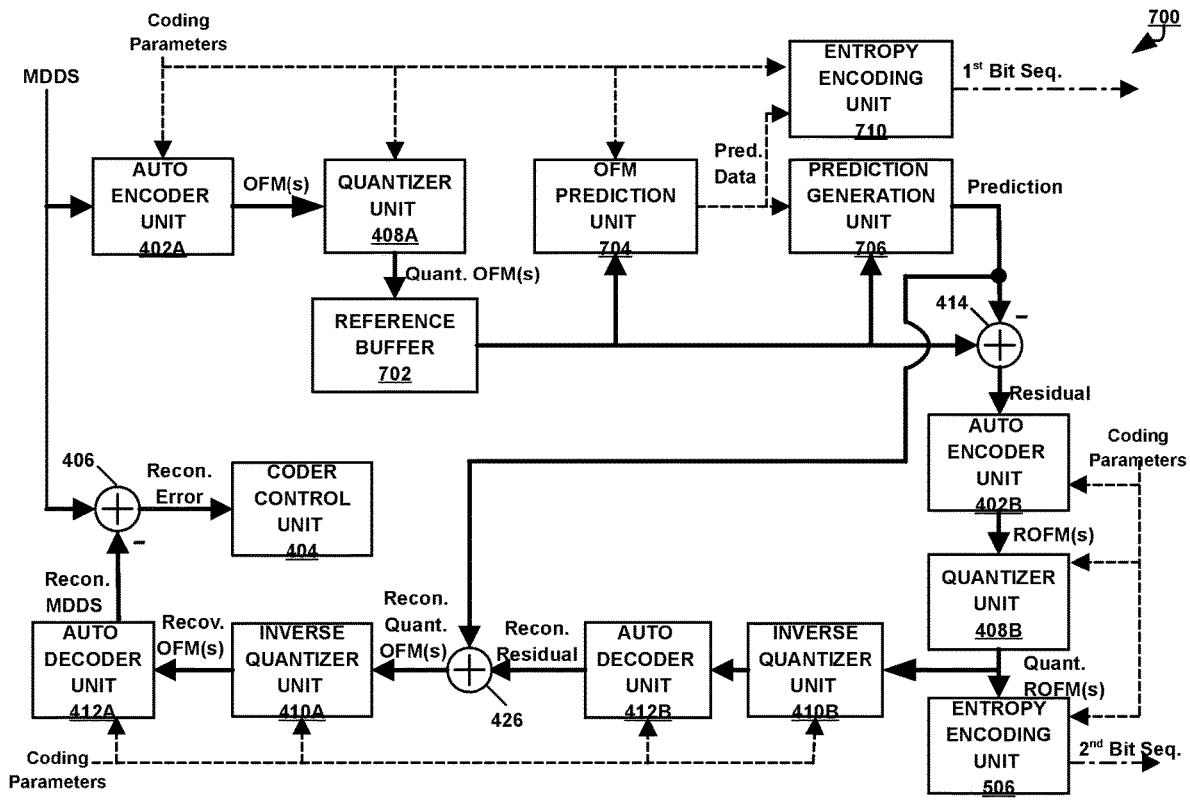
FIG. 12 is a block diagram illustrating an example of a compression engine that may be configured to encode a multi-dimensional data set in accordance with one or more techniques of this disclosure.

FIG. 12 is a block diagram illustrating an example of a compression engine that may be configured to encode a multi-dimensional data set in accordance with one or more techniques of this disclosure. It should be noted that although example compression engine 700 is illustrated as having distinct functional blocks, such an illustration is for descriptive purposes and does not limit compression engine 700 and/or sub-components thereof to a particular hardware or software architecture. Functions of compression engine 700 may be realized using any combination of hardware, firmware, and/or software implementations. In the example illustrated in FIG. 12, compression engine 700 includes autoencoder units 402A and 402B, coder control unit 404, summer 406, quantizer units 408A and 408B, inverse quantizer units 410A and 410B, autodecoder units 412A and 412B, summer 414, and entropy encoding unit 506. As further illustrated in FIG. 12, compression engine 700 includes reference buffer 702, OFM prediction unit 704, prediction generation unit 706 and entropy encoding unit 710. As illustrated in FIG. 12, compression engine 700 receives an MDDS and outputs a first bit sequence and a second bit sequence.

Autoencoder units 402A and 402B and quantizer units 408A and 408B are configured to operate in manner similar to autoencoder unit 402 and quantizer unit 408 described above with respect to FIG. 9. That is, autoencoder units 402A and 402B and quantizer units 408A and 408B are configured to receive an MDDS and output quantized OFMs. In particular, in the example illustrated in FIG. 12, autoencoder unit 402A and quantizer unit 408A receive a source MDDS and output quantized OFMs and autoencoder unit 402B and quantizer unit 408B receive residual data, which as described above is an MDDS, and output quantized OFMs. Further, inverse quantizer units 410A and 410B and autodecoder units 412A and 412B are configured to operate in manner similar to inverse quantizer unit 410 and autodecoder unit 412 described above with respect to FIG. 9. That is, inverse quantizer units 410A and 410B and autodecoder units 412A and 412B are configured to receive quantized output feature maps, perform inverse quantization, and autodecoding to generate a reconstructed data set. In particular, in the example illustrated in FIG. 12, inverse quantizer unit 410B and autodecoder unit 412B receive quantized residual output feature map(s) and output reconstructed residual data as part of an encode/decode loop. As illustrated in FIG. 12 at summer 426 the reconstructed residual data is added to a prediction video block for subsequent coding. As described in further detail below, the prediction is generated by prediction generation unit 706 and is a quantized OFM(s). As illustrated in FIG. 12, the output of summer 426 is reconstructed quantized OFM(s) and inverse quantizer units 410A and 410B receive the reconstructed quantized OFM(s) and output reconstructed MDDS as part of an encode/decode loop. That is, as illustrated in FIG. 12, summer 406 provides a reconstruction error which may be evaluated by coder control unit 404, in a manner similar to that described above. Thus, compression engine 700 is similar to encoders and systems described above, in that rate-distortion may be optimized based on a reconstruction error. As illustrated in FIG. 12, entropy encoding unit 506 receives quantized residual output feature map(s) and outputs a bit sequence. In this manner, entropy encoding unit 506 operations in a manner similar to entropy encoding unit 506 described above with respect to FIG. 10.

As described above, output features maps may be predictively coded. Referring again to FIG. 12, reference buffer 702, OFM prediction unit 704, and prediction generation unit 706 represent components of compression engine 700 configured to predictively code output features maps. That is, output features maps may be stored in reference buffer 702. OFM prediction unit 704 may be configured to analyze a current OFM and a OFM stored to reference buffer 702 and generate prediction data. That is, for example, OFM prediction unit 704 may treat OFMs similar to the way pictures are treated in a typical video coding and select a reference OFM and motion information for a current OFM. In the example, illustrated in FIG. 12, prediction generation unit 706 receives the prediction data and generates a prediction (e.g., retrieves an area of an OFM) from OFM data stored to reference buffer 702. It should be noted that in FIG. 12, OFM prediction unit 704 is illustrated as receiving coding parameters. In this case, coder control unit 404 may control how prediction data is generated, e.g., based on a rate-distortion analysis. For example, OFM data may be particularly sensitive to various types of artifacts that are relatively minor with respect to video data and thus prediction modes associated with such artifacts may be disabled. Finally, as illustrated in FIG. 12 entropy encoding unit 710 receives coding parameters and prediction data and outputs a bit sequence. That is, entropy encoding unit 710 may be configured to perform entropy encoding techniques described herein. It should be noted that although not shown in FIG. 12, the first bit sequence and the second bit sequence may be multiplexed (e.g., before or after entropy encoding) to form a single bitstream.

Figure 13:
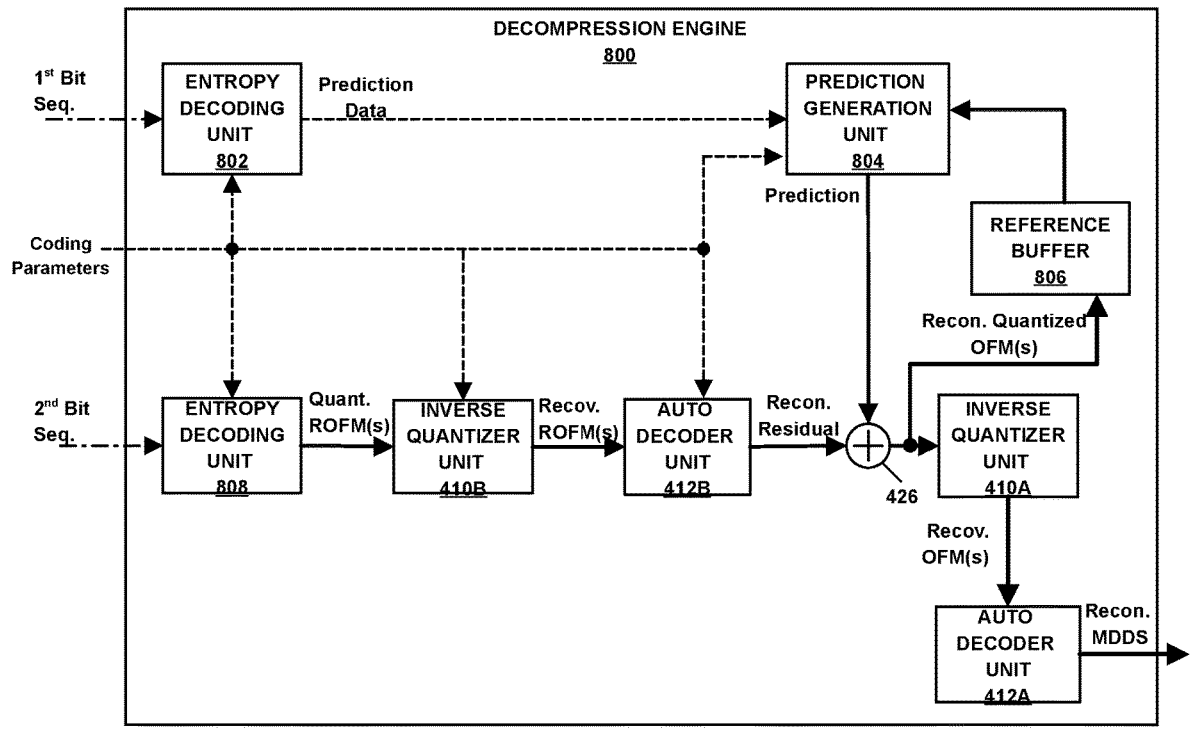
FIG. 13 is a block diagram illustrating an example of a decompression engine that may be configured to decode a multi-dimensional data set in accordance with one or more techniques of this disclosure.

FIG. 13 is a block diagram illustrating an example of a decompression engine that may be configured to decode a multi-dimensional data set in accordance with one or more techniques of this disclosure. As illustrated in FIG. 13, decompression engine 800 receives an entropy encoded first bit sequence, an entropy encoded second bit sequence, and coding parameters and outputs a reconstructed MDDS. That is, decompression engine 800 may operate in a reciprocal manner to compression engine 700. As illustrated in FIG. 13, decompression engine 800 includes inverse quantizer units 410A and 410B, autodecoder units 412A and 412B, and summer 426, each of which may be configured to operate in a similar manner to like numbered components described above with respect to FIG. 12. As further, illustrated in FIG. 13, decompression engine 800 includes entropy decoding unit 802, prediction generation unit 804, reference buffer 806, and entropy decoding unit 808. As illustrated in FIG. 13, entropy decoding unit 802 and entropy decoding unit 808 receive respective bit sequences and output respective data. That is, entropy decoding unit 802 and entropy decoding unit 808 may operate in a reciprocal manner to entropy encoding unit 710 and entropy encoding unit 506 described above with respect to FIG. 12. As illustrated in FIG. 13 reference buffer 806 stores reconstructed quantized OFM and prediction generation unit 804 receives prediction data and coding parameters generates a prediction. That is, prediction generation unit 804 and reference buffer 806 may operate in manner similar to prediction generation unit 706 and reference buffer 702 described above with respect to FIG. 12. Thus, decompression engine 800 may be configured to decode encoded MDDS data according to techniques described herein.

It should be noted that in the examples illustrated above, in FIG. 8, FIG. 9 and FIG. 12, each coder control unit 404 is illustrated as receiving a reconstruction error. In some examples, a coder control unit may not receive a reconstruction error. That is, in some examples, full decoding may not occur at an encoder. For example, referring to FIG. 8, in one example, video decoder 300 and summer 406 (i.e., decoding loop) and coder control unit 404 may simply receive the OFM(s) to determine encoding parameters.

As described above, in addition to performing discrete convolution on two-dimensional (2D) data sets, convolution may be performed on one-dimensional data sets (1D) or on higher dimensional data sets (e.g., 3D data sets). There are several ways in which video data may be mapped to a multi-dimensional data set. In general, video data may be described as having a number of input channels of spatial data. That is, video data may be described as an $N_i \times W \times H$, data set where $N_i$ is the number of input channels, W is a spatial width, and H is a spatial height. It should be noted that in some examples, may be a temporal dimension (e.g., number of pictures). For example, $N_i$ in $N_i \times W \times H$ may indicate a number of 1920×1080 monochrome pictures. Further, in some examples, $N_i$, may be a component dimension (e.g., number of color components). For example, $N_i \times W \times H$ may include a single 1024×742 image having RGB components, i.e., in this case, $N_i$ equals 3. Further, it should be noted that in some cases, there may be N input channels for both a number of components (e.g., $N_{Ci}$) and a number of pictures (e.g., $N_{Pi}$). In this case, video data may be specified as $N_{Ci} \times N_{Pi} \times W \times H$, i.e., as a four-dimensional data set. According to the $N_{Ci} \times N_{Pi} \times W \times H$ format, an example of 60 1920×1080 monochrome pictures may be expressed as 1×60×1920×1080 and a single 1024×742 RGB image may be expressed as 3×1×1024×742. It should be noted that in these cases, each of the four-dimensional data sets have a dimension having a size of 1, and may be referred to as three-dimensional data sets and respectively simplified to 60×1920×1080 and 3×1024×742. That is, 60 and 3 are both input channels in three-dimensional data sets, but refer to different dimensions (i.e., temporal and component).

As described above, in some cases, a 2D OFM may correspond to a down-sampled component of video (e.g., luma) in both the spatial and temporal dimensions. Further, in some cases, a 2D OFM may correspond to a down-sampled video in both the spatial and component dimensions. That is, for example, a single 1024×742 RGB image, (i.e., 3×1024×742) may be down-sampled to a 1×342×248 OFM. That is, down-sampled by 3 in both spatial dimensions and down-sampled by 3 in the component dimension. It should be noted that in this case, 1024 may be padded by 1 to 1025 and 743 may be padded by 2 to 744, such that each are multiples of 3. Further, in one example, 60 1920×1080 monochrome pictures (i.e., 60×1920×1080) may be downsampled to a 1×640×360 OFM. That is, down-sampled by 3 in both spatial dimensions and down-sampled by 60 in the temporal dimension.

It should be noted that in the cases above, the down-sampling may be achieved by having a $N_i$×3×3 kernel with a stride of 3 in the spatial dimension. That is, for the 3×1025×744 data set, the convolution generates a single value for each 3×3×3 data point and for the 60×1920×1080 data set, the convolution generates a single value for each 60×3×3 data point. It should be noted that in some cases, it may be useful to perform discrete convolution on a data set multiple times, e.g., using multiple kernels and/or strides. That is, for example, with respect to the example described above, a number of instances of N1×3×3 kernels (e.g., each with different values) may be defined and used to generate a corresponding number of instances of OFMs. In this case, the number of instances may be referred to as a number of output channels, i.e., $N_O$. Thus, in the case where an $N_i$×$W_i$×$H_i$ input data set is down-sampled according to a $N_O$ instances of $N_i$×$W_k$×$H_k$ kernels, the resulting output data may be represented as $N_O$×$W_O$×$H_O$. Where $W_O$ is a function of $W_i$, $W_k$, and the stride in the horizontal dimension and $H_O$ is a function of $H_i$, $H_k$, and the stride in the vertical dimension. That is, each of $W_O$ and $H_O$ are determined according to spatial down-sampling. It should be noted that in some examples, according to the techniques herein, an $N_O$×$W_O$×$H_O$ data set may be used for object/feature detection. That is, for example, each of the $N_O$ data sets may be compared to one another and relationships in common regions may be used to identify the presence of an object (or another feature) in the original $N_i$×$W_i$×$H_i$ input data set. For example, a comparison/task may be carried out over a multiple of NN layers. Further, an algorithm, such as, for example, a non-max suppression to select amongst available choices, may be used. In this manner, as described above, the encoding parameters of a typical video encoder may be optimized based on the $N_O$×$W_O$×$H_O$ data set, e.g., quantization varied based on the indication of an object/feature in video. In this manner according to the techniques herein, data encoder 106 represents an example of a device configured to receive a data set having a size specified by a number of channels dimension, a height dimension, and a width dimension, generate an output data set corresponding to the input data by performing a discrete convolution on the input set, wherein performing a discrete convolution includes spatial down-sampling the input data set according to a number of instances of kernels, and encoding the received data set based on the generated output set. It should be noted, that in theory a stride may be less than one and in this case, convolution may be used to up-sample data.

In one example, in a case where a number of instances of K×K kernels each having a corresponding dimension equal to a $N_i$ is used in processing of an $N_i$×$W_i$×$H_i$ dataset, the following notation may be used to indicate one of a convolution or convolution transpose, the kernel size, the stride function, and padding function for a convolution, and the number of output dimensions of a discrete convolution:

conv2d: 2D convolution, conv2dT: 2D convolution transpose,
kK: kernel of size K for all dimensions (e.g., K×K);
sS: stride of S for all dimensions (e.g. (S, S));
pP: pad by P to both sides of all dimensions with value 0, (e.g., (P, P) for 2D); and
nN number of output of channels.

It should be noted that in the example notation provided above, the operations are symmetric, i.e., square. It should be noted that in some examples, the notation may be as follows for general rectangular cases:

conv2d: 2D convolution, conv2dT: 2D convolution transpose,
k$K_wK_h$: kernel of size $K_w$ for width dimension and $K_h$ for height dimension (e.g., $K_w$×$K_h$);
s$S_wS_h$: stride of $S_w$ for width dimension and $S_h$ for height dimension (e.g., $S_w$×$S_h$);
p$P_wP_h$: pad by $P_w$ to both sides of width dimension and $P_h$ to both sides of height dimension (e.g., $P_w$×$P_h$); and
nN number of output of channels.

It should be noted that in some examples, a combination of the above notation may be used. For example, in some examples, K, S, and $P_wP_h$ notation may be used. Further, it should be noted that in other examples, padding may be asymmetric about a spatial dimension (e.g., Pad 1 row above, 2 rows below).

Further, as described above, convolution may be performed on one-dimensional data sets (1D) or on higher dimensional data sets (e.g., 3D data sets). It should be noted that in some cases, the notation above may be generalized for convolutions of multiple dimensions as follows:

conv1d: 1D convolution, conv2d: 2D convolution, conv3d: 3D convolution
conv1dT: 1D convolution transpose, conv2dT: 2D convolution transpose, conv3dT: 3D convolution transpose
kK: kernel of size K for all dimensions (e.g., K for 1D, K×K for 2D, K×K×K for 3D)
sS: stride of S for all dimensions (e.g., (S) for 1D, (S, S) for 2D, (S, S, S) for 3D)
pP: pad by P to both sides of all dimensions with value 0 (e.g., (P) for 1D, (P, P) for 2D, (P, P, P) for 3D)
nN number of output of channels The notation provided above may be used for efficiently signaling of autoencoding and autodecoding operations. For example, in the case of down-sampling a single 1024×742 RGB image to a 342×248 OFM, as described above, according to 256 instances of kernels may be described as follows:

Input data: 3×1024×742
Operation: conv2d, k3, s3, p1, n256
Resulting Output data: 256×342×248

Similarly, in the case of down-sampling a 60 1920×1080 monochrome pictures to a 640×360 OFM, as described above, according to 32 instances of kernels may be described as follows:

Input data: 60×1920×1080
Operation: conv2d, k3, s3, p0,2 n32
Resulting Output data: 32×640×360

It should be noted that there may be numerous ways to perform convolution on input data in order to represent the data as an output feature map (e.g., $1^{st}$ padding, $1^{st}$ convolution, $2^{nd}$ padding, $2^{nd}$ convolution, etc.). For example, the resulting data set 256×342×248 may be further down-sampled by 3 in the spatially dimension and by 8 in the channel dimension and as follows:

Input data: 256×342×248
Operation: conv2d, k3, s3, p0,1, n32
Resulting Output data: 32×114×84

In one example, according to the techniques herein, the operation of an autodecoder may be well-defined and known to an autoencoder. That is, the autoencoder knows the size of the input (e.g., the OFM) received at the decoder (e.g., 256×342×248, 32×640×360, or 32×114×84 in the examples above). This information along with the known k and s of convolution/convolution-transpose stages can be used to determine what the data set size will be at a particular location of the autodecoder.

As described above, object recognition tasks typically involve receiving an image, generating feature data corresponding to the image, analyzing the feature data, and generating inference data. Examples of typical object detection systems include, for example, systems implementing versions of YOLO, RetinaNet, and Faster R-CNN. Detailed descriptions of object detection systems, performance evaluation techniques, and performance comparisons are provided in various technical journals and the like. For example, Redmon et al., "YOLOv3: An Incremental Improvement," arXiv:1804.02767, 8 Apr. 2018, generally describes YOLOv3 and provides a comparison to other object detection systems. Wu et al., "Detectron2," at github, facebookresearch, detectron2, 2019 provides libraries and associated documentation for Detectron2 which is a Facebook Artificial intelligence (AI) Research platform for object detection, segmentation and other visual recognition tasks. It should be noted that for explanation purposes, in some cases, the techniques described herein are described with specific example object detection systems (e.g., YOLOv3). However, it should be noted that the techniques herein may be generally applicable to other object detection systems.

Figure 14:
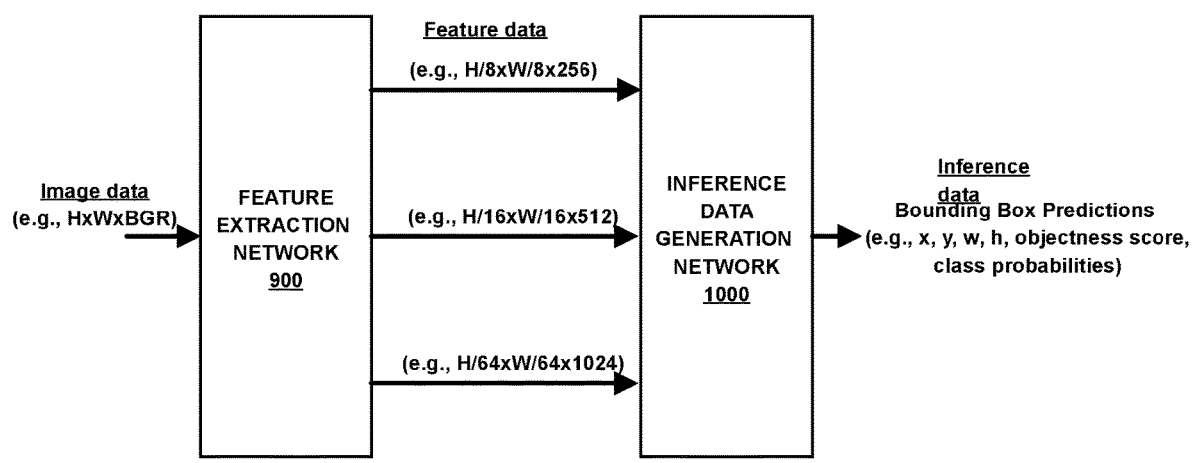
FIG. 14 is a conceptual diagram illustrating an example of object detection network which may be utilized with one or more techniques of this disclosure.

Referring to FIG. 14, in general, in the case of image data, an object detection system can be described as receiving image data and generating feature data (also referred to as OFM(s), feature tensors, feature maps, etc.) at a feature extraction network 900 (e.g., ResNet-101-C4, ResNet-101-FPN, Inception-ResNet-v2, Inception-ResNet-v2-TDM, DarkNet-19, ResNet-101-SSD, ResNet-101-DSSD, ResNet-101-FPN, ResNeXt-101-SSD, Darknet-53, etc.) and receiving feature data and generating inference data at an inference data generation network 1000. It should be noted, that in some cases, a feature extraction network may also be referred to as a backbone network and an inference data generation network may also be referred to as prediction network or a bounding box prediction network. In general, the operation of a feature extraction network can be described as down sampling an input image at various scales using convolution operations. As described above, for explanatory purposes, in some cases, the techniques described herein are described with respect to specific example object detection systems, such as, YOLOv3. FIG. 14 illustrates an example where the example image data, feature data, and inference data correspond to YOLOv3. That is, as illustrated in FIG. 14, in YOLOv3, a feature extraction network 900, (i.e., a feature extraction network referred to as DARKNET-53), extracts feature maps from an input image (e.g., a BGR image) at three different scales. As illustrated in FIG. 14, YOLOv3 generates 256 feature maps (i.e., channels) at a ⅛ scale, 512 feature maps at a 1/16 scale, and 1024 feature maps at a 1/32 scale. It should be noted that other feature extraction networks generate feature data at other scales, for example, Detectron2 generates features maps at ¼ scale, ⅛ scale, 1/16 scale, 1/32 scale, and 1/64 scale and at each scale 256 channels are output. As further illustrated in FIG. 14, in YOLOv3, inference data generation network 1000, receives the feature data and generates bounding box predictions.

Figure 15:
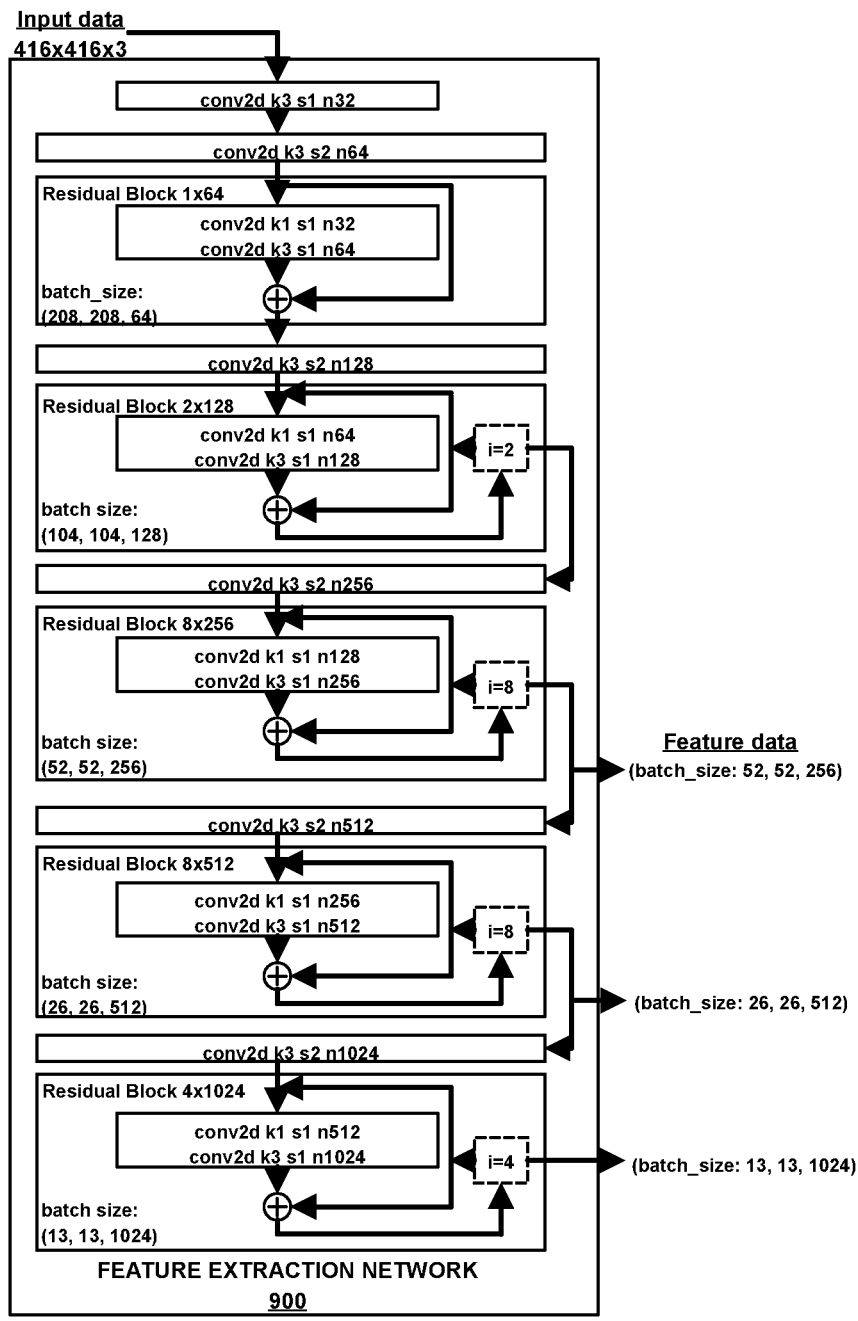
FIG. 15 is a conceptual diagram illustrating an example of a feature extraction network which may be utilized with one or more techniques of this disclosure.

It should be noted that, for the sake of brevity, a complete description of YOLOv3 is not provided herein. However, reference is made to Redmon et al., described above, and the corresponding source code repository publicly available on GitHub (Darknet: Open Source Neural Networks in C). For the feature extraction network in YOLOv3, a 416×416 image is input and the following data sets are generated: 52×52×256, 26×26×512, and 13×13×1024. FIG. 15 is a conceptual diagram illustrating the operation of a feature extraction network 900 corresponding to YOLOv3. It should be noted that in FIG. 15 padding operations are not included in the convolution notation. However, in a typical implementation, padding operations (e.g., zero padding) may be performed to maintain particular dimensions for a 2D convolution operation. As illustrated in FIG. 15, the feature extraction network in YOLOv3, i.e., DARKNET-53, uses an initial convolution layer (i.e., conv2d k3 s1 n32) and five residual blocks. As illustrated in FIG. 15, prior to each of the five residual blocks a conv2d operation with a stride of 2 is performed. These conv2d operations perform down sampling. As further illustrated in FIG. 15, each residual block includes a short cut which provides the input to an adder. In DARKNET-53, a residual block essentially filters an input by adding weight layers to the input. As illustrated in FIG. 15, a residual block includes successive 1×1 conv2d and 3×3 conv2d operations. These successive conv2d operations provide weights which are added to the input. It should be noted that although not illustrated in FIG. 15, batch normalization and LeakyReLU functions are performed on the output of the convolution operations. As provided in FIG. 15, a residual block includes an indicated number of iterations (e.g., i=2). The indicated number of iterations essentially indicate the number of times an input is filtered. That is, the number of times weights are generated (i.e., the number of times the successive 1×1 conv2d and 3×3 conv2d operations are performed) and added to the input. An example of an implementation of DARKNET-53 in Python is as follows:

```
def residual_block(input_layer, input_channel,
filter_num1, filter_num2):
 short_cut = input_layer
 conv = convolutional(input_layer, filters_shape=
 (1, 1, input_channel, filter_num1))
 conv = convolutional(conv, filters_shape=
 (3, 3, filter_num1, filter_num2))
 residual_output = short_cut + conv
 return residual_output
def darknet53(input_data, training=False):
#python implementation of darknet-53
 input_data = convolutional(input_data, (3, 3, 3, 32))
 input_data = convolutional(input_data, (3, 3, 32, 64),
 downsample=True)
 for i in range(1):
  input_data = residual_block(input_data, 64, 32, 64)
 input_data = convolutional(input_data, (3, 3, 64, 128),
 downsample=True)
 for i in range(2):
```

```
  input_data = residual_block(input_data, 128, 64, 128)
input_data = convolutional(input_data, (3, 3, 128, 256),
downsample=True)
for i in range(8):
  input_data = residual_block(input_data, 256, 128, 256)
route_1 = input_data
input_data = convolutional(input_data, (3, 3, 256, 512),
downsample=True)
for i in range(8):
  input_data = residual_block(input_data, 512, 256, 512)
route_2 = input_data
input_data = convolutional(input_data, (3, 3, 512, 1024),
downsample=True)
for i in range(4):
  input_data = residual_block(input_data, 1024, 512, 1024)
return route_1, route_2, input_data
```

Where,
   convolution(x,filters_shape=(y0,y1,y2,y3),
      downsample=False) represents conv2d with y0 being height of convolving kernel, y1 being width of convolving kernel, y2 being number of channels in the input, y3 being number of channels in the output.
   When not provided downsample defaults to False. When downsample is False the padding type used is 'same' with strides being 1. When downsample is True, zero padding of size 1 of top and left is performed, the padding type used is 'valid' and strides is 2.
   After conv2d, batch normalization and then leaky ReLU activation is performed.

Figure 16:
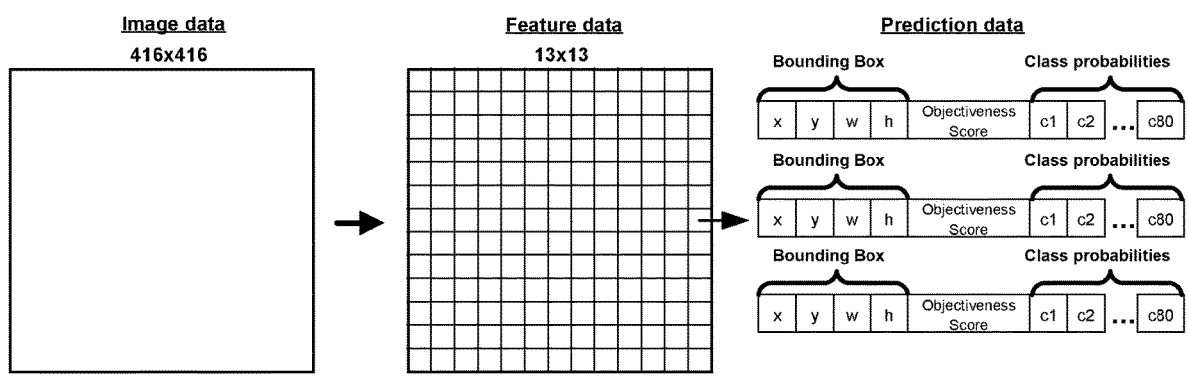
FIG. 16 is a conceptual diagram illustrating an example of inference data which may be utilized with one or more techniques of this disclosure.

As described above, an inference data generation network receives feature data and generates inference data. With respect to YOLOv3, an inference data generation network provides a prediction of bounding boxes at three different scales, i.e., small, medium, and large. As described above, for YOLOv3, a 416×416 image is input into a DARKNET-53 network and the following feature tensors are generated: 52×52×256, 26×26×512, and 13×13×1024. Each of the feature tensors may be considered as grid of cells corresponding to the image. For example, FIG. 16 illustrates feature data for an input of 416×416 image data as a 13×13 grid. This would correspond to the generated 13×13×1024 feature tensor. As illustrated in FIG. 16, for each cell in the grid, YOLOv3 provides prediction data as a set of three bounding box predictions. A bounding box prediction is a prediction as to whether a cell in the gird contains the center of an object, where a bounding box prediction includes: a bounding box (x, y, w, h) for the object, where x and y provide offset information indicating the center of a bounding box and w and h provide width and height information for the bounding box; an objectiveness score, where the objectiveness score corresponds to the confidence that the cell contains the center of the object; and 80 class probabilities, where a class probability provides a probability that the object is a particular class (e.g., person, dog, cat, etc.). It should be noted that, for this example, the 80 classes may be based on the Microsoft Common Objects in Context (MS COCO) dataset. As provided in FIG. 16, for each cell there are 3 bounding box predictions.

Figure 17:
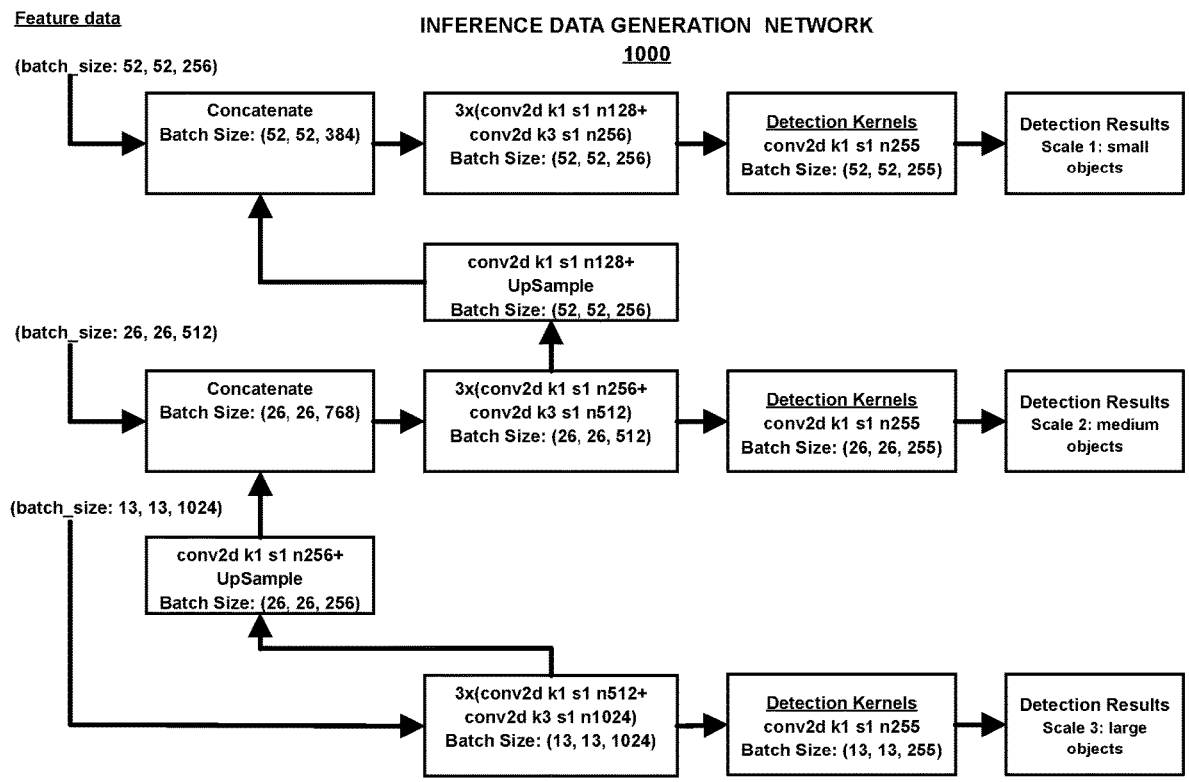
FIG. 17 is a conceptual diagram illustrating an example of an inference data generation network which may be utilized with one or more techniques of this disclosure.

In YOLOv3, an inference data generation network essentially, generates prediction data by applying 1×1 detection kernels at each scale of the feature map data. FIG. 17 is a conceptual diagram illustrating the operation of a inference data generation network 1000 corresponding to YOLOv3. It should be noted that in FIG. 17 padding operations are not included in the convolution notation. However, in a typical implementation, padding operations (e.g., zero padding) may be performed to maintain particular dimensions for a 2D convolution operation. As illustrated FIG. 17, detection results are provided for each scale where, Scale 1: small objects corresponds to the 52×52×256 feature data, Scale 2: medium objects corresponds to the 26×26×512 feature data, and Scale 3: large objects corresponds to the 13×13×1024 feature data. It should be noted that as provided above, in YOLOv3, three bounding box predictions are provided for each cell. Thus, the total number of bounding box prediction is 10,647 (for Scale 1: 52×52×3=8112, for Scale 2: 26×26×3=2028, for Scale 3: 13×13×3=507). The bounding box predictions may be filtered based on the objectiveness score. For example, bounding box predictions with a objectiveness score less than a threshold may be discarded. It should be noted that as illustrated in FIG. 17, feature data corresponding to a coarser scale is up sampled and concatenated with data of a finer scale. Further, prior to applying the detection kernel feature data is filtered using three iterations of successive 1×1 and 3×3 convolution layers. An example of an implementation of inference data generation network 1000 corresponding to YOLOv3 in Python-based pseudo-code is as follows:

```
def concatenate(input_1, input_2):
  return [input_1, input_2]
def convolutional_set_big(data):
  data = convolutional(data, (1, 1, 1024, 512))
  data = convolutional(data, (3, 3, 512, 1024))
  data = convolutional(data, (1, 1, 1024, 512))
  data = convolutional(data, (3, 3, 512, 1024))
  data = convolutional(data, (1, 1, 1024, 512))
  return data
def convolutional_set_medium(data):
  data = convolutional(data, (1, 1, 768, 256))
  data = convolutional(data, (3, 3, 256, 512))
```

```
    data = convolutional(data, (1, 1, 512, 256))
    data = convolutional(data, (3, 3, 256, 512))
    data = convolutional(data, (1, 1, 512, 256))
    return data
def convolutional_set_small(data):
    data = convolutional(data, (1, 1, 384, 128))
    data = convolutional(data, (3, 3, 128, 256))
    data = convolutional(data, (1, 1, 256, 128))
    data = convolutional(data, (3, 3, 128, 256))
    data = convolutional(data, (1, 1, 256, 128))
    return data
def predict(input_data, channels, NUM_CLASS):
    boxes = convolutional(input_data, (1, 1, channels,
    3*(NUM_CLASS + 5)))
    return boxes
def detection(input_data, NUM_CLASS):
    route_1, route_2, conv = darknet53(input_data)
    conv = convolutional_set_big(conv)
    conv_big_branch = convolutional(conv, (3, 3, 512, 1024))
    boxes_big = predict(conv_big_branch, 1024, NUM_CLASS)
    conv = convolutional(conv, (1, 1, 512, 256))
    conv = upsample(conv)
    conv = concatenate(conv, route_2)
    conv = convolutional_set_medium(conv)
    conv_medium_branch = convolutional(conv, (3, 3, 256, 512))
    boxes_medium = predict(conv_medium_branch,
    512, NUM_CLASS)
    conv = convolutional(conv, (1, 1, 256, 128))
    conv = upsample(conv)
    conv = concatenate(conv, route_1)
    conv = convolutional_set_small(conv)
    conv_small_branch = convolutional(conv, (3, 3, 128, 256))
    boxes_small = predict(conv_small_branch, 256, NUM_CLASS)
    return post_process([boxes_big, boxes_medium, boxes_small])
```

Where,

Upsample( ) upsamples input data with a scale factor of 2 spatially, therefore input data of size (w, h) will end up with output data of size (2w, 2h). post_process( ) will process the predict results and output class, objectiveness score, and bounding boxes of the detected objects. One example of post_process( ) is non maximum suppression. NUM_CLASS is task configurable. For MSCOCO dataset, NUM_CLASS=80.

As described above, in addition to object detection, feature data may be used to generate inference data for purposes of object tracking. In general, object tracking extends an object detection task by providing individual object identification. For example, a detected object may be assigned a persistent identifier (e.g., $Car_1$) and the persistent identifier may be used to track the location/trajectory of the object in multiple consecutive pictures of a video. That is, for each picture forming a video sequence, respective bounding box information may be analyzed to track the movement of a particular object in the scene. Wang et al., "Towards Real-Time Multi-Object Tracking," arXiv:1909.12605, 14 Jul. 2020 (hereinafter "Wang"), generally describes multiple object tracking (MOT) systems and discloses a Joint Detection and Embedding (JDE) model system. Wang describes where MOT systems may include, for example, Separate Detection and Embedding (SDE) model systems. In general, an SDE model may be described as detecting objects in respective pictures of video and then evaluating the set of detected objects (i.e., each detected object for each picture in a sequence) to associate the detected objects to particular identifiable objects. For example, for a video sequence including N pictures, an SDE model may generate bounding box predictions, e.g., according to YOLOv3, for each of the N pictures. Bounding box predictions may be used to extract regions likely to include objects from each of the N pictures. The set of extracted regions may be input into an embedding model. The embedding model may assign a persistent identifier to a set of bounding boxes corresponding to a particular object in the sequence.

Figure 18:
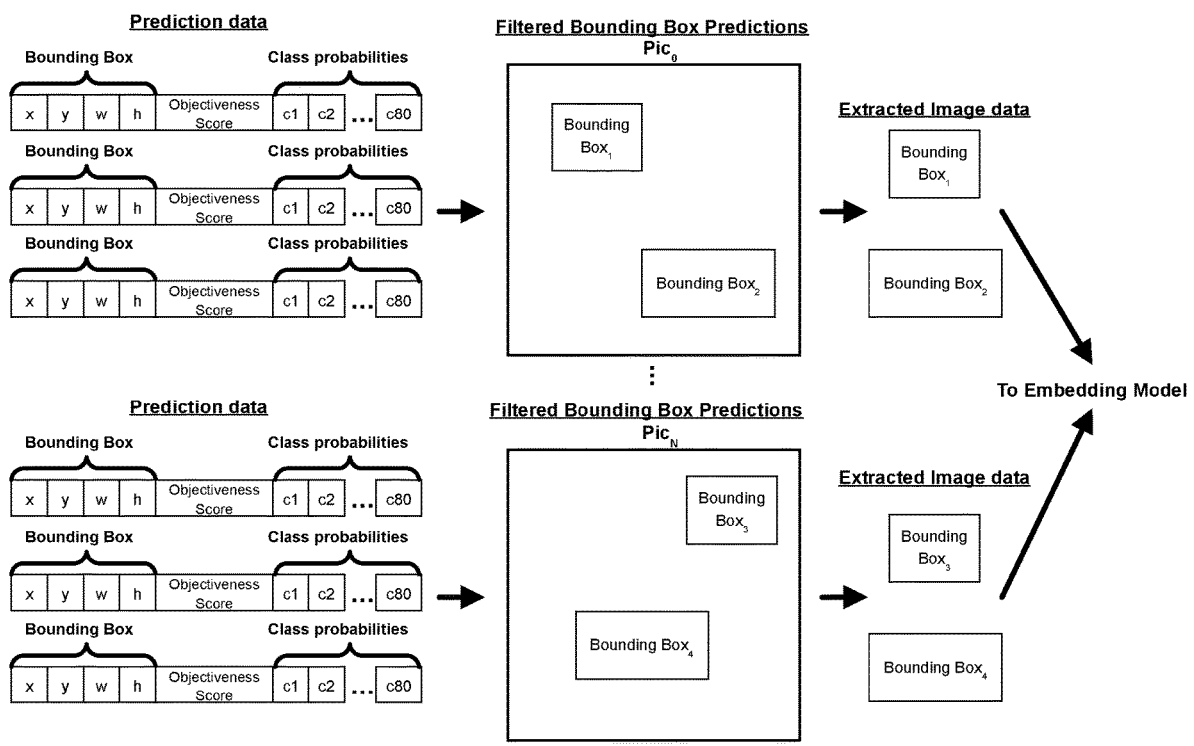
FIG. 18 is a conceptual diagram illustrating an example of inference data which may be utilized with one or more techniques of this disclosure.

For example, as described above, in YOLOv3, bounding box predictions are generated and may be filtered based on the objectiveness score. FIG. 18 is a conceptual diagram illustrating an example where for a video sequence including $Pic_0$ to $Pic_N$ for each of $Pic_0$ to $Pic_N$, filtered bounding box predictions are generated. As illustrated in the example of FIG. 18, the filtered bounding box predictions are used to extract image data (e.g., a region of pixels from an image and/or corresponding feature maps). As further illustrated in FIG. 18, the extracted image data is input into an embedding model. As described above, an embedding model may assign a persistent identifier to a set of bounding boxes corresponding to a particular object in the sequence. For example, in the example illustrated in FIG. 18, Bounding $Box_1$ in $Pic_0$ and Bounding $Box_3$ in $Pic_N$ may correspond to the same object (e.g., $Car_1$). Similarly, Bounding $Box_2$ in $Pic_0$ and Bounding $Box_4$ in $Pic_N$ may correspond to the same object (e.g., $Car_2$). Thus, in the example illustrated in FIG. 18, an embedding model may evaluate the extracted image data and assign the persistent identifier (e.g., $Car_1$) to the set of bounding boxes including Bounding $Box_1$ and Bounding $Box_3$ and assign the persistent identifier (e.g., $Car_2$) to the set of bounding boxes including Bounding $Box_2$ and Bounding $Box_4$. Based on a set of bounding boxes being assigned a persistent identifier, a particular object may be tracked in a video sequence. For example, as illustrated in FIG. 18, comparing the locations of Bounding $Box_1$ and Bounding $Box_3$, it can be determined that the associated object moves from left to right in the video sequence.

As described above, Wang discloses a Joint Detection and Embedding (JDE) model system. In particular, in the JDE model system disclosed in Wang employs a DARKNET-53 and is based on YOLOv3. The feature data output by the backbone at various scales is used to generate persistent identifiers. That is, a JDE model system may be described as performing detecting and embedding concurrently compared to performing detecting then performing embedding. JDE is modified from YOLOv3 to detect one class and anchor boxes for JDE differ from that used in YOLOv3. It should be noted that, for the sake of brevity, a complete description of the JDE model system described in Wang is not provided herein. However, reference is made to Wang, described above, and the corresponding source code repository publicly available on GitHub (Toward Real-Time Multi-Object Tracking). In general the JDE model in Wang can be described as training on concurring loss functions, with box classification and box regression loss optimizing for the detection task and embedding loss for the identification task. Therefore, the joint loss for JDE is given as $$L_{Total} = \sum_{i=1}^{m} w_\alpha L_{cls}^i + w_\beta L_{reg}^i + w_\gamma L_{emb}^i$$

Where, α, β, γ correspond to the 3 different loss terms and m gives the scale of the prediction head (big, medium, small) within JDE's feature pyramid. To automatically learn the loss weights the joint loss is modified as:

$$L_{Total} = \sum_{i=1}^{m} \frac{1}{2}\left(\frac{1}{e^{s_i^\alpha}} L_{cls}^i + s_i^\alpha\right) + \frac{1}{2}\left(\frac{1}{e^{s_i^\beta}} L_{reg}^i + s_i^\beta\right) + \frac{1}{2}\left(\frac{1}{e^{s_i^\gamma}} L_{emb}^i + s_i^\gamma\right)$$

Where, $s_i^\alpha$, $s_i^\beta$, $s_i^\gamma$ are the task-dependent uncertainty for each individual loss and is modeled as learnable parameters.

The JDE model system disclosed in Wang outputs a dense prediction map of size (6A+D)×H×W, where A is the number of anchor templates assigned to this scale, and D is the dimension of the embedding. The dense prediction map is divided into three parts (or tasks): (1) the box classification results of size 2×H×W; (2) the box regression coefficients of size 4A×H×W; and (3) the dense embedding map of size D×H×W.

Figure 19:
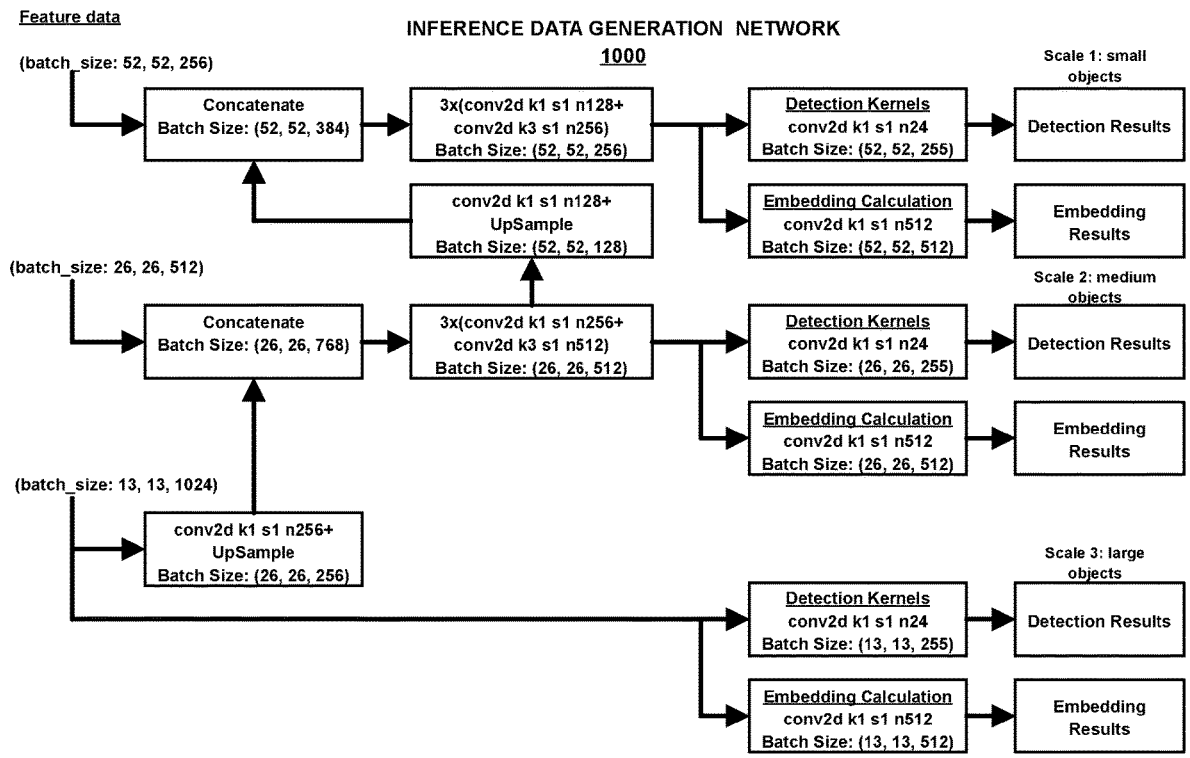
FIG. 19 is a conceptual diagram illustrating an example of an inference data generation network which may be utilized with one or more techniques of this disclosure.

FIG. 19 is a conceptual diagram illustrating an example of an inference data generation network of JDE. It should be noted that in FIG. 19 padding operations are not included in the convolution notation. However, in a typical implementation, padding operations may be performed. For detection and embedding at the small and medium scales, the model in JDE uses fused feature map generated by up sampling a coarser feature map (e.g., using nearest neighbor up sampling) and concatenating the up sampled feature map to a generated finer feature map. That is, as illustrated in FIG. 19, coarser feature maps are up sampled and concatenated with finer feature maps. As further illustrated in FIG. 19, prior to being concatenated to an up sampled feature map, the finer feature map undergoes a convolution to reduce the channel dimensions. Further, as illustrated in FIG. 19, prior to applying detection kernels and embedding calculation, three iterations of successive 1×1 and 3×3 convolution layers are performed on feature maps, in order to reduce the effect of aliasing from up sampling. As described above, JDE is modified from YOLOv3 to detect one class. Thus, as illustrated in FIG. 19, detection kernels include 24 channels. Further, as illustrated in FIG. 19, a 2D convolution operation is used for the embedding calculations at each scale. It should be noted that with respect to FIG. 15 and FIG. 19, feature data batch sizes are input data size dependent. That is, for example, for an input data size of 608×1088 batch sizes would be as follows: ⅛ scale: 76×136; 1/16 scale: 38×68; and 1/32 scale: 19×34.

Figure 20:
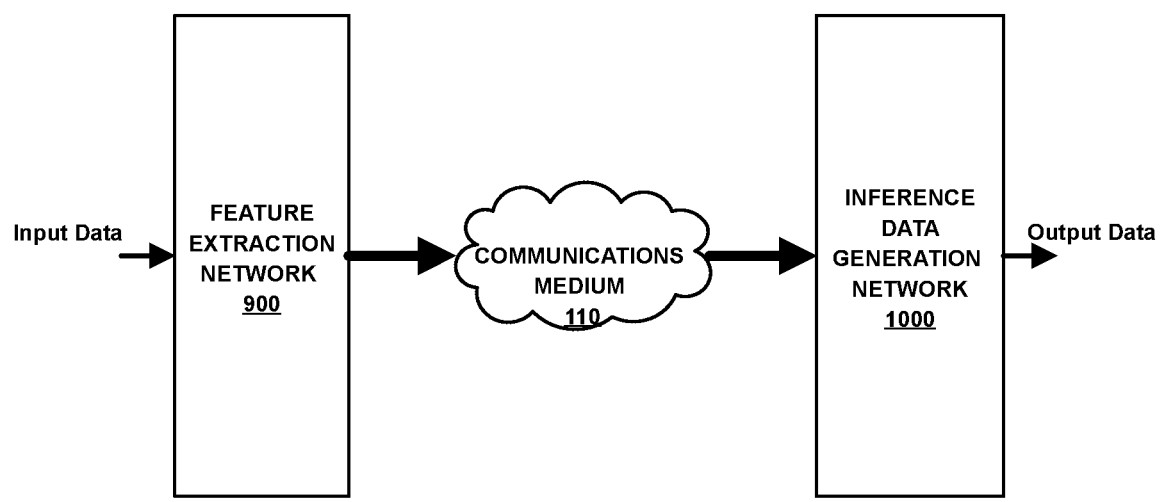
FIG. 20 is an example of a coding system that may encode a multi-dimensional data set in accordance with one or more techniques of this disclosure.
Figure 21:
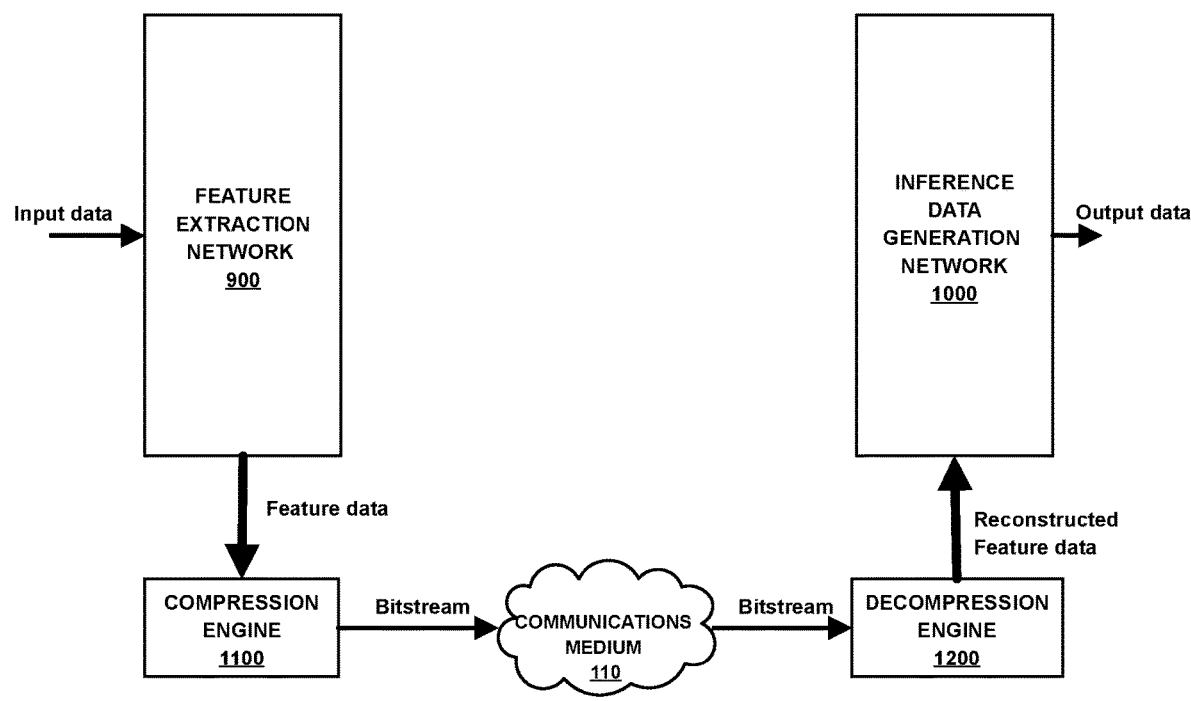
FIG. 21 is an example of a coding system that may encode a multi-dimensional data set in accordance with one or more techniques of this disclosure.

As described above, the techniques described in this disclosure may be particularly useful for allowing object detection tasks to be distributed across a communication network. That is, referring to FIG. 20, according to the techniques herein, each of feature extraction network 900 and inference data generation network 1000 may be coupled to communications medium 110, and thus, in some examples located at distinct physical locations. Further, according to the techniques herein, feature data may be compressed to reduce its size prior to transmission. At a receiving device, the compressed feature data may be decompressed to generate a reconstructed feature data. FIG. 21 is an example of a coding system that may encode a multi-dimensional data set in accordance with one or more techniques of this disclosure. As illustrated in FIG. 21, the system includes feature extraction network 900, inference data generation network 1000 and communications medium 110. Additionally, as illustrated in FIG. 21, the system includes compression engine 1100 and decompression engine 1200. Compression engine 1100 may be configured to compress feature data according to one or more of the techniques described herein and decompression engine 1200 may be configured perform reciprocal operations to reconstruct the feature data.

Figure 22:
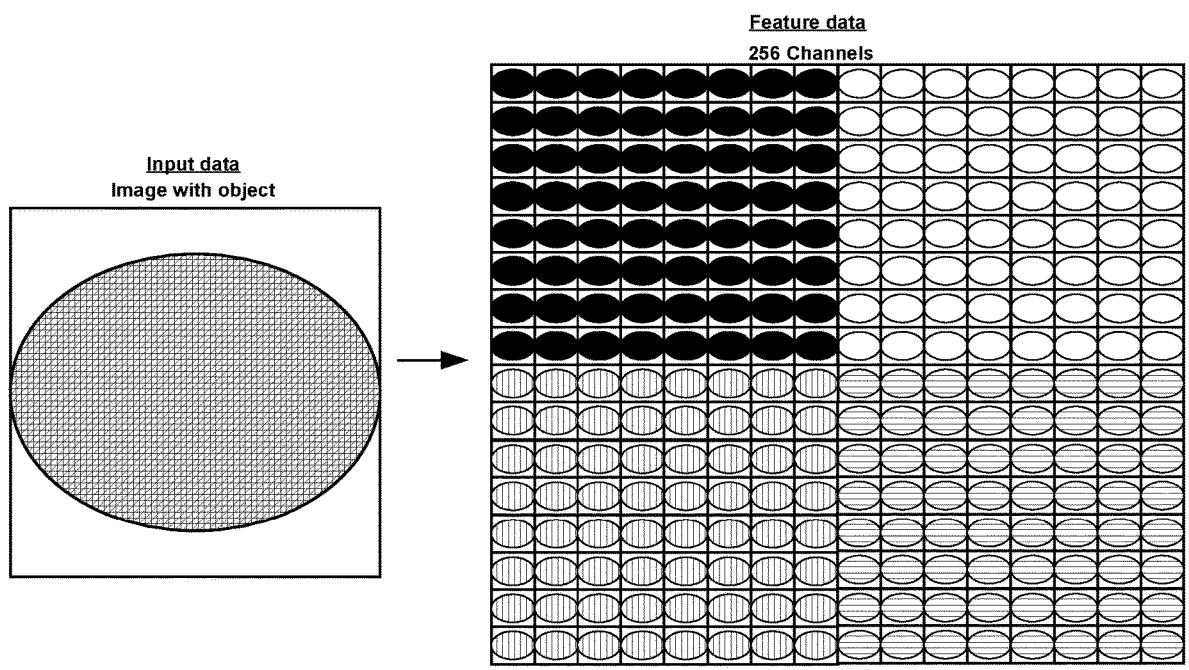
FIG. 22 is a conceptual diagram illustrating an example of coding input data in accordance with one or more techniques of this disclosure.
Figure 23:
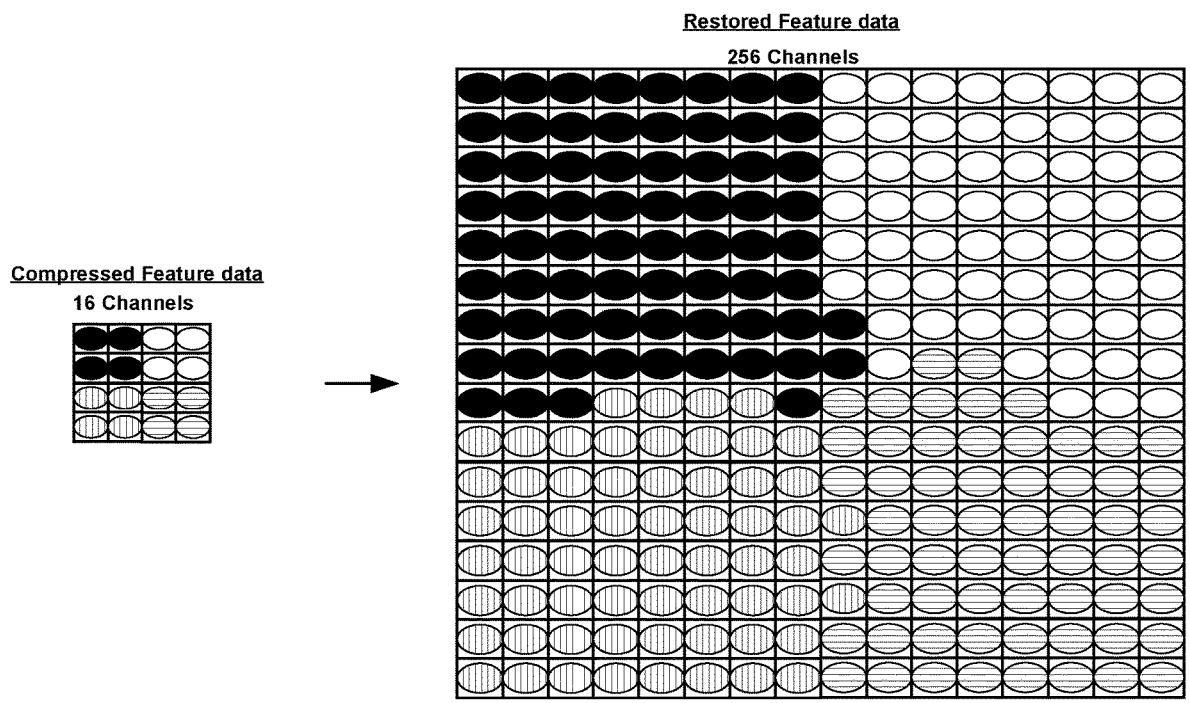
FIG. 23 is a conceptual diagram illustrating an example of recovering compressed feature data in accordance with one or more techniques of this disclosure.

As described above, the operation of a feature extraction network can be described as down sampling an input image. Thus, each channel of a feature map may be conceptualized as a down sampled version of an input image. FIG. 22 is a conceptual example where input data is an image having a distinct object and 256 channels of feature data are illustrated as down sampled versions of the input image. As described above, according to DARKNET-53, for the ⅛ scale, 256 feature maps (i.e., channels) are generated (i.e., 52×52×256). FIG. 22 provides a visualization where 256 channels each corresponding to a feature map are arranged in 16×16 configuration. In some cases, channels may be redundant, that is, resulting feature maps may be similar. FIG. 22 provides a visualization illustrating where some of the 256 channels are redundant, that is, in FIG. 22, visually similar channels are grouped spatially. FIG. 23 is a conceptual diagram illustrating an example where the feature data illustrated FIG. 22 is spatially compressed and thus, the number of channels is reduced (i.e., from 256 to 16). As further illustrated in FIG. 23, the compressed feature data may be decompressed (i.e., restored to 256 channels). Referring again to FIG. 22, if the 256 channels are visualized as a two dimensional array, i.e., similar to image data, the compression and decompression of feature data illustrated in FIG. 23 may be considered a type of spatial/intra prediction compression. It should be noted that the restored featured data in FIG. 23 is illustrated as visually distinct from the feature data illustrated in FIG. 22. As described in detail below, such distinctions may be due to edge loss during compression and noise resulting from decompression. Further, as described in further detail below, the techniques described herein may be used to mitigate the effects of compression/decompression of feature data.

Figure 24:
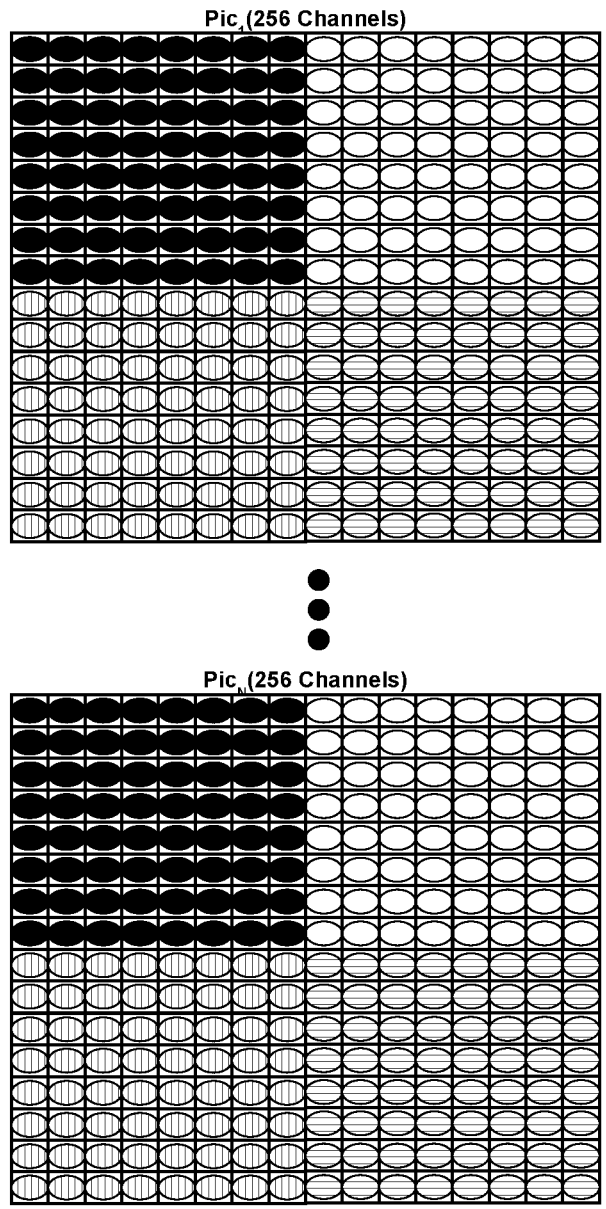
FIG. 24 is a conceptual diagram illustrating an example of coding input data in accordance with one or more techniques of this disclosure.

It should be noted that in the example described above, with respect to FIG. 22 and FIG. 23 compression/decompression is described with respect to compression of channels of feature data. It should be noted that in some examples, the compression/decompression techniques described herein may be applicable to residual data corresponding to feature data. For example, FIG. 24 illustrates an example where each picture in a non-overlapping set, the 256 channels of feature data are generated and may be similar. Thus, according to the techniques herein, feature data corresponding to a picture in a set (e.g., a non-overlapping set or an overlapping set) may be coded based on hierarchical coding. That is, feature data for $Pic_1$ to $Pic_N$ may be coded with reference to each other, i.e., e.g., feature data may be coded by referencing zero, one, two, etc. sets of feature data. It should be noted that there may be numerous ways to generate hierarchical coding structures. It should be noted that there may be numerous ways in which predictions may be generated for a sets of feature data. Thus, the techniques herein are generally applicable to compression of feature data.

Figure 25:
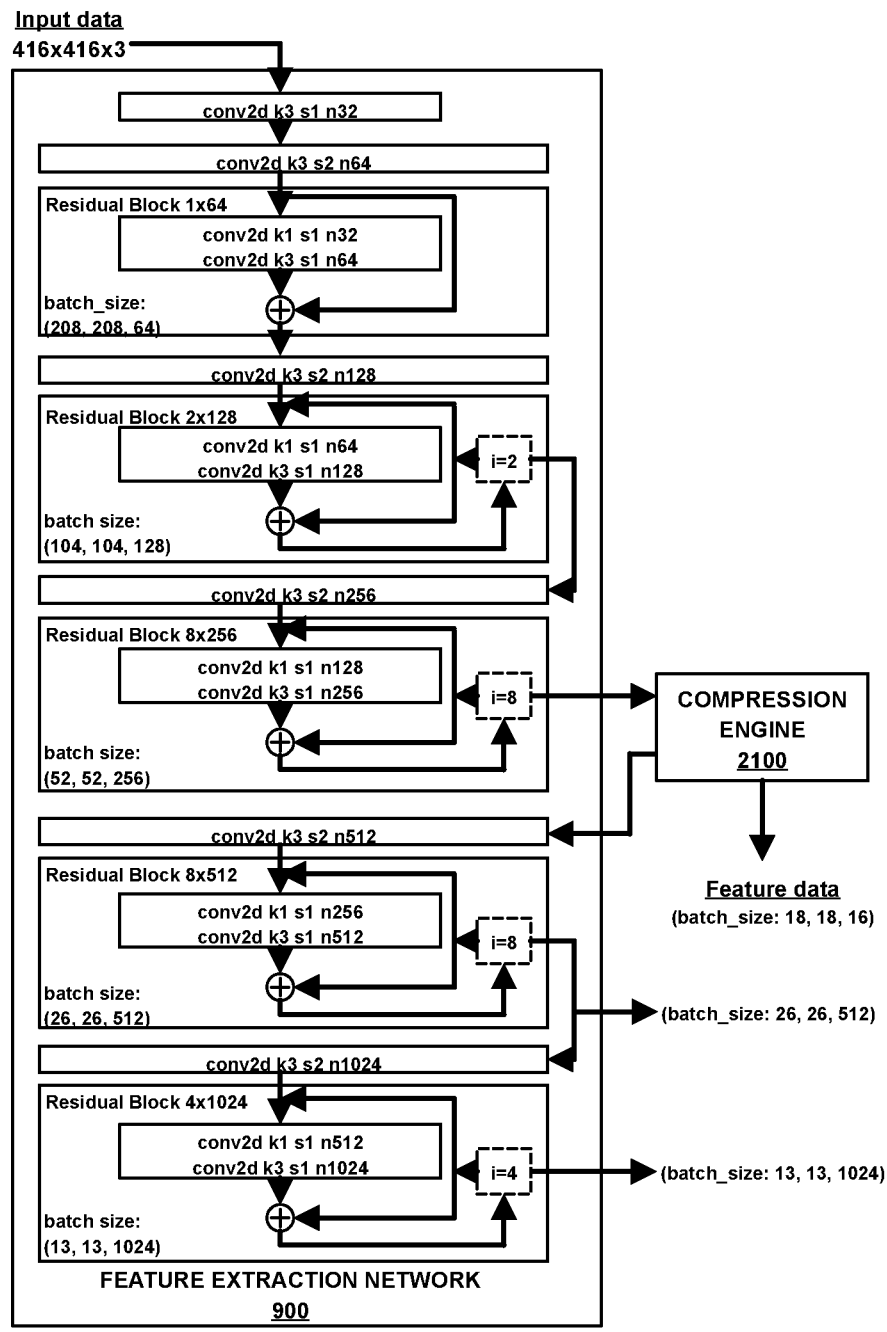
FIG. 25 is a conceptual diagram illustrating an example of a coding system that may encode a multi-dimensional data set in accordance with one or more techniques of this disclosure.
Figure 26:
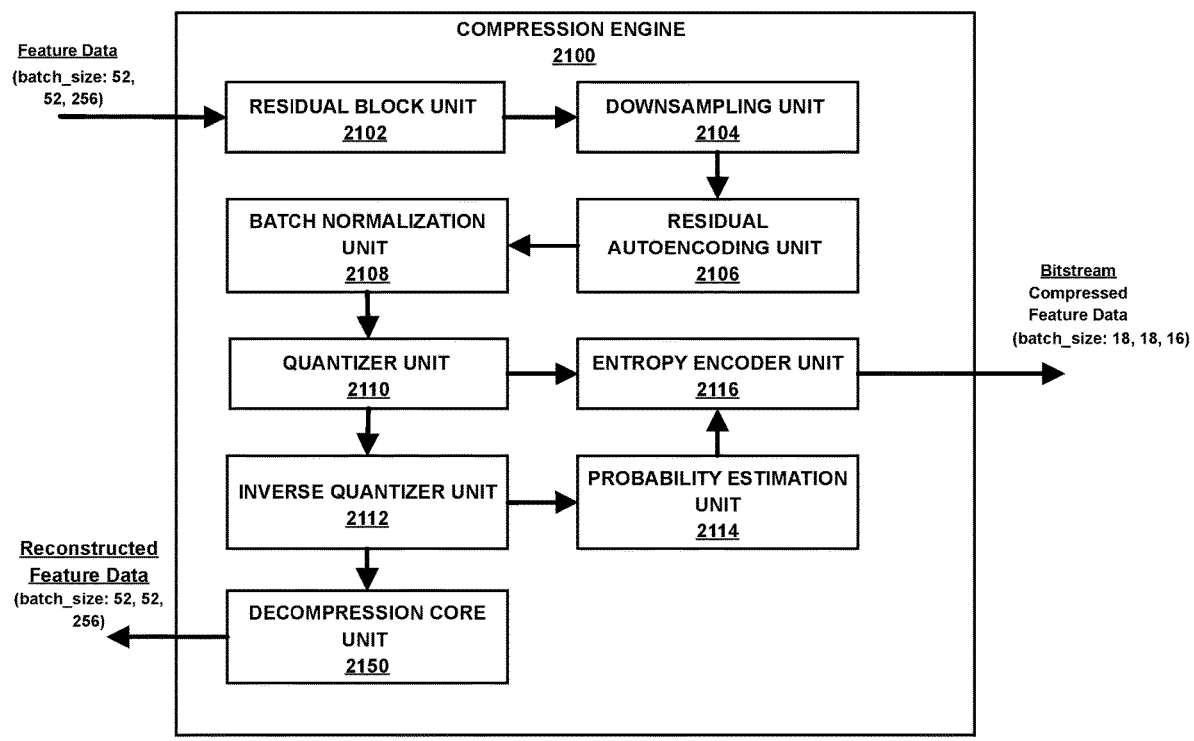
FIG. 26 is a block diagram illustrating an example of a compression engine that may be configured to encode a multi-dimensional data set in accordance with one or more techniques of this disclosure.

According to the techniques herein, there may be several ways to compress/decompress feature data for transmission over a communications network, e.g., autoencoding, quantization, entropy coding, channel pruning, etc. FIG. 25 illustrates an example where feature data generated from Darknet-53 may be compressed according to techniques herein. In the example illustrated in FIG. 25, the feature data at the ⅛ scale is compressed using compression engine 2100. It should be noted that in this case, there are no forked routes to bypass the location of compression engine 2100. FIG. 26 illustrates an example of compression engine 2100. As described above, with respect to FIG. 22 and FIG. 23, channel reduction of channels at a scale may be considered intra prediction compression. Thus, compression engine 2100 may be referred to as an intra prediction compression engine. It should be noted, however, as described in further detail, residual data generated from inter prediction may be input into and compressed by compression engine 2100. As illustrated in FIG. 26, compression engine 2100 includes residual block unit 2102, downsampling unit 2104, residual autoencoding unit 2106, batch normalization unit 2108, quantizer unit 2110, inverse quantizer unit 2112, probability estimation unit 2114, entropy encoder unit 2116, and decompression core unit 2150. As illustrated in the example of FIG. 26, compression engine 2100 essentially generates a bitstream that compresses the input feature data (i.e., 52×52× 256 feature data) by spatially down sampling the feature data by a factor of 3 (i.e., 52×52 to 18×18) and reducing the channel count by a factor of 16 (i.e., 256 to 16). It should be noted that the compression techniques described herein may be generally applicable. That is, for example other factors of spatial down sampling and channel reduction may be utilized. It should also be noted that in other examples input tensors having other sizes may be compressed according to the techniques herein. Further, as illustrated in FIG. 26, compression engine 2100 includes a decompression loop which is described in further detail below.

Figure 27:
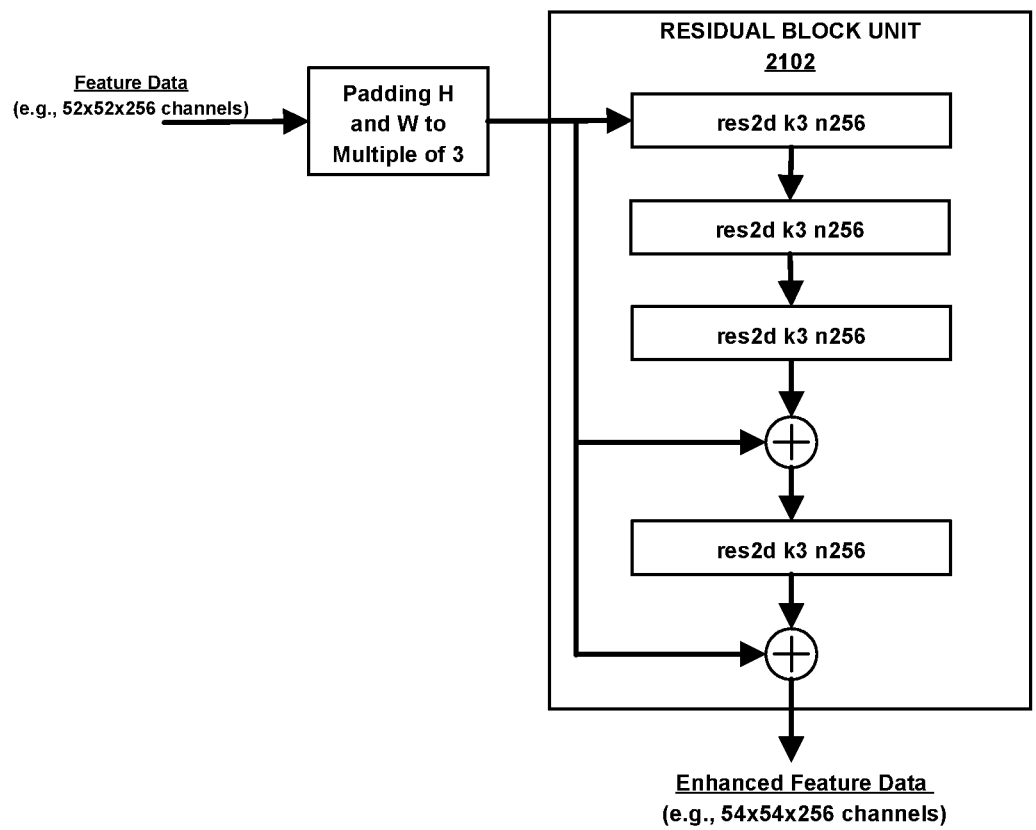
FIG. 27 is an example of a residual block unit in accordance with one or more techniques of this disclosure.
Figure 28:
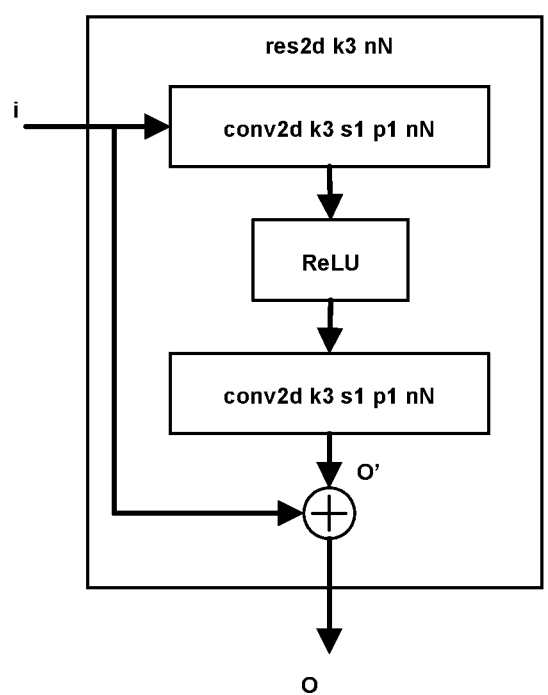
FIG. 28 is a conceptual diagram illustrating an example of a residual block in accordance with one or more techniques of this disclosure.
Figure 29:
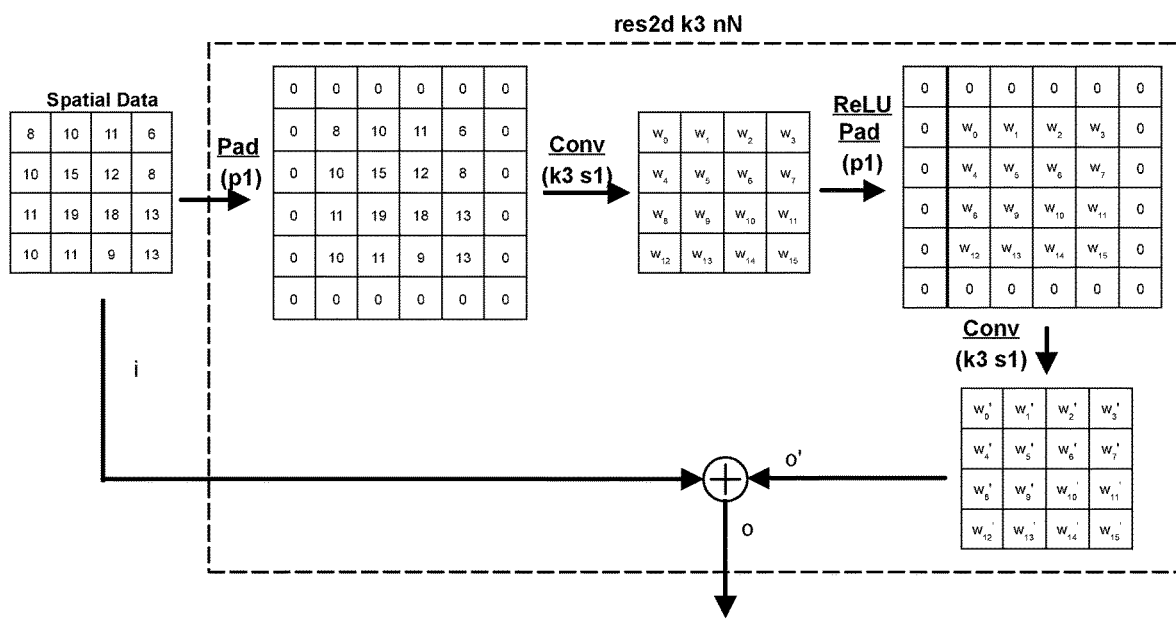
FIG. 29 is a conceptual example of a residual block in accordance with one or more techniques of this disclosure.

FIG. 27 is an example of a residual block unit in accordance with one or more techniques of this disclosure. It should be noted that as illustrated in FIG. 27, received feature data is illustrated as being padded such that each of H and W are multiples of 3, prior to input into residual block unit 2102. As described in further detail below, this is for purposes of subsequent operations performed by down sampling unit 2104. That is, as described above spatial down sampling by a factor of 3 may be performed. As further illustrated in FIG. 27, a sequence of res2d k3 n256 operations and summations are performed resulting in a refinement value being added to the input. That is, as illustrated in FIG. 27, the operation of residual block unit 2102 may be described as enhancing received feature data. FIG. 28 illustrates a res2d k3 nN operation that may be used according to the techniques herein. As illustrated in FIG. 28, for an N channel input a refinement O' is generated using subsequent convolutions and a ReLU operation and the refinement O' is added to the input. FIG. 29 illustrates a conceptual example where for input data, i, a res2d k3 nN operation, provides where output data, o, which is generated by adding an intermediate output, o', to the input data. It should be noted that in the example illustrated in FIG. 29 $w_i$ and $w_i'$ represent the weighted averages at the output of the respective convolution stages. Further, in the example illustrated in FIG. 29, ReLU refers to an operation where ReLU(x)=max (0, x). That is, if an output at the first convolution stage is negative, it is set to 0. Referring again to the example illustrated in FIG. 27, the sequence of res2d k3 n256 operations and summations essentially operate to enhance edges and features. That is, as described below, since down sampling unit 2104 down samples an input feature tensor, about the H and W dimensions and residual autoencoding unit 2106 down samples an input feature tensor, about the channel dimension, it is desirable that features and/or edges survive the down sampling operations. In this case, the sequence of res2d k3 n256 operations and summations in residual block unit 2102 may sharpen the features/edges, for example for purposes of object tracking.

Figure 30:
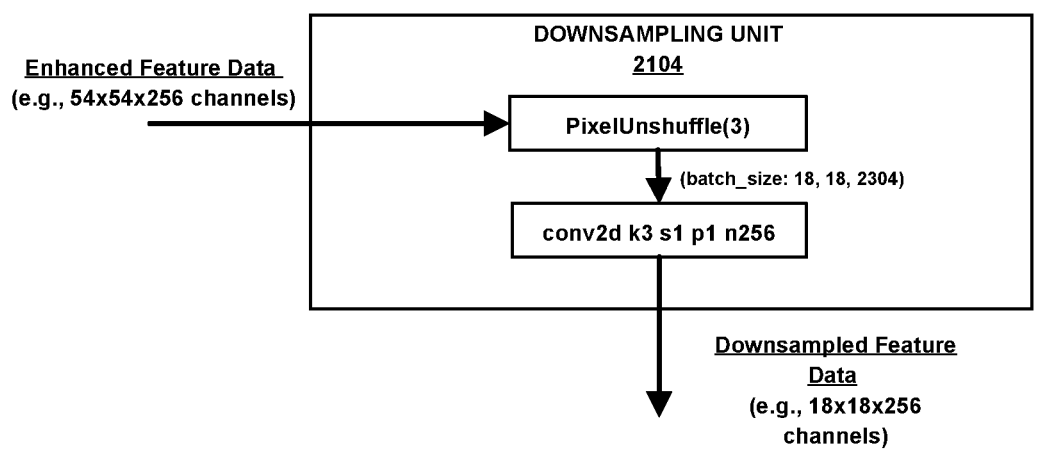
FIG. 30 is a conceptual diagram illustrating an example of a down sampling unit in accordance with one or more techniques of this disclosure.

Referring again to FIG. 26, the enhanced feature data generated by residual block unit 2102 is received by downsampling unit 2104. FIG. 30 is a conceptual diagram illustrating an example of a down sampling unit in accordance with one or more techniques of this disclosure. As illustrated in FIG. 30, the input enhanced feature data undergoes a pixel unshuffle operation. It should be noted that down sampling using a pixel unshuffle operation optimizes the channel-depth and spatial tradeoff compared to, for example, conventional transpose convolutions or bilinear interpolation down sampling operations. A PixelUnshuffle operation is defined in PyTorch. That is, for example, a pixel unshuffle operation may be based on the following:

PixelUnshuffle(downscale_factor)

Rearranges elements in a tensor of shape (*, C, H×r, W×r) to a tensor of shape (*, C×r², H, W), where r is a downscale factor.

Input: (*, $C_{in}$, $H_{in}$, $W_{in}$), where * is zero or more batch dimensions Output: (*, $C_{out}$, $H_{out}$, $W_{out}$), where $C_{out}=C_{in}\times \text{downscale\_factor}^2$ $H_{out}=H_{in} \div \text{downscale\_factor}$ $W_{out}=W_{in} \div \text{downscale\_factor}$ It should be noted that noted that although PixelUnshuffle is described above with the channel dimension listed as the second dimension and the figures illustrate the channel dimension as the third dimension, the PixelUnshuffle operation may be modified and/or the dimensions of a input tensor may be rearranged such that the PixelUnsuffle operation performs spatial down sampling. Further, it should be noted that, in general, functions may be modified and/or tensors may be rearranged such that like dimensions are aligned. Referring again to FIG. 30, after spatial down sampling is performed, a conv2d k3 n256 is performed such that the output of the down sampling unit includes 256 channels.

Figure 31:
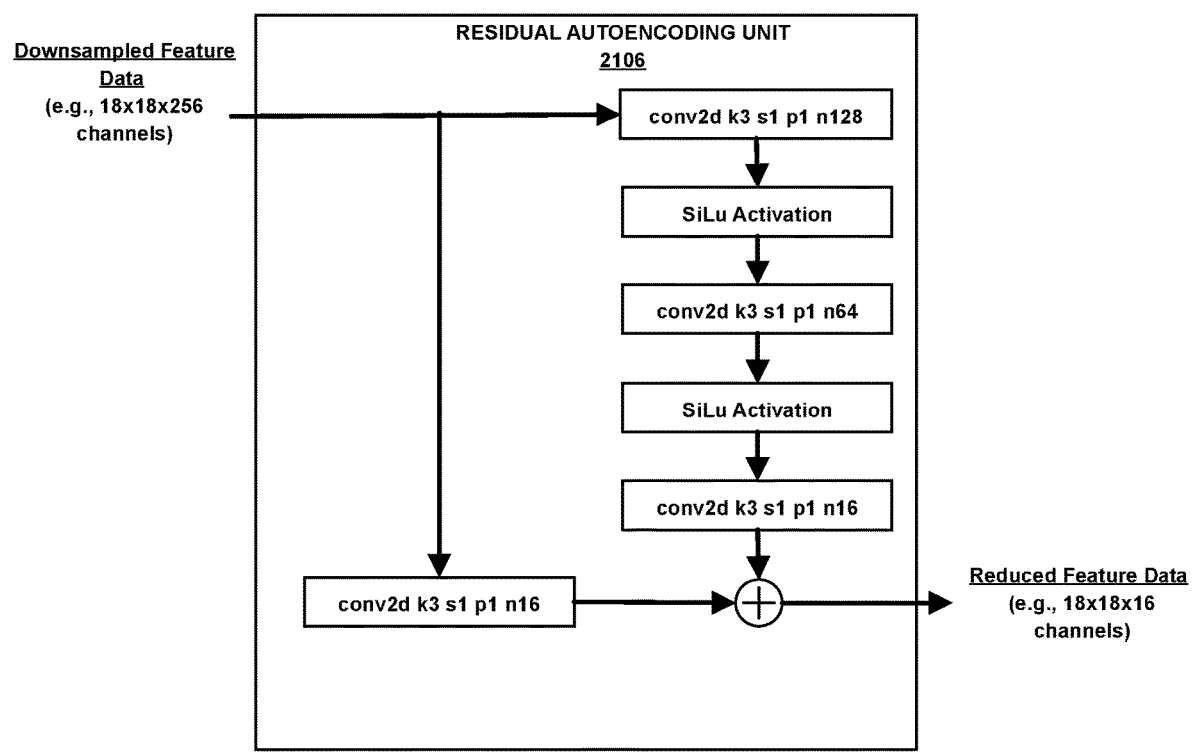
FIG. 31 is an example of a residual autoencoding unit in accordance with one or more techniques of this disclosure.

Referring again to FIG. 26, as illustrated in FIG. 26, the spatially down sampled featured data is input into residual autoencoding unit 2106. FIG. 31 is an example of a residual autoencoding unit in accordance with one or more techniques of this disclosure. It should be noted that FIG. 31 illustrates an example of a residual autoencoding unit that, according to the techniques herein, contracts in the channel dimension while retaining spatial dimensions and while using a residual connection. That is, according to the techniques herein, a residual autoencoder, for example, allows only 1 to 16 channels to be used in a bottleneck while maintaining the task network performance. That is, for a low number of channels, it is particularly important to find a mapping that maintains as much information as possible and hence allows for faithful reconstruction of the latent representation. It should be noted that, the lesser the number of bottleneck channels, the more important the aptitude in reconstruction of the down-map/up-map operation becomes to maintain the task network performance. The example residual autoencoding unit in FIG. 31 allows for faithful reconstruction of the latent representation.

In particular, referring to FIG. 31, the example residual autoencoding unit does not alter spatial dimensions of an input tensor (i.e., width and height are not altered), reduces the channel dimension through three stages of non-linear conv2d layers with activations in between, and includes a residual connection. The use of non-linearities provides improved learning, specifically for low channel cases (for example, fewer than 4 compression engine channels). The Sigmoid Linear Activations (SiLU, i.e., Swish) are used to avoid vanishing gradients and improve model performance. The residual connection increases robustness and simplify learning process. It should be noted that in FIG. 31, a SiLu activation block corresponds to the following operation:

$$silu(x) = x * \text{sigmoid}(x)$$

where, $$\text{sigmoid}(x) = \sigma(x) = \frac{1}{1+e^{-x}}$$

Thus, a SiLu activation block provides a weight value from 0 to 1 (non-inclusive), which when multiplied by the input effectively suppresses data without impacting subsequent machine task(s) and enhances data for machine task(s). That is, an SiLu activation block can identify spatial locations where a signal can be suppressed safely without impacting machine task(s) under consideration. For example, data at a border of a picture may be suppressed. The suppression of a signal can lead to lower bit consumption. A SiLu activation block can also increase the magnitude of signal at certain spatial locations such that it is beneficial to machine task(s) e.g., object detection. It should be noted that in other examples, other numbers (e.g., 4) of convolution and activation stages may be used.

Referring to again to FIG. 26, the output of residual autoencoding unit 2106 is input into batch normalization unit 2108, the output of which is input into quantizer unit 2110. In one example, according to the techniques herein, quantizer unit 2110 may be configured to quantize an input tensor based on techniques described in Fabian et al., "Conditional probability models for deep image compression," in Proceedings of the IEEE Conference on Computer Vision and Pattern Recognition (CVPR), 2018 (hereinafter Fabian). In one example, quantizer unit 2110 may utilize 16 initially uniform distributed scalar quantizer levels in the range of [−8,8]. It should be noted that in some cases, the range of quantized values may have a notable mismatch with this initial range. In such cases, a compression model can be challenging to fit during training. That is, for example, a continuous floating point distribution may not fit well with these quantizer levels. Typically, normalization is performed once at the beginning of a signal path (i.e., several stages prior to quantization) such that there is a better match between the input and the quantizer levels. According to the techniques herein, quantizer is directly prepended with a spatial batch normalization layer. That is, referring to FIG. 26, batch normalization unit 2108 immediately precedes quantizer unit 2110. Because there are no layers between the batch normalization unit 2108 and the quantizer unit 2110 the distribution fits a quantization function and subsequent normalizations can be avoided. It should be noted that in one example batch normalization unit 2108 may implement a spatial batch normalization layer based on those described in Ioffe et al., "Batch normalization: Accelerating deep network training by reducing internal covariate shift," arxiv 1502.03167v3, 2 Mar. 2015.

Referring to FIG. 26, the output of quantizer unit 2110 is input into entropy encoder unit 2116. As illustrated in FIG. 26, entropy encoder unit 2116 also receives input from probability estimation unit 2114. Probability estimation unit 2114 determines the Probability Mass Function (PMF) for quantization indices at each location within a tensor. During the determination, subset of symbols (quantization indices and therefore dequantized values) that have been decoded in the past may be used to determine the PMF for current location. That is, as illustrated in FIG. 26, output of inverse quantizer unit 2112 (i.e., decoded past symbols) may be input into probability estimation unit 2114. Symbols are typically coded using an entropy coder such as arithmetic coder that make use of the corresponding PMF when coding a symbol. That is, in one example, according to the techniques herein, an entropy encoder unit 2116 may use an arithmetic coder that makes use of the corresponding PMF when coding a symbol. In one example, probability estimation unit 2114 may be based on a conditional probability model described in Fabian. In one example, according to the techniques herein, probability estimation unit 2114 may extend the conditional probability model described in Fabian by using two probability estimators when encoding more than a certain threshold of channels. It should be noted that as described above, entropy coding is a lossless process. That is, an entropy encoder and entropy decoder are synchronized so that the decoder reproduces the same sequence of symbols (e.g., quantization indices) that were coded by the encoder. Thus, as illustrated in FIG. 26 compressed feature data (i.e., spatially reduced, channels reduced, quantized and entropy coded) may be transmitted in a bitstream.

Figure 32:
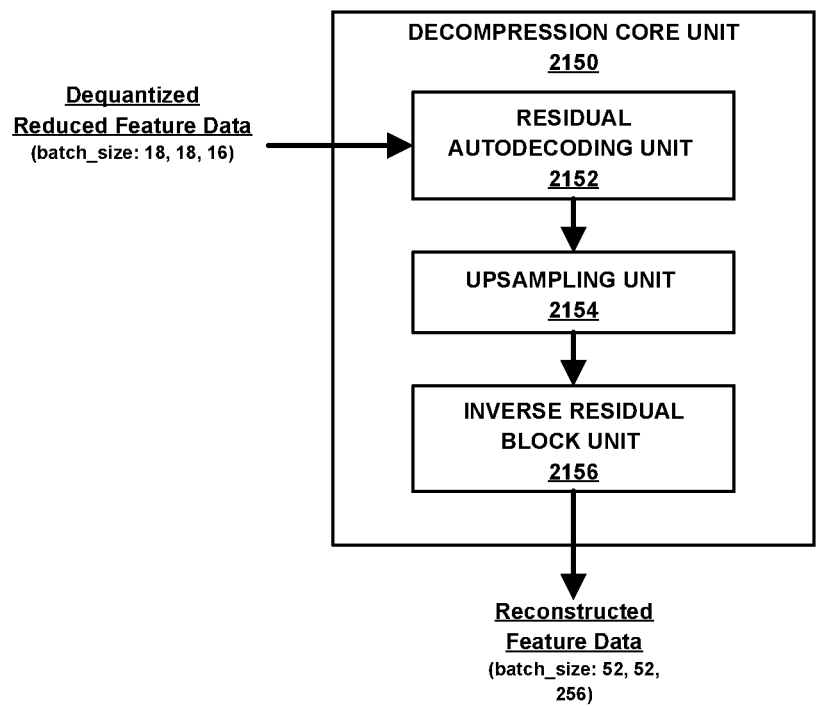
FIG. 32 is a block diagram illustrating an example of a decompression core unit in accordance with one or more techniques of this disclosure.

Referring again to the example illustrated in FIG. 26, in addition to being provided to entropy encoder unit 2216, the output of quantizer unit 2110 is also provided to inverse quantizer unit 2112. As described above, an inverse quantizer unit performs reciprocal operations to a quantizer unit. As illustrated in FIG. 26, in addition to being provided to probability estimation unit 2114 (as described above), the output of inverse quantizer unit 2112, which may, for example, include 16 channels of dequantized feature data, is input into decompression core 2150. As described above, downsampling unit 2104 and residual autoencoding unit 2106 compress feature data, decompression core 2150 is configured to perform decompression. FIG. 32 is a block diagram illustrating an example of a decompression core unit in accordance with one or more techniques of this disclosure. It should be noted that in FIG. 28 decompression core unit 2150 is utilized as part of a compression/decompression loop. Referring to FIG. 32, decompression core unit 2150 includes residual autodecoding unit 2152, upsampling unit 2154, and inverse residual block unit 2156.

Figure 33:
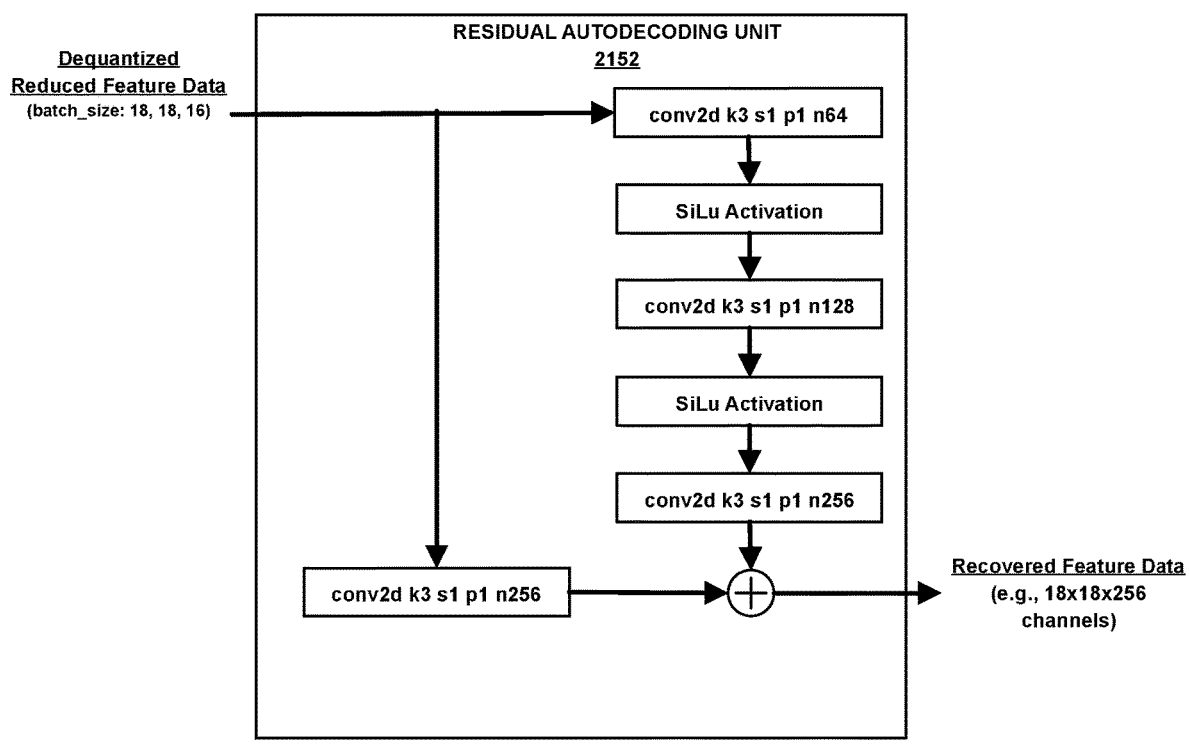
FIG. 33 is an example of a residual autodecoding unit in accordance with one or more techniques of this disclosure.

FIG. 33 illustrates an example of a residual autodecoding unit. As described above, residual autoencoding unit 2106 reduces a number of channels of an input tensor (e.g., from 256 to 16). Residual autodecoding unit 2152 is configured to perform a reciprocal operation to residual autoencoding unit 2106 such that the number of channels is restored. As illustrated in FIG. 33, residual autodecoding unit 2152 includes a residual connection and three stages of non-linear conv2d layers with activations in between. Thus, residual autodecoding unit 2152 essentially perform reciprocal channel up sampling operations to the channel down sampling operations performed by residual autoencoding unit 2106.

Figure 34:
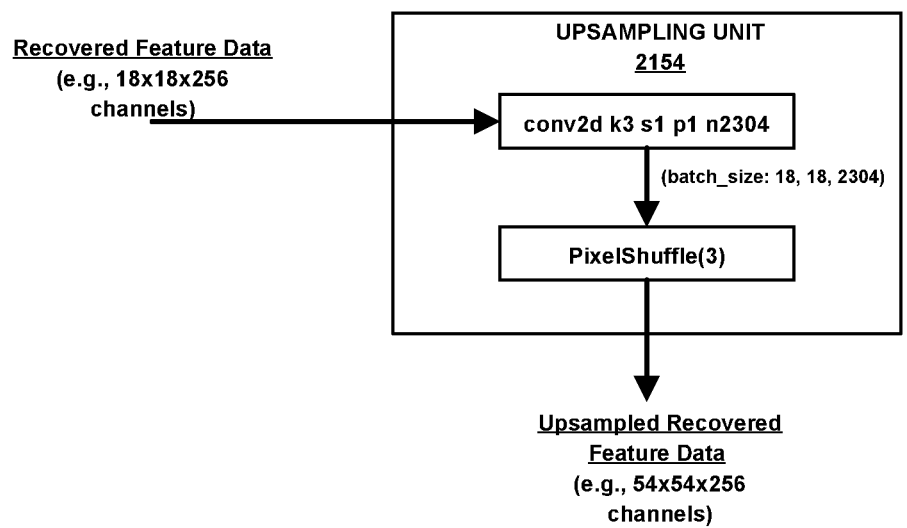
FIG. 34 is a conceptual diagram illustrating an example of an up sampling unit in accordance with one or more techniques of this disclosure.

Referring again to FIG. 32, the output of residual autodecoding unit 2152 is input into upsampling unit 2154. FIG. 34 is a conceptual diagram illustrating an example of a up sampling unit in accordance with one or more techniques of this disclosure. As illustrated in FIG. 34, the input recovered feature data undergoes a pixel shuffle operation. A Pixelshuffle operation is defined in PyTorch. That is, for example, a pixel shuffle operation may be based on the following:

Pixel shuffle(upscale_factor)

Rearranges elements in a tensor of shape $(*, C \times r^2, H, W)$ to a tensor of shape $(*, C, H \times r, W \times r)$, where r is an upscale_factor.

Input: $(*, C_{in}, H_{in}, W_{in})$, where * is zero or more batch dimensions

Output: $(*, C_{out}, H_{out}, W_{out})$, where $C_{out} = C_{in} \div \text{upscale\_factor}^2$ $H_{out} = H_{in} \times \text{upscale\_factor}$ $W_{out} = W_{in} \times \text{upscale\_factor}$ It should be noted that as illustrated in FIG. 34, prior to performing the pixel shuffle operation a conv2d k3 n2034 is performed such that the output of the upsampling unit includes 256 channels.

Figure 35:
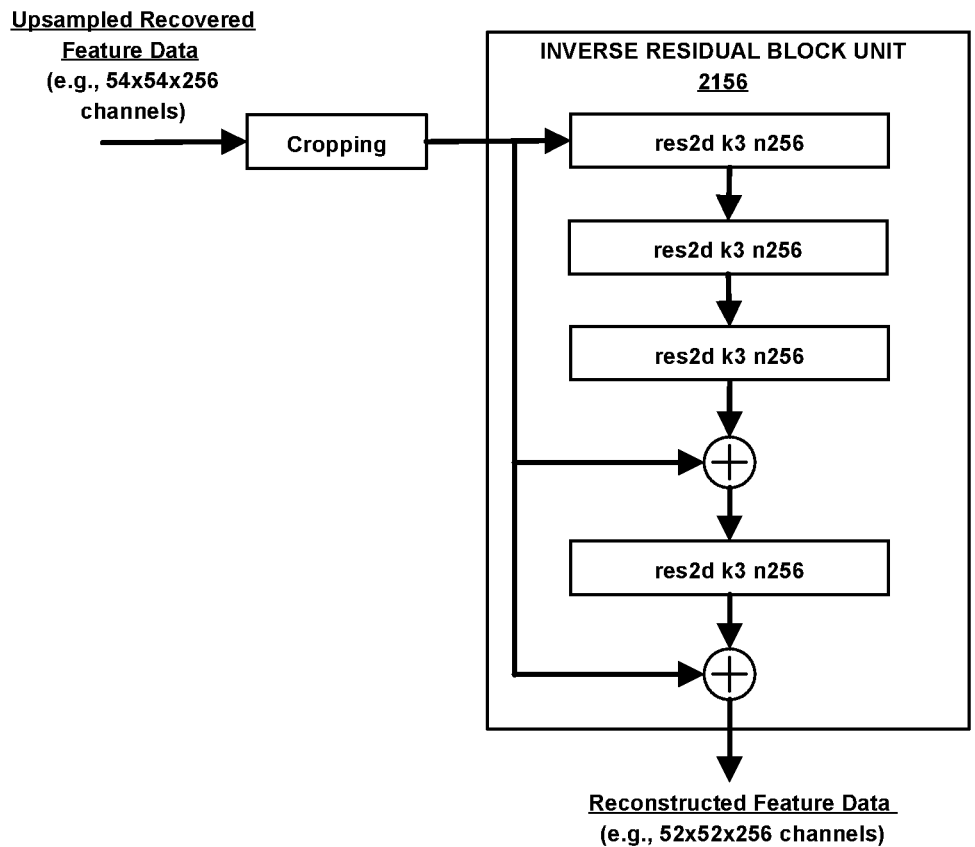
FIG. 35 is a conceptual example of an inverse residual block in accordance with one or more techniques of this disclosure.

Referring again to FIG. 32, the output of upsampling unit 2154 is input into inverse residual block unit 2156. FIG. 35 is an example of an inverse residual block unit in accordance with one or more techniques of this disclosure. It should be noted that as illustrated in FIG. 35, up sampled recovered feature data is illustrated as being cropped. Such cropping is for purposes of performing a reciprocal operation to any padding performed prior to input into residual block unit 2102. As further illustrated in FIG. 35, a sequence of res2d k3 n256 operations and summations are performed resulting in a refinement value being added to the input. That is, the sequence of res2d k3 n256 operations and summations essentially operate to enhance edges and features. That is, the sequence of res2d k3 n256 operations and summations in residual block unit 2102 may sharpen the features/edges, for example for purposes of object tracking.

Figure 36:
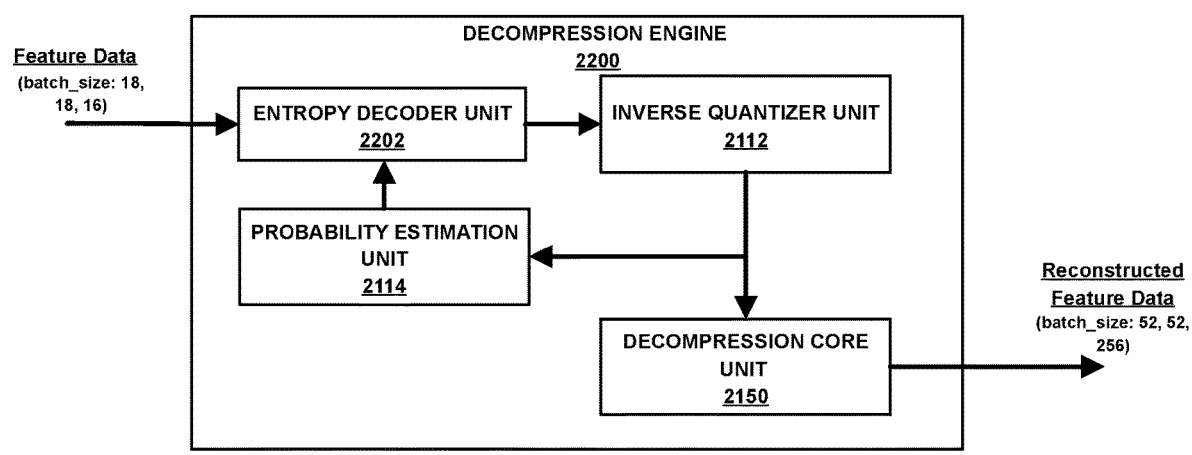
FIG. 36 is a block diagram illustrating an example of a decompression engine that may be configured to decode a multi-dimensional data set in accordance with one or more techniques of this disclosure.

As described above, a decompression engine may be configured to perform reciprocal operations to a compression engine to generate reconstructed feature data. FIG. 36 illustrates an example of a decompression engine configured to generate reconstructed feature data according to the techniques herein. Decompression engine 2200 is configured to perform reciprocal operations to compression engine 2100. As illustrated in FIG. 36, decompression engine 2200 includes entropy decoding unit 2202, inverse quantizer unit 2112, probability estimation unit 2114, and decompression core unit 2150. Each of inverse quantizer unit 2112, probability estimation unit 2114, and decompression core unit 2150 may operate as described above. Further, entropy decoding unit 2202 may operate in a reciprocal manner to entropy encoding unit 2116.

As described above, recovered feature data may be input into an inference data generation network. As described above, when compressed feature data is reconstructed noise may be introduced, i.e., e.g., due to data loss at a particular channel. As further described above, in one example, according to the techniques herein, performance of an inference network may be improved by mitigating noise included in recovered feature data. As described above, JDE uses adaptive loss weighting to dynamically balance all three targets during training. In one example, according to the techniques herein, to optimize the rate-distortion tradeoff, in training, the summed balanced loss may be regarded as the distortion, and an additive Lagrangian term may be included to measure and penalize excess of rate budget R as It is given as $$L_{Total} = \sum_{i=1}^{m} \frac{1}{2}\left(\frac{1}{e^{s_i^\alpha}}L_{cls}^i + s_i^\alpha\right) + \frac{1}{2}\left(\frac{1}{e^{s_i^\beta}}L_{reg}^i + s_i^\beta\right) + \frac{1}{2}\left(\frac{1}{e^{s_i^\gamma}}L_{emb}^i + s_i^\gamma\right) + \lambda(r - R)^+$$

with $\lambda$ denoting the Lagrange factor, $(\cdot)^+$ is the ramp function, R is the given bitrate budget and r stands for the rate obtained from the probability estimator. It should be noted that the training setup may be simplified by fixing to $\lambda$ to 32 instead of deriving the optimal during optimization.

Based on the training above, in one example according to the techniques herein, for each scale, respective 1×1 convolution layers may be applied before each detection and embedding layer. That is, according to the techniques herein, a total of 6 layers may be inserted into the interference data generation network illustrated in FIG. 19. It should be noted that in one example, respective 1×1 convolution layers may be applied before each detection and not before each embedding layer.

Figure 37:
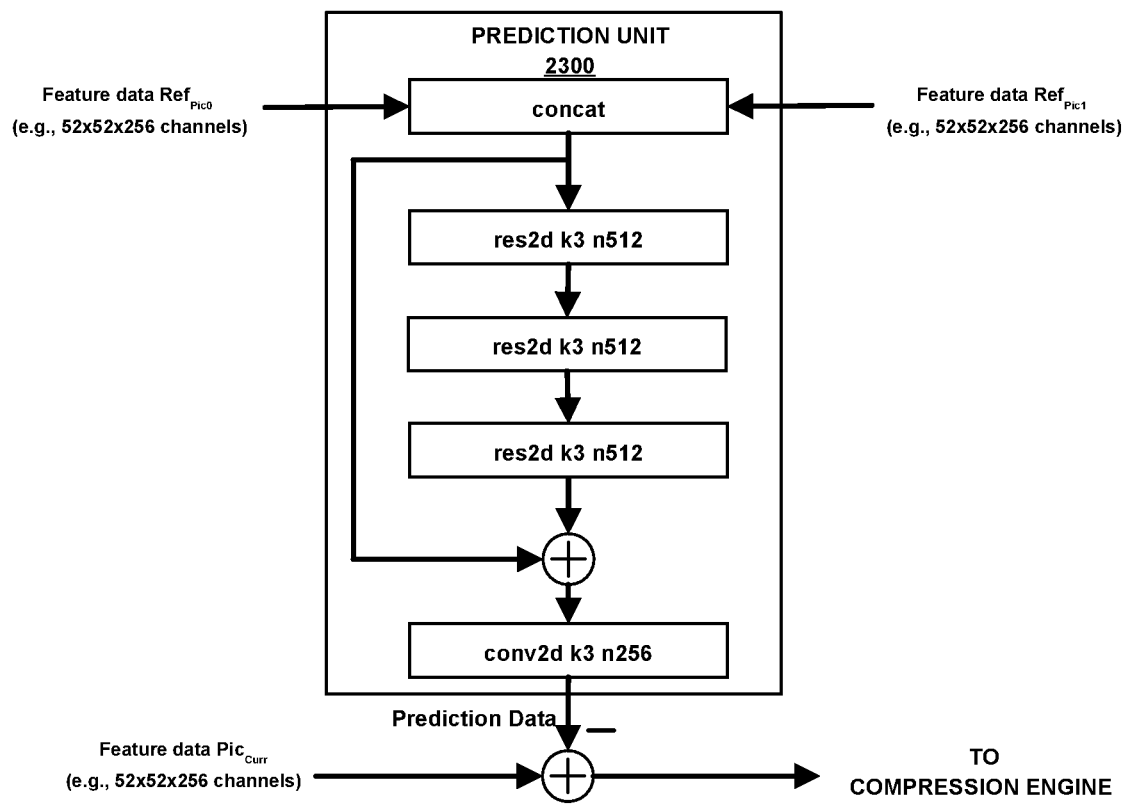
FIG. 37 is a block diagram illustrating an examples of a prediction unit that may be configured to code feature data in accordance with one or more techniques of this disclosure.

As described above, in one example, according to the techniques herein, residual data generated from inter prediction may be input into and compressed by compression engine 2100. FIG. 37 illustrates an example of a prediction unit configured to generate residual data that may be compressed by compression engine 2100. As described above with respect to FIG. 24, feature data may include feature data for $Pic_1$ to $Pic_N$ and may be coded with reference to each other. FIG. 37 illustrates an example of a prediction unit 2300. In the example illustrated in FIG. 37, for feature data corresponding to a current picture ($Pic_{Curr}$) residual data is generated by using prediction data generated from a first and second reference picture ($Ref_{Pic0}$ and $Ref_{Pic1}$). It should be noted that in one example, according to the techniques herein, the inter prediction may be based on a Feature data$_1$, Feature data$_3$, Feature data$_2$, hierarchy, where Feature data$_1$ is intra-coded reference feature data, Feature data$_3$ is uni-predicted using Feature data$_1$ (i.e., reconstrued Feature data$_1$ is used as prediction data for Feature data$_3$) and Feature data$_2$ is bi-predicted using Feature data$_1$ and Feature data$_3$ (i.e., reconstrued Feature data$_1$ and Feature data$_3$ are used to generate prediction data for Feature data$_2$). In the example illustrated in FIG. 37, the two sets of reconstructed feature data (e.g., reconstrued Feature data$_1$ and Feature data$_3$) are concatenated about the channel dimension. The concatenated channels are refined using residual blocks, the operation of which is described above, and downsampled to 256 channels. As illustrated in FIG. 37, this output of prediction unit 2300 is subtracted from the feature data to be compressed (e.g., Feature data$_2$). As described above, one set of reconstructed feature data may be used to compress feature data, reconstrued Feature data$_1$ may be used as prediction data for Feature data$_3$. In one example, according to the techniques herein, in this case, the prediction unit 2300 may be used with the one set of reconstructed feature data being used for both inputs. In another example, the concatenation block may be removed and one set of reconstructed feature data being used for as a single input to the residual block.

In this manner, compression engine 2100 represents an example of a device configured to receive feature data, perform spatial down sampling on the received feature data, and perform channel reduction on the spatially down sampled feature data and an example of a device configured to receive compressed feature data, perform channel restoration on the received compressed feature data and perform spatial up sampling on the channel restored feature data.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Moreover, each functional block or various features of the base station device and the terminal device used in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

Various examples have been described. These and other examples are within the scope of the following claims.

What is claimed is:

1. A method of compressing feature data, the method comprising:
receiving W×H×C feature data, wherein W and H are spatial dimensions and C is a number of channels and each channel corresponds to a down sampled version of an input image;
performing spatial down sampling on the received W×H×C feature data by applying a pixel unshuffle operation using a downscale factor to generate W/r× H/r×C spatially down sampled feature data, wherein r is the downscale factor;
reducing the number of channels from C to N by applying a non-linear two dimensional convolution with an activation and using a residual connection;
applying a spatial batch normalization layer to W/r×H/ r×N feature data;

quantizing the W/r×H/r×N feature data; and entropy coding the quantized W/r×H/r×N feature data to generate a bitstream.

2. The method of claim 1, wherein r is equal to 3, C is equal to 256, and N is equal to 16.

3. The method of claim 1, wherein the received W×H×C feature data includes residual data generated using inter prediction.

\* \* \* \* \*